US012643220B2

(12) United States Patent
    Resh et al.

(10) Patent No.: US 12,643,220 B2
(45) Date of Patent: Jun. 2, 2026

(54) DEPLOYABLE ROBOTIC ARM

(71) Applicant: Elevate Robotics, Inc., Austin, TX (US)

(72) Inventors: Bradley Aaron Resh, Austin, TX (US); Michael Sanford Boudreaux, Cedar Park, TX (US); Daniel Stephen Mitchell, Dripping Springs, TX (US); Joshua Alexander James, Leander, TX (US); Steven David Riddle, Tampa, FL (US); Orion Hubert Campbell, IV, Austin, TX (US); Jonas Alexan Fox, Austin, TX (US); Nicholas Arden Paine, Austin, TX (US)

(73) Assignee: Elevate Robotics, Inc., Austin, TX (US)

( * ) Notice: Subject to any disclaimer, the term of this patent is extended or adjusted under 35 U.S.C. 154(b) by 1041 days.

(21) Appl. No.: 17/732,282

(22) Filed: Apr. 28, 2022

(65) Prior Publication Data

US 2023/0020773 A1 Jan. 19, 2023

Related U.S. Application Data

(60) Provisional application No. 63/181,007, filed on Apr. 28, 2021.

(51) Int. Cl.
    *B25J 9/00* (2006.01)
    *B25J 9/10* (2006.01)
    *B25J 15/00* (2006.01)

(52) U.S. Cl.
    CPC ............. *B25J 9/0027* (2013.01); *B25J 9/106* (2013.01); *B25J 15/0052* (2013.01)

(58) Field of Classification Search
    CPC .. B25J 15/0616; B25J 15/0023; B25J 9/0027; B25J 9/106; B25J 9/042; B25J 9/046;
    (Continued)

(56) References Cited

U.S. PATENT DOCUMENTS 9,080,918 B2 7/2015 Fishel et al.
9,665,095 B1 * 5/2017 Romano ................ B25J 9/0096
(Continued)

FOREIGN PATENT DOCUMENTS

EP        3782777      2/2021
WO    WO 2020/014736    1/2020
(Continued)

OTHER PUBLICATIONS

Extended European Search Report in European Appln No. 22796764. 3, mailed on Sep. 9, 2024, 7 pages.
(Continued)

*Primary Examiner* — Stephen A Vu
(74) *Attorney, Agent, or Firm* — Fish & Richardson P.C.

(57) ABSTRACT

A robotic arm system comprising a deployment system or a base, a first joint, and a manipulator coupled to the deployment system or base at the first joint and movable relative to the deployment link or base about the first joint. The manipulator includes a manipulator link, a second joint coupled to the manipulator link distal from the first joint, an elevation linkage coupled to the manipulator link at the second joint, a wrist coupled to the elevation linkage distal from the second joint, and an end effector coupled to the wrist. The end effector can change elevation via the elevation link without changing orientation.

32 Claims, 34 Drawing Sheets

(58) Field of Classification Search
CPC .... B25J 9/1065; B25J 15/0052; B25J 15/022; B25J 11/002; B25J 5/007; B65G 47/91; F41A 9/87
See application file for complete search history.

(56) References Cited

U.S. PATENT DOCUMENTS

| | | | |
|---|---|---|---|
| 9,682,483 | B1 * | 6/2017 | Romano .............. B25J 11/0085 |
| 9,827,677 | B1 | 11/2017 | Gilbertson et al. |
| 11,312,012 | B2 | 4/2022 | Kaehler |
| 11,461,867 | B2 | 10/2022 | Gildert et al. |
| 11,478,927 | B1 | 10/2022 | Kranski et al. |
| 11,625,122 | B2 | 4/2023 | Kranski et al. |
| 11,636,398 | B2 | 4/2023 | Kranski et al. |
| 11,639,004 | B2 | 5/2023 | Khadivinassab et al. |
| 11,691,270 | B2 | 7/2023 | Shannon |
| 11,691,274 | B2 | 7/2023 | Kaehler |
| 11,691,278 | B2 | 7/2023 | Kranski et al. |
| 11,717,963 | B2 | 8/2023 | Gildert et al. |
| 11,717,974 | B1 | 8/2023 | Gildert et al. |
| 11,787,049 | B2 | 10/2023 | Gildert et al. |
| 11,787,050 | B1 | 10/2023 | Kaehler et al. |
| 11,812,126 | B2 | 11/2023 | Hill et al. |
| 11,848,014 | B2 | 12/2023 | Peck |
| 11,865,703 | B2 | 1/2024 | Shannon et al. |
| 11,867,574 | B1 | 1/2024 | Fishel et al. |
| 11,913,562 | B2 | 2/2024 | Sterling et al. |
| 11,931,894 | B1 | 3/2024 | Rose et al. |
| 11,938,634 | B2 | 3/2024 | Gildert et al. |
| 11,999,063 | B1 | 6/2024 | Rose et al. |
| 12,011,867 | B2 | 6/2024 | Sterling et al. |
| 12,030,196 | B2 | 7/2024 | Gildert |
| 12,066,347 | B2 | 8/2024 | Wu et al. |
| 12,099,343 | B2 | 9/2024 | Kaehler |
| 12,122,040 | B2 | 10/2024 | Gildert et al. |
| 12,124,651 | B2 | 10/2024 | Kranski et al. |
| 12,129,944 | B2 | 10/2024 | Sterling et al. |
| 12,138,809 | B2 | 11/2024 | Rose |
| 12,145,266 | B2 | 11/2024 | Rose et al. |
| 12,157,226 | B2 | 12/2024 | Kranski et al. |
| 12,162,138 | B2 | 12/2024 | Shannon |
| 12,162,153 | B2 | 12/2024 | Rose et al. |
| 12,172,297 | B2 | 12/2024 | Khadivinassab et al. |
| 12,172,307 | B2 | 12/2024 | Shannon et al. |
| 12,172,317 | B2 | 12/2024 | Kaehler et al. |
| 12,172,327 | B2 | 12/2024 | Gildert |
| 2002/0093211 | A1 | 7/2002 | Filipiak et al. |
| 2010/0095800 | A1 | 4/2010 | Palau et al. |
| 2013/0041509 | A1 | 2/2013 | Saito et al. |
| 2016/0167227 | A1 * | 6/2016 | Wellman ................. B65G 1/10 901/3 |
| 2016/0199985 | A1 * | 7/2016 | Ganninger ............... B44C 1/18 156/367 |
| 2017/0144309 | A1 * | 5/2017 | Sankai ..................... B25J 17/00 |
| 2017/0173796 | A1 | 6/2017 | Kim et al. |
| 2019/0160682 | A1 | 5/2019 | Sato et al. |
| 2021/0122035 | A1 | 4/2021 | Furlan |
| 2021/0307170 | A1 | 9/2021 | Wu et al. |
| 2022/0101477 | A1 | 3/2022 | Gildert et al. |
| 2022/0105643 | A1 | 4/2022 | Shannon |
| 2022/0105644 | A1 | 4/2022 | Shannon |
| 2022/0314435 | A1 | 10/2022 | Wales et al. |
| 2022/0314448 | A1 | 10/2022 | Wales et al. |
| 2022/0324113 | A1 | 10/2022 | Rose |
| 2022/0324114 | A1 | 10/2022 | Rose |
| 2022/0355485 | A1 | 11/2022 | Rose |
| 2022/0355486 | A1 | 11/2022 | Rose |
| 2022/0355487 | A1 | 11/2022 | Rose |
| 2022/0371183 | A1 | 11/2022 | Shannon et al. |
| 2022/0390045 | A1 | 12/2022 | Sterling et al. |
| 2022/0402126 | A1 | 12/2022 | Gildert |
| 2022/0404835 | A1 | 12/2022 | Gildert |
| 2023/0023985 | A1 | 1/2023 | Shannon |
| 2023/0053753 | A1 | 2/2023 | Gildert et al. |
| 2023/0054297 | A1 | 2/2023 | Gildert et al. |
| 2023/0056745 | A1 | 2/2023 | Gildert et al. |
| 2023/0078625 | A1 | 3/2023 | Kaehler et al. |
| 2023/0083349 | A1 | 3/2023 | Kranski et al. |
| 2023/0085731 | A1 | 3/2023 | Shannon et al. |
| 2023/0111067 | A1 | 4/2023 | Gildert et al. |
| 2023/0111284 | A1 | 4/2023 | Gildert et al. |
| 2023/0114376 | A1 | 4/2023 | Gildert et al. |
| 2023/0122611 | A1 | 4/2023 | Rose |
| 2023/0148120 | A1 | 5/2023 | Kranski et al. |
| 2023/0150135 | A1 | 5/2023 | Shannon |
| 2023/0202028 | A1 | 6/2023 | Gildert et al. |
| 2023/0202029 | A1 | 6/2023 | Shannon |
| 2023/0202038 | A1 | 6/2023 | Gildert et al. |
| 2023/0205291 | A1 | 6/2023 | Shannon |
| 2023/0205292 | A1 | 6/2023 | Shannon |
| 2023/0211507 | A1 | 7/2023 | Shannon |
| 2023/0237378 | A1 | 7/2023 | Kranski et al. |
| 2023/0278201 | A1 | 9/2023 | Gildert |
| 2023/0278202 | A1 | 9/2023 | Gildert |
| 2023/0278223 | A1 | 9/2023 | Gildert |
| 2023/0297186 | A1 | 9/2023 | O'Rourke |
| 2023/0302659 | A1 | 9/2023 | Lee et al. |
| 2023/0302660 | A1 | 9/2023 | Lee et al. |
| 2023/0302661 | A1 | 9/2023 | Martin |
| 2023/0311316 | A1 | 10/2023 | Gildert et al. |
| 2023/0333593 | A1 | 10/2023 | Meier |
| 2023/0339104 | A1 | 10/2023 | Kaehler |
| 2023/0364806 | A1 | 11/2023 | Lee et al. |
| 2023/0364807 | A1 | 11/2023 | Lee et al. |
| 2023/0364808 | A1 | 11/2023 | Lee et al. |
| 2023/0381957 | A1 | 11/2023 | Gildert et al. |
| 2023/0381958 | A1 | 11/2023 | Gildert et al. |
| 2024/0033921 | A1 | 2/2024 | Moore et al. |
| 2024/0033922 | A1 | 2/2024 | Moore et al. |
| 2024/0037848 | A1 | 2/2024 | Moore et al. |
| 2024/0046572 | A1 | 2/2024 | Moore et al. |
| 2024/0046573 | A1 | 2/2024 | Moore et al. |
| 2024/0096003 | A1 | 3/2024 | Gildert et al. |
| 2024/0096004 | A1 | 3/2024 | Gildert et al. |
| 2024/0096005 | A1 | 3/2024 | Gildert et al. |
| 2024/0109612 | A1 | 4/2024 | Gildert |
| 2024/0175516 | A1 | 5/2024 | Foroughi et al. |
| 2024/0181647 | A1 | 6/2024 | Gildert et al. |
| 2024/0208082 | A1 | 6/2024 | Shannon et al. |
| 2024/0217096 | A1 | 7/2024 | Maleki et al. |
| 2024/0246231 | A1 | 7/2024 | Gildert et al. |
| 2024/0253211 | A1 | 8/2024 | Rose et al. |
| 2024/0253212 | A1 | 8/2024 | Rose et al. |
| 2024/0253220 | A1 | 8/2024 | Wells et al. |
| 2024/0253221 | A1 | 8/2024 | Gidert |
| 2024/0253222 | A1 | 8/2024 | Gidert |
| 2024/0253239 | A1 | 8/2024 | Gidert |
| 2024/0253243 | A1 | 8/2024 | Gidert |
| 2024/0256794 | A1 | 8/2024 | Gidert |
| 2024/0278435 | A1 | 8/2024 | Gildert |
| 2024/0280967 | A1 | 8/2024 | Wells et al. |
| 2024/0286280 | A1 | 8/2024 | Karimi Eskandary et al. |
| 2024/0294219 | A1 | 9/2024 | Gildert et al. |
| 2024/0294220 | A1 | 9/2024 | Gildert et al. |
| 2024/0300115 | A1 | 9/2024 | Rose et al. |
| 2024/0316759 | A1 | 9/2024 | Maleki et al. |
| 2024/0316761 | A1 | 9/2024 | Rose et al. |
| 2024/0316795 | A1 | 9/2024 | Hill et al. |
| 2024/0316796 | A1 | 9/2024 | Maleki et al. |
| 2024/0351211 | A1 | 10/2024 | Shannon et al. |
| 2024/0351212 | A1 | 10/2024 | Shannon et al. |
| 2024/0359319 | A1 | 10/2024 | Rose et al. |
| 2024/0359331 | A1 | 10/2024 | Gildert |
| 2024/0367316 | A1 | 11/2024 | Gildert et al. |
| 2024/0367317 | A1 | 11/2024 | Gildert et al. |
| 2024/0375299 | A1 | 11/2024 | Shannon et al. |
| 2024/0393190 | A1 | 11/2024 | Fishel et al. |
| 2025/0001611 | A1 | 1/2025 | Gildert |
| 2025/0001612 | A1 | 1/2025 | Gildert |
| 2025/0001613 | A1 | 1/2025 | Gildert |
| 2025/0050495 | A1 | 2/2025 | Gildert et al. |

(56)     References Cited

U.S. PATENT DOCUMENTS

| | | |
|---|---|---|
| 2025/0050496 A1 | 2/2025 | Gildert et al. |
| 2025/0050497 A1 | 2/2025 | Gildert et al. |

FOREIGN PATENT DOCUMENTS

| | | |
|---|---|---|
| WO | WO 2020/092516 | 5/2020 |
| WO | WO 2022174344 A1 | 8/2022 |
| WO | WO 2022217346 A1 | 10/2022 |
| WO | WO 2022232934 A1 | 11/2022 |
| WO | WO 2022241570 A1 | 11/2022 |
| WO | WO 2023015383 A1 | 2/2023 |
| WO | WO 2023082013 A1 | 5/2023 |
| WO | WO 2023122834 A1 | 7/2023 |
| WO | WO 2023164781 A1 | 9/2023 |
| WO | WO 2023235977 A1 | 12/2023 |
| WO | WO 2024065045 A1 | 4/2024 |
| WO | WO 2024113059 A1 | 6/2024 |
| WO | WO 2024119268 A1 | 6/2024 |
| WO | WO 2024130449 A1 | 6/2024 |
| WO | WO 2024159308 A1 | 8/2024 |
| WO | WO 2024159310 A1 | 8/2024 |
| WO | WO 2024159311 A1 | 8/2024 |
| WO | WO 2024159312 A1 | 8/2024 |
| WO | WO 2024168420 A3 | 8/2024 |
| WO | WO 2024182899 A1 | 9/2024 |
| WO | WO 2024239110 A1 | 11/2024 |

OTHER PUBLICATIONS

International Search Report and Written Opinion dated Jul. 27, 2022, Issued in PCT/US22/26812, 10 pages.

* cited by examiner

DEPLOYABLE ROBOTIC ARM

RELATED APPLICATIONS

This application claims the benefit of priority under 35 U.S.C. § 119(e) to U.S. Provisional Patent Application No. 63/181,007, entitled "Robotic Autonomous Arm," filed Apr. 28, 2021, which is hereby fully incorporated by reference herein for all purposes.

GOVERNMENT LICENSE RIGHTS

This invention was made with government support under prime contract W91NF18C0090, subcontract SCF1254009, awarded by the Department of the Army. This invention was also made with government support under Army Contracting Command Aberdeen Proving Ground Division A Contract No. W56KGU-21-C0037, awarded by the Department of the Army. The government has certain rights in the invention.

BACKGROUND

Robotic arms are commonly used in the industrial sector for materials handling. These industrial robots are often complex devices designed to be used in highly structured environments such as warehouses and manufacturing plants where the physical characteristics of the environment in which the robot operates and the position and orientation of the materials to be handled by the robot are well controlled. They are not designed for deployment in unstructured environments.

Industrial robot arms often sacrifice compactness and storability to the necessity of moving heavy objects, making them cumbersome to transport to and set up at field sites. Thus, industrial robotic arms are typically not designed to be easily moved between locations. Moreover, the form factor of many industrial robotic arms makes them unsuited for mounting on vehicles, particularly vehicles for which it is desired to minimize the outer profile of the vehicle or for which it is desired to maintain a clean outer profile.

SUMMARY

One embodiment comprises a robotic arm system that includes a manipulator that includes a first joint, a manipulator link, a second joint, an elevation link, a wrist and end effector. The manipulator is movable relative to a mechanical ground at a first joint. The first joint may be, for example, a manipulator yaw joint. The second joint is coupled to the manipulator link distal from the first joint. The elevation linkage is coupled to the manipulator link at the second joint such that the elevation linkage is movable relative to the manipulator link at the second joint. The second joint may be, for example, an elevation linkage yaw joint. The wrist is coupled to the elevation linkage distal from the second joint. The end effector is coupled to the wrist. The wrist may be a wrist that provides multiple degrees of freedom. For example, the wrist may comprise a wrist yaw joint, a wrist roll joint, and a wrist pitch joint. According one embodiment, the manipulator link and the elevation linkage are used to position the end effector in a workspace, including using the elevation linkage to change the elevation of the effector without changing the orientation of the end effector, whereas the wrist is primarily used to change the orientation of the end effector.

The robotic arm system may further include a deployment system that connects the manipulator to the mechanical ground. The deployment system comprises a deployment link. The manipulator is rotatable at the first joint relative to the deployment link. The deployment link may be coupled to and rotatable relative to the mechanical ground at a base joint, for example, an arm yaw joint.

As mentioned, the manipulator link may be coupled to a first joint and a second joint and the elevation linkage may be coupled to the manipulator link by the second joint. Further, the deployment link may be coupled to the mechanical ground at a base joint. According to one embodiment, the first joint is a manipulator yaw joint, the second joint is an elevation linkage yaw joint, and the base joint is an arm yaw joint.

The arm yaw joint, according to some embodiments, is a skewed yaw joint in which the yaw axis of rotation is angularly displaced for the vertical axis. The deployment link may be angled such that it is rotatable about the skewed yaw joint from a horizontal position to a position in which it is no longer horizontal. In other words, the deployment link may rotate from a position in which the link axis (e.g., the central axis for a tube or other cylindrical link) is horizontal to a rotated position in which the link axis is no longer horizontal. Thus, the end of the deployment link distal from the skewed yaw joint may change height (for example, drop in height) as the deployment link rotates from the first position to a second position, such as deployed position. The deployment system may further include leveling joints and actuators, such as a pitch joint and a roll joint to level the manipulator and orient the elevation link with respect to gravity. In some embodiments, the manipulator is self-leveling or self-aligning with gravity.

According to one aspect of the present disclosure, a robotic arm is stowable in a compact space. To this end, the deployment link and manipulator link may be movable between a stowed configuration and a deployed configuration. In one embodiment, the deployment link axis and the manipulator link axis lie in parallel planes when the arm is in the stowed configuration but do not lie in parallel planes when the arm is in the deployed configuration. In some embodiments, two or more of the deployment link, the manipulator link or the elevation link are vertically stacked when in the stowed configuration.

As discussed, the manipulator may include an elevation linkage. According to one embodiment, the elevation link comprises a four-bar linkage, including an upper link arranged parallel to a lower link and a first end link arranged parallel to a second end link. The first end link and the second end link are coupled between the upper link and the lower link to form a parallelogram structure. A gravity compensating spring coupled to the parallelogram structure at a first spring attachment point and a second spring attachment point. A spring adjustment actuator coupled to the first spring attachment point. The position of the first spring attachment point is adjustable by the spring adjustment actuator. In some embodiments, the spring adjustment mechanism includes a zero-power mechanism that prevents the spring attachment point from moving relative to the elevation link in the absence of electrical power to the actuator. Thus, once a is lifted to a desired elevation, it may be maintained at that elevation without requiring additional power to hold it up.

According to one aspect of the present disclosure, the end effector is adapted to radially grasp a payload. The end effector, according to one embodiment, comprises a body and a gripper that form a payload receiving area. The gripper may be closed to grip a payload in the payload receiving area and opened to release the payload. An end effector may include any number of grippers and payload receiving areas. In embodiments with more than one gripper, multiple grippers may be driven by the same actuator or by different actuators. The end effector actuator is disposed between the payload receiving areas in some embodiments.

According to one embodiment, the end effector includes a rotary cam mechanism to open and close the gripper. The rotary cam may be driven by an actuator or through a manual control. The rotary cam may be lockable in a zero-power fully open position and a zero-power fully closed position.

The end effector may include a gripper linkage coupled between the rotary cam and the gripper and an inline leaf spring coupled between the gripper linkage and the gripper. In such an embodiment, the rotary cam drives the gripper linkage to open and close the first gripper. The inline leaf spring deflects to limit the gripping force applied by the first gripper to a payload in the first payload receiving area. In some embodiments, the end effector comprises a spring in parallel with the gripper linkage to bias the gripper closed.

Embodiments provide an advantage by allowing a manipulator to be relatively light weight for the manipulator's payload weight capacity. More particular, embodiments do not require a powerful and heavy actuator to oppose the gravity load vector. Instead, embodiments utilize a four-bar linkage with a gravity compensating spring to compensate for gravity. A relatively small and light weight actuator can be used to adjust the gravity compensating spring to change the lift force provided by the gravity compensating spring. Furthermore, using the gravity compensating spring to counteract gravity, reduces power consumption.

Some embodiments can further reduce power consumption by using a zero-power brake to hold the attachment point of the gravity compensating spring in place.

Furthermore, some embodiments provide a further advantage by allowing for zero-power grasping of a payload, thus reducing the amount of power required when manipulating the payload.

Embodiments further provide an advantage by providing robotic arms that can be stowed in a relatively compact space, including along the sides of vehicles.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

Figure 1:
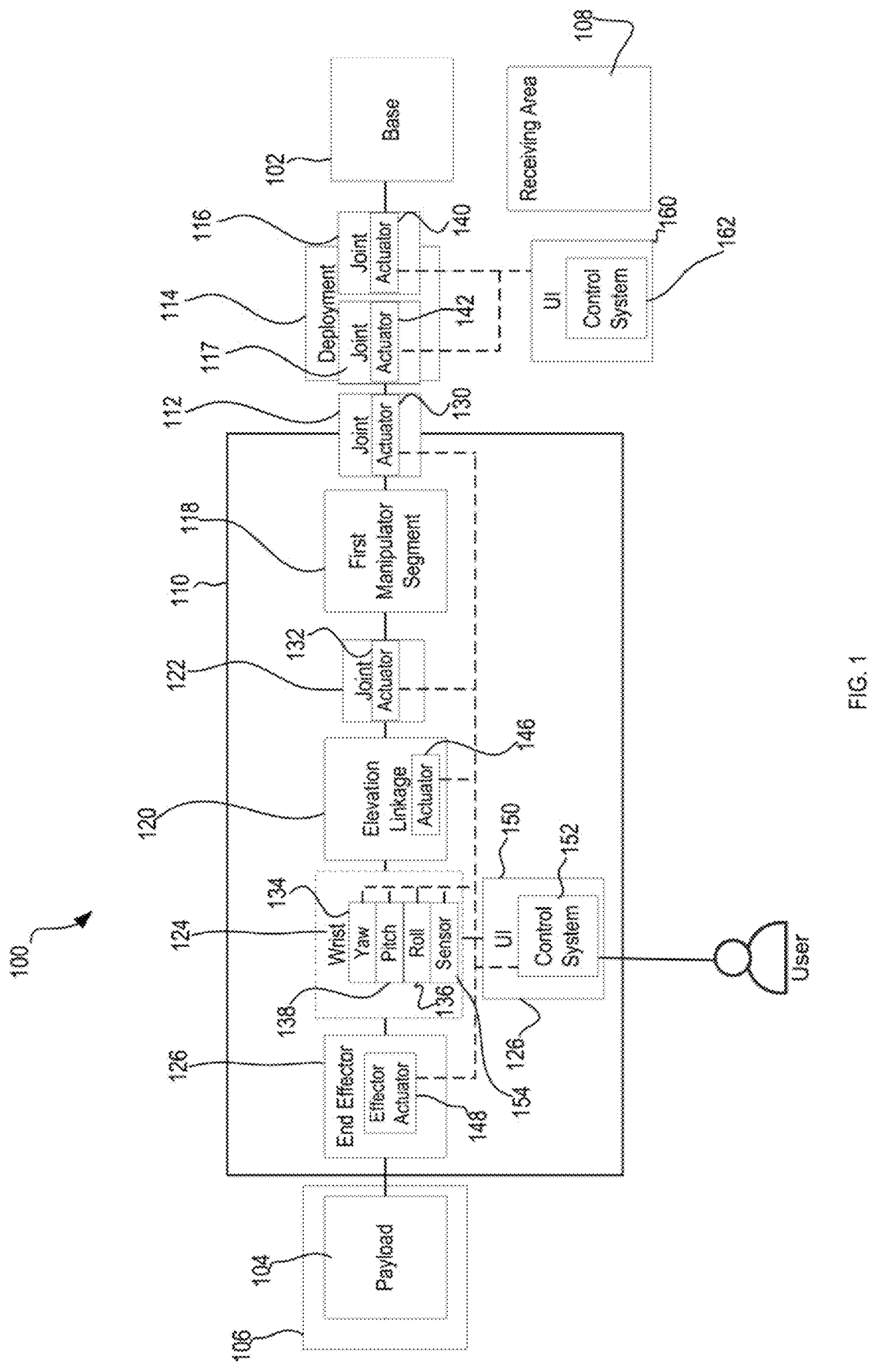
FIG. 1 is a block diagram of one embodiment of a system architecture for a robotic arm.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Embodiments of the present disclosure provide robotic manipulators and other mechanical arms that have a flexible design suitable for deployment in unstructured environments. The mechanical arms, according to some embodiments, fold into a compact storage space on the support structure. Embodiments further include mechanical arms mounted to mobile platforms, such as vehicles. Robotic arms can support multiple modes of operation where each mode of operation requires a different amount of human control to acquire, move, or deposit a payload.

Robotic arms of the present disclosure can include an elevation linkage that allows the robotic arm to change the elevation of the end effector without affecting the orientation of the end effector. The elevation linkage can include a gravity compensating spring that asserts a lift force opposing the gravitational load force. The attachment point of the spring is dynamically adjustable to adjust the lift force provided. The use of an elevation link reduces or eliminates the need for powerful and heavy actuators to oppose the gravity load vector. Furthermore, the attachment points of the gravity compensating spring can be locked using a zero-power mechanism. As such, less power is required when manipulating a payload.

Embodiments of can include a robust end effector that grasps objects radially. The end effector may provide passive grasping. That is, the end effector may include a zero-power mechanism to hold a gripper in a closed (gripping) position. According to one embodiment, the end effector includes a cam mechanism that can hold the gripper closed without requiring power. The cam mechanism may be used in cooperation with springs or other mechanisms that further hold the gripper closed. The end effector may also provide mechanically limited clamping force to prevent damage to payloads.

Robotic arms may employ a variety of kinetic chains. For example, one embodiment comprises a Y, Y, Y, E kinetic chain prior to the wrist, where Y is yaw and E is elevation. Other embodiments include a Ys, R, P, Y, Y, E kinetic chain prior to the wrist, where Ys is skewed yaw, R is roll and P is pitch. These kinetic chains facilitate easy deployment and storage. Further, the R, P portion of the chain provides for self-leveling and self-aligning deployment of a manipulator in which the manipulator is leveled with the surrounding ground and any elevation linkages are aligned with respect to gravity.

Links of the robotic arms may be formed of materials having desired properties. In some embodiments, links between the mechanical ground and elevation link prioritize stiffness. For example, such links may be formed from steel tubes (e.g., 4000 series steel). The links of the elevation linkage may prioritize lightness. For example, the links of the elevation link may be formed of aluminum. It will be appreciated though that steel and aluminum are provided simply as examples and robotic arms can be formed of any materials suitable for the tasks for which the robotic arms are to be deployed.

FIG. 1 is a block diagram of one embodiment of a system architecture for a robotic arm 100 mounted to a base 102. Robotic arm 100 is adapted to acquire payload 104 from a payload acquisition area 106, move payload 104, and deposit payload 104 at a payload destination 108. Base 102 can comprise any suitable structure that is capable of supporting robotic arm 100 and its expected payloads. Examples include, but are not limited to, fixed structures (e.g., buildings or fixed support stands), field-deployable stands that can be redeployed at various locations as needed, and mobile platforms (e.g., vehicles or other mobile platforms).

The body of a robotic arm 100 includes a plurality of links that are interconnected at joints. The links span between joints and are typically rigid bodies—that is, bodies that can be modeled as rigid bodies when describing the kinematic structure of the robot. Thus, the term "link" generally refers to a body that spans between joints but does not itself include intermediate joints. The joints connect links or segments and provide and constrain relative motion between the links or segments. Example joints include, but are not limited to, prismatic (linear joints) that allow relative linear motion between components, revolute joints (for example, rotational joints, twisting joints and revolving joints) that allow relative angular motion between links about an axis, and spherical joints that allow relative angular motion of links about a point. According to some embodiments, a mechanical arm may be implemented as a jointed-arm robot that includes a joint drive system to drive the joints.

Figure 3:
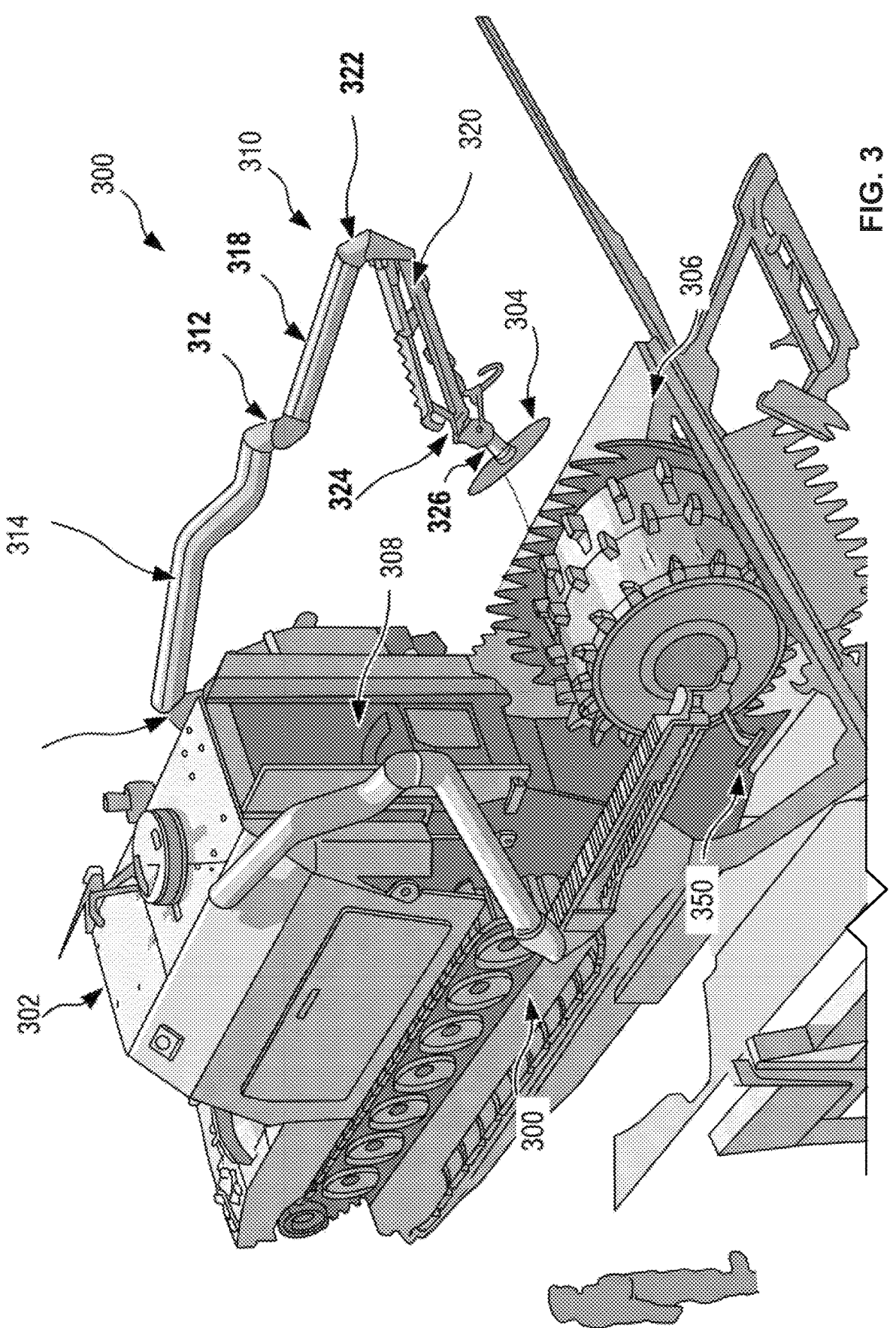
FIG. 3 is a diagrammatic representation of one embodiment of a robotic arm system loading a vehicle.

Robotic arm 100 includes a manipulator 110 designed to manipulate the position and orientation of payload 104 in a three-dimensional (3-D) spatial environment (workspace). Manipulator 110 is connected to a support structure by a first joint 112 that allows manipulator 110 to move relative to the support structure. In other embodiments, robotic arm 100 includes a deployment system 114 to which manipulator 110 is connected by joint 112 which provides for movement of manipulator 110 relative to deployment system 114 (and hence base 102). For example, FIG. 3 illustrates an embodiment in which an embodiment of joint 112 (e.g., joint 312) connects the manipulator to a deployment link and provides for movement of the manipulator relative to the deployment link (and hence base 102).

In general, deployment system 114 is used to deploy and support manipulator 110 at the workspace but remains fixed relative to base 102 as manipulator 110 manipulates payload 104, though some adjustments of deployment system 114 may be made to reposition or reorient manipulator 110 as it manipulates payload 104. Deployment system 114 comprises a deployment joint 116 that acts as a base joint to connect deployment system 114 to base 102 and one or more deployment links and additional joints to interconnect the links between deployment joint 116 and joint 112. Deployment joint 116 and additional deployment joints, if present, allow for relative movement of the deployment links so that manipulator 110 can be positioned at the workspace. In some embodiments, deployment system 114 includes leveling joints 117 to orient manipulator 110 relative to the workspace and even more particularly joints to level manipulator 110 and orient an elevation linkage with respect to the gravity vector.

Manipulator 110 comprises a first segment 118 and a second segment 120 connected at joint 122, a wrist 124 coupled to second segment 120 and an end effector 126 coupled to wrist 124 (joints and links of wrist 124 and end effector 126 are not shown separately). Joint 122 provides for relative motion of second segment 120 relative to first segment 118. Wrist 124 provides one or more degrees of freedom (DoF) to allow end effector 126 to move relative to second segment 120.

End effector 126 is adapted for the task for which manipulator 110 is deployed. For example, according to one embodiment, end effector 126 comprises a gripper for holding a payload. In an even more particular embodiment, end effector 126 comprises a gripper adapted to grip a payload 104 that has a cylindrical outer profile at the portion of the payload grabbed by end effector 126. In other embodiments, the end effector comprises other types of tools.

Each of joint 112, 116, 117, 122, wrist 124 and end effector 126 includes one or more prismatic, revolute joints, spherical joints or other types of joints that allow for relative motion of manipulator 110 to position and orient end effector 126. In other words, each of joint 112, 116, 117, 122, wrist 124 and end effector 126 includes one or more joints to allow a desired linear motion, angular motion, or a combination thereof.

According to one embodiment, first segment 118 and second segment 120 are adapted for positioning end effector 126 in the 3-D workspace, and can thus be referred to as positioning segments, and wrist 124 is adapted for orienting end effector 126. For example, in accordance with one embodiment, joint 112 and joint 122 are yaw joints that allow relative angular motion of first segment 118 and second segment 120 about vertical axes of rotation without changing the orientation of end effector 126, while wrist 124 provides for wrist yaw, wrist roll, and wrist pitch to orient end effector 126 in the workspace. Although only two positioning segments are shown in FIG. 1, it is expressly noted that manipulator 110 may include one or more additional segments, joints and actuators. For example, manipulator 110 may include one or more intermediate segments, joints and actuators between first segment 118 and second segment 120.

According to embodiment, one or more segments of manipulator 110 comprises an elevation linkage that allows for relative vertical translation of one end of the linkage relative to the other end of the linkage. In one embodiment, the elevation linkage is a parallelogram four-bar linkage that includes a gravity compensating spring to oppose the gravitational load force. While, in FIG. 1, second segment 120 is illustrated as the elevation linkage, it is noted that first segment 118 (or other segment in the chain) can be an elevation linkage in addition to (or instead of) second segment 120. However, it will be appreciated that an elevation linkage may be relatively weak with respect to torsional twisting loads. To minimize the torsional twisting loads on the elevation linkage, some embodiments include only a single elevation linkage positioned as the last arm segment before the wrist. In such embodiments, the maximum twisting torque that a payload being manipulated by the manipulator is minimized, thereby minimizing the torsional twisting load on the elevation linkage. Furthermore, minimizing the number of elevation linkages reduces the complexity of the arm.

Manipulator 110 includes actuators to drive motion of the manipulator 110 or adjust manipulator 110. For example, joint 112 includes actuator 130, joint 122 includes actuator 132, wrist 124 includes wrist yaw actuator 134, wrist roll actuator 136, and wrist pitch actuator 138, joint 116 includes actuator 140, and joint 117 includes an actuator 142. Additionally, each elevation linkage includes a spring adjustment actuator 146 to adjust a gravity compensating spring and end effector 126 includes an end effector actuator 148 to open and close a gripper or otherwise actuate a tool. While only one actuator is illustrated for each of joint 112, 116, 117, 122, the elevation link and end effector 126, each joint may include actuators for each DoF provided by the joint or may otherwise provide multiple actuators, an elevation linkage may include multiple actuators, and end effector 126 may include multiple actuators. The various actuators may include, for example, hydraulic or electromagnetic actuators. In a more particular embodiment, each of the actuators is an electromagnetic actuator.

A user interface 150 is provided to allow a user to control robotic arm 100. While, in the illustrated embodiment, user interface 150 is coupled to manipulator 110 at wrist 124, the user interface 150 for controlling manipulator 110 may be located elsewhere, including but not limited to, at a location remote from manipulator 110. The user interface 150 comprises or is connected to an electronic control system 152 that incorporates processing to facilitate control of manipulator 110. Electronic control system 152 delivers control signals to control the actuators of actuator driven joints, elevation linkages and end effector 126 based on inputs received via user interface 150, feedback from sensors, or other inputs.

According to one embodiment, a force/torque sensor 154 is located within the wrist portion of the manipulator 110 to directly measure the force/torque of a payload. The output of the force/torque sensor 154 is supplied to the electronic control system 152, which is coupled to the spring adjustment actuator 146. When the force/torque sensor 154 senses a change in payload, the electronic control system 152 supplies a signal to the spring adjustment actuator 146 to alter the position of the gravity compensating spring and adjust the lifting force needed to compensate for the change in payload. When active feedback control is used, the position of the gravity compensating springs is dynamically adjusted in real-time, so that manipulator 110 is nearly perfectly gravity compensated regardless of payload. Electronic control system 152 may utilize other sensors (e.g., position sensors, torque sensors, or other sensors) to control the actuators of manipulator 110. In addition to (or instead of) allowing for human control of manipulator 110, electronic control system 152 may fully control manipulator 110 during operations to pick up, move, and deposit payload 104 without recourse to human control. Thus, in some embodiments, manipulator 110 supports a fully autonomous mode of operation.

In some cases, it may not be convenient or possible to control deployment of manipulator 110 using the same user interface 150 that is used to control manipulator 110 during manipulating a payload. Thus, in some embodiments, a second user interface 160 and electronic control system 162 are provided to control deployment of robotic arm 100.

While embodiments of FIG. 1, have generally been discussed in terms of a robotic arm with actuator-driven joints, in some embodiments one or more of the joint 116, joint 117, joint 112, joint 122, the wrist yaw joint, the wrist roll joint or the wrist pitch joint are not actuator driven, but is, instead, are driven by a human operator moving the links using human muscle power.

Figure 2:
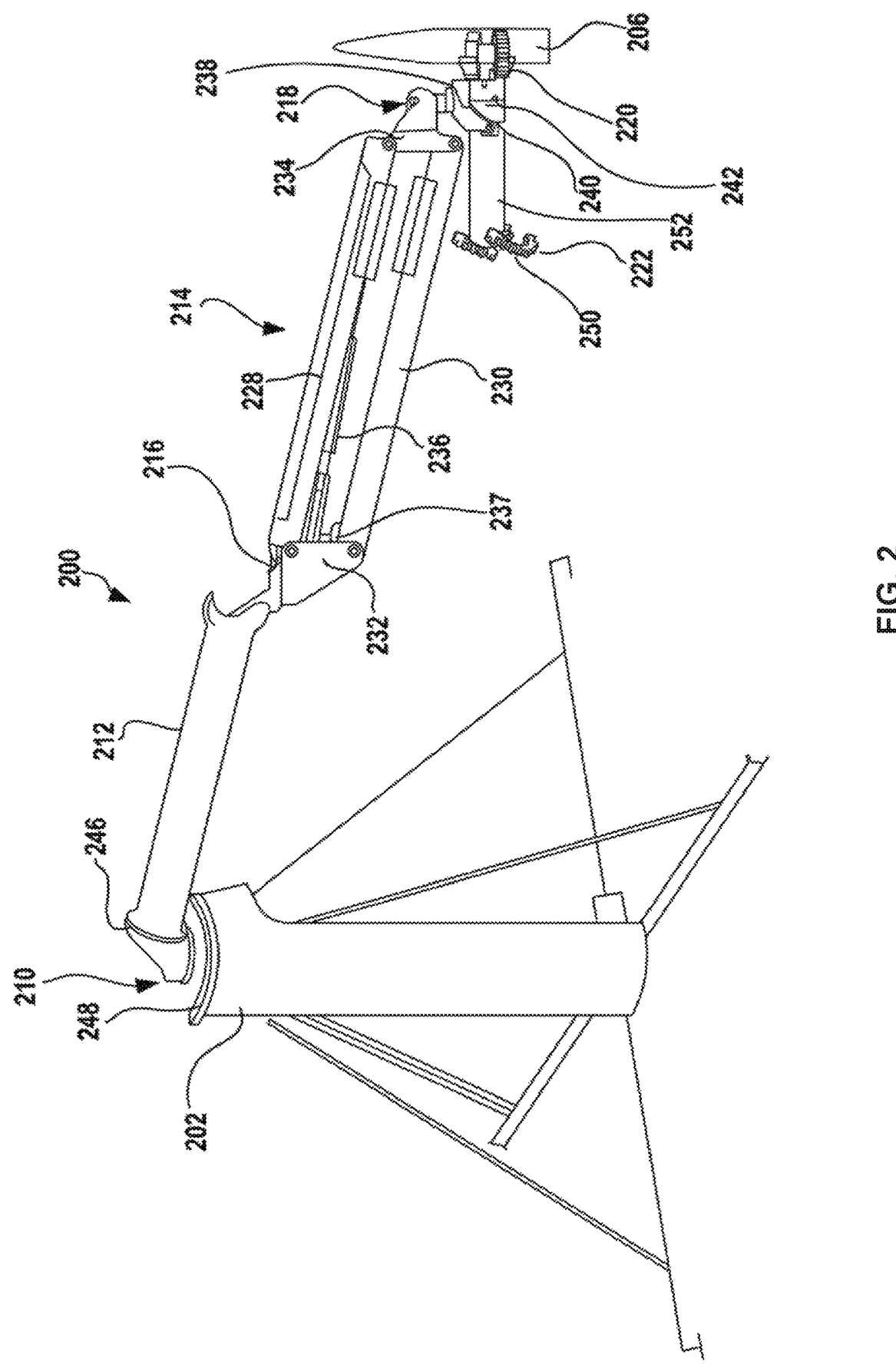
FIG. 2 is a diagrammatic representation of one embodiment of a robotic manipulator.

FIG. 2 is a diagrammatic representation of one embodiment of a robotic manipulator 200. Robotic manipulator is mounted to a base 202, which acts as a mechanical ground for manipulator 200. In the example of FIG. 2, base 202 is a field deployable stand. Base 202 is provided simply as an example and one or more robotic arms (e.g., robotic manipulators 200) can be mounted on other types of vehicles, fixed structures (e.g., buildings or fixed support stands), field-deployable stands, or other types of structures. Manipulator 200 is adapted to pick up a payload 206 at a payload acquisition area, carry payload 206 from the payload acquisition area to a payload destination, and deposit payload 206 at the payload destination. In the illustrated embodiment of FIG. 2, payload 206 has a generally cylindrical profile at the area where manipulator 200 grips the payload.

Manipulator 200 is connected to base 202 by a first joint 210 that allows manipulator 200 to move relative to the base 202. Manipulator 200 comprises a first segment 212 and a second segment 214 connected at joint 216, a wrist 218 coupled to second segment 214, an end effector 220 coupled to wrist 218, and a user interface 222 coupled to wrist 218. Joint 216 provides for relative motion of second segment 214 relative to first segment 212.

First segment 212 and second segment 214 are adapted for positioning end effector 220 in the 3-D workspace. Although only two positioning segments are shown in FIG. 2, it is expressly noted that manipulator 200 may include one or more additional segments, joints and actuators. For example, manipulator 200 may include one or more intermediate segments, joints and actuators between first segment 212 and second segment 214.

According to one embodiment, first segment 212 is a link, such as a metal tube, though first segment 212 may have different form factors or be formed of different materials in other embodiments, spanning between joint 210 and joint 216. Further, second segment 214 is an elevation linkage that comprises a four-bar linkage formed by (upper link 228, lower link 230, end link 232, end link 234) connected at four 1-DoF joints as a parallelogram. While second segment 214 is illustrated as the elevation linkage in FIG. 2, it is noted that first segment 212 (or other segment in the chain) can be an elevation linkage in addition to (or instead of) second segment 214.

The parallelogram structure of an elevation linkage allows translation but not rotation of parallel links relative to each other. For example, with second segment 214 oriented as illustrated in FIG. 2, link 234 can be raised and lowered relative to link 232 without changing relative orientation and, hence, without changing the orientation of wrist 218 and end effector 220. A gravity compensating spring 236 is coupled to the parallelogram structure between two links of the four-bar linkage mechanism. In general, gravity compensating spring 236 provides a lifting force that opposes the gravitational load force on the manipulator. A spring adjustment actuator 237 adjusts the attachment point of gravity compensating spring 236 which changes the elongation or compression of gravity compensating spring 236 and thereby changes the lifting force provided by gravity compensating spring 236.

As discussed, manipulator 200 includes a number of joints. In accordance with one embodiment, joint 210 comprises a 1-DoF revolute joint that allows first segment 212 to rotate relative to base 202 and joint 216 comprises a 1-DoF revolute joint that allows second segment 214 to rotate relative to first segment 212. More particularly, joint 210 comprises a manipulator yaw joint that allows manipulator 200 to sweep relative to base 202 and joint 216 comprises an elevation yaw joint that allows the elevation linkage to sweep relative to first segment 212. Wrist 218, in the illustrated embodiment, is a 3-DoF wrist that includes a wrist yaw joint 238, a wrist roll joint 240, and a wrist pitch joint 242. Wrist yaw joint 238, wrist roll joint 240, and wrist pitch joint 242 respectively provide for yaw, roll, and pitch in a wrist coordinate system. In one embodiment, one or more of joint 210, joint 216, or wrist yaw joint 238 are joints that allow 360 degrees of rotation, such as slip ring joints. In an even more particular embodiment, each of joint 210, joint 216, and wrist yaw joint 238 is a joint that allows 360 degrees of rotation. Other joints may also allow 360 degrees of rotation or other desired ranges of rotation.

If manipulator 200 is mounted to a sloped mounting surface 248, the yaw axis of joint 210 would be skewed from the vertical axis in a world coordinate system. Without a mechanism to compensate for a skewed yaw axis at joint 210, gravity compensating spring 236 would not be aligned with the gravity vector—or, put another way, the proportion of the vertical component of the force applied by gravity compensating spring 236 would be reduced. Furthermore, the weight of payload 206 could lead to bending or twisting of the links.

To address this issue, some embodiments include one or more leveling joints to compensate for the angle of surface 248. For example, manipulator 200 can include a roll joint to roll the second segment 214 so that gravity compensating spring 236 is aligned with the gravity vector. As an even more particular example, the joint that connects manipulator 200 to base 202 may comprise a series of 1-DoF joints—that includes a manipulator yaw joint 210 that provides for yaw of first segment 212 relative to base 202 and a manipulator roll joint 246 that provides for roll of first segment 212 about its link axis. Roll joint 246 allows manipulator 200 to be rolled to a desired orientation and, in particular, an orientation that maximizes the proportion of force provided by gravity compensating spring 236 that acts to oppose the gravitational load force.

Each of joint 210, joint 216, wrist yaw joint 238, wrist roll joint 240, wrist pitch joint 242, and manipulator roll joint 246 may include a joint drive system such as a hydraulic or electric actuator (e.g., as illustrated by actuator 130, actuator 132, wrist yaw actuator 134, wrist roll actuator 136, and wrist pitch actuator 138 of FIG. 1). In one embodiment, joint 210, joint 216, wrist yaw joint 238, wrist roll joint 240, wrist pitch joint 242, and manipulator roll joint 246 are implemented using electromagnetic rotary actuators that include an electric motor coupled to a gearbox or drivetrain.

Manipulator 200 includes a user interface 222 to allow a user to control manipulator 200. In the illustrated embodiment, user interface 222 comprises a control yoke 250 coupled to wrist 218 by a column 252. Pushing the yoke forward and pulling the yoke back parallel to the axis of column 252 induces yaw at joint 210 or joint 216, moving yoke 250 sideways in a plane to which the yaw axis of wrist yaw joint 238 is orthogonal induces yaw at wrist 218, rolling the yoke about the axis of column 252 induces roll at wrist 218 and moving the yoke in a plane to which the pitch axis of wrist pitch joint 242 is orthogonal induces pitch at wrist 218.

Yoke 250 includes or is coupled to an electronic control system (e.g., electronic control system 152) such that movement of yoke 250 controls actuators at various joints. In addition, or in the alternative, yoke 250 may include various buttons, triggers, or other inputs that generate signals to control various actuators. For example, triggers or other controls are used to control spring adjustment actuator 237 to increase or decrease the lifting force provided by gravity compensating spring 236, to control the end effector actuator (e.g., end effector actuator 148) to control opening and closing of end effector 220, and to control the actuator of the roll joint (e.g., joint 246) to align the elevation linkage in the appropriate orientation.

As mentioned, in some embodiments, yoke 250 includes a control that allows the operator to adjust gravity compensating spring 236 to compensate for payload 206. In addition, or in the alternative, a feedback controller is used to adjust gravity compensating spring 236. According to one embodiment, wrist 218 includes a force/torque sensor (e.g., force/torque sensor 154 of FIG. 1) to measure the force/torque of payload 206. The output of the force/torque sensor is supplied to the electronic control system, which is coupled to the spring adjustment actuator 237. When the force/torque sensor senses a change in payload, the electronic control system supplies a signal to spring adjustment actuator 237 to alter the position of the gravity compensating springs and adjust the lifting force needed to compensate for the change in payload.

User interface 222 is just one example of a user interface that can be used. A variety of user interfaces can be used to control manipulator 200. For example, an electronic control system 152, such as a computer system, can provide a graphical user interface to allow the user to control manipulator 200.

In some embodiments, an electronic control system (e.g., electronic control system 152) provides for autonomous control of manipulator 200. Further, in some embodiments, manipulator 200 can operate in multiple modes of operation such as a mode of operation in which a human operator controls manipulator 200 during an operation to pick up, move, and deposit a payload and a second mode of operation in which a control system autonomously controls manipulator 200 without recourse to human control.

Furthermore, in some embodiments, one or more of the joint 210, joint 216, joint 238, joint 240 or joint 242 are not driven by an actuator, but are instead, driven by a human operator moving the links using human muscle power.

FIG. 3 is a diagrammatic representation of a system comprising a pair of robotic arms 300 mounted to a vehicle 302, which acts as a mechanical ground for the robotic arms 300. Each robotic arm 300 is adapted to acquire payload 304 from a payload acquisition area 306, move payload 304, and deposit payload 304 at a payload destination 308. In the embodiment of FIG. 3, the payload destination 308 comprises a receiver table adapted to hold explosive shells or other projectiles. The receiver table can slide out of vehicle 302 to receive the projectiles and slide into vehicle 302 so that the projectiles can be loaded onto storage racks. Vehicle 302 is provided simply for example and one or more robotic arms 300 can be mounted on other types of vehicles, fixed structures (e.g., buildings or fixed support stands), field-deployable stands, or other types of structures.

Robotic arm 300 includes a manipulator 310 designed to manipulate the position and orientation of payload 304 in a 3-D workspace. Manipulator 310 is connected to a deployment system by a first joint 312 that allows manipulator 310 to move relative to a deployment system. In FIG. 3, the deployment system comprises a deployment link 314 connected to vehicle 302 at a deployment joint 316. Deployment link 314 allows arm 300 to swing from a stowed configuration in which arm 300 is stowed against the side of vehicle 302 to a deployed configuration in which manipulator 310 is positioned at the workspace. In one embodiment, deployment link is adapted to deploy manipulator 310 to the center of the workspace.

In the illustrated embodiment, joint 316 is 1-DoF joint that provides for angular motion of deployment link 314 relative to vehicle 302 to deploy manipulator 310 to a workspace and joint 312 is 1-DoF joint that provides for angular motion of manipulator 310 relative to deployment link 314. More particularly, joint 316 is a deployment yaw joint that provides for relative angular motion of deployment link 314 relative to the mechanical ground (vehicle 302) about a vertical axis and joint 312 is a manipulator yaw joint that provides for relative angular of manipulator 310 relative to deployment link 314 about a vertical axis. In other embodiments, one or more of joint 312 or joint 316 have additional degrees of freedom.

Manipulator 310 further comprises a first segment 318 and a second segment 320 connected at joint 322, a wrist 324 coupled to second segment 320 and an end effector 326 coupled to wrist 324. In the illustrated embodiment, joint 322 is a 1-DoF elevation link yaw joint that provides for angular motion of second segment 320 relative to first segment 318 about a vertical axis of rotation. In other embodiments, joint 322 is a multiple-DoF joint. Wrist 324 provides one or more degrees of freedom to allow end effector 326 to move relative to second segment 320. In the illustrated embodiment, wrist 324 is a 3-DoF wrist. In one embodiment, one or more of joint 312, joint 322, or the wrist yaw joint are joints that allow 360 degrees of rotation, such as slip ring joints. In an even more particular embodiment, each of joint 312, joint 322, and the wrist yaw joint is a joint that allows 360 degrees of rotation. Other joints may also allow 360 degrees of rotation or other desired ranges of rotation.

End effector 326 is adapted for the task for which manipulator 310 is deployed. In the illustrated embodiment, end effector 326 comprises a gripper adapted to grip projectiles that have a cylindrical outer profile at the area at which the projectiles are gripped.

According to one embodiment, deployment link 314 and manipulator segment 318 are links such as metal tubes, though deployment link and manipulator segment 318 may have different form factors or be formed of different materials in other embodiments. Deployment link 314 is used to deploy manipulator 310 to a workspace. First segment 318 and second segment 320 are adapted for positioning end effector 326 in the 3-D workspace, and wrist 324 is adapted for orienting end effector 326. Although only two positioning segments are shown in FIG. 3 for each robotic arm, it is expressly noted that the manipulator 310 of each arm 300 may include one or more additional segments, joints and actuators. For example, manipulator 310 may include one or more intermediate segments, joints and actuators between first segment 318 and second segment 320. Moreover, while second segment 320 is illustrated as the elevation linkage in FIG. 3, it is noted that first segment 318 (or other segment in the chain) can be an elevation linkage in addition to (or instead of) second segment 320. In some embodiments, each positioning segment is an elevation linkage. In other embodiments, manipulator 310 comprises a combination of rigid links and elevation linkages.

Each robotic arm 300 includes actuators to drive motion of arm 300 or adjust manipulator 310. For example, joint 316 includes an actuator (e.g., actuator 140 of FIG. 1), joint 312 includes an actuator (e.g., actuator 130 of FIG. 1), joint 322 includes an actuator (e.g., actuator 132 of FIG. 1), and wrist 324 includes yaw, pitch and roll actuators (e.g., wrist yaw actuator 134, wrist roll actuator 136, and wrist pitch actuator 138 of FIG. 1). Additionally, each elevation linkage includes a spring adjustment actuator (e.g., spring adjustment actuator 146 of FIG. 1) to adjust a gravity compensating spring and end effector 326 includes an end effector actuator (e.g., end effector actuator 148 of FIG. 1) to open and close a gripper or otherwise actuate a tool. The various actuators may include, for example, hydraulic or electromagnetic actuators. In a more particular embodiment, each of the actuators is an electromagnetic actuator.

The deployment link 314 and joint 316 are adapted such that deployment link 314 is rotatable from a deployment position to a storage position. In the storage position, deployment link 314 extends forward alongside a respective surface of vehicle 302. Joint 312 and first segment 318 are adapted such that first manipulator 318 is rotatable to a respective storage position under deployment link 314 and joint 322 and second segment 320 are adapted such that second segment 320 is rotatable to a respective storage position under first segment 318. In a stowed configuration then, deployment link 314, first segment 318, and second segment 320 are relatively flat against the side of vehicle 302 with their long axes generally parallel to the longitudinal axis of vehicle 302 in some embodiments.

Each robotic arm 300 includes a user interface 350 to allow a user to control manipulator 310. While, in the illustrated embodiment, user interface 350 is coupled to manipulator 310 at wrist 324, the user interface 350 for controlling manipulator 310 may be located elsewhere, including but not limited to, at a location remote from manipulator 310. The user interface 350 comprises or is connected to an electronic control system (e.g., electronic control system 152) that incorporates sensors and processing to facilitate control of manipulator 310. The electronic control system delivers control signals to control the actuators of actuator driven joints, elevation linkages and end effector 326 based on inputs received via user interface 350, feedback from sensors, or other inputs.

As discussed below, an elevation linkage, such as second segment 320, may include a gravity compensating spring that provides a lifting force opposed to a gravitational load force. According to one embodiment, a force/torque sensor (e.g., force/torque sensor 154 of FIG. 1) may be located within the wrist portion of the manipulator 310 to directly measure the force/torque of a payload. The output of the force/torque sensor is supplied to the electronic control system, which is coupled to the spring adjustment actuator. When the force/torque sensor senses a change in payload, the electronic control system supplies a signal to the spring adjustment actuator to alter the position of the gravity compensating spring and adjust the lifting force needed to compensate for the change in payload.

A portion of the user interface for deploying a manipulator 310 may be separate from the user interface for controlling a manipulator 310. For example, controls for deploying and stowing each manipulator 310 may be located in the cab of the vehicle or the storage bay of the vehicle, whereas the controls for controlling manipulator 310 to manipulate a payload 304 are coupled to each wrist 324. In some embodiments, the controls for controlling manipulator 310 once deployed may be similar to those discussed in conjunction with FIG. 2.

Electronic control system (e.g., electronic control system 152), in some embodiments, provides for autonomous control of manipulator 310. Further, in some embodiments, robotic arm 300 can operate in multiple modes of operation such as a mode of operation in which a human operator controls manipulator 310 during an operation to pick up, move, and deposit a payload and a second mode of operation in which a control system autonomously controls manipulator 310 without recourse to human control.

Furthermore, in some embodiments, one or more of the joint 312, joint 316, or joint 322, the wrist yaw joint, the wrist roll joint, or the wrist pitch joint are not driven by an actuator, but are instead, driven by a human operator moving the links using human muscle power.

Figure 4B:
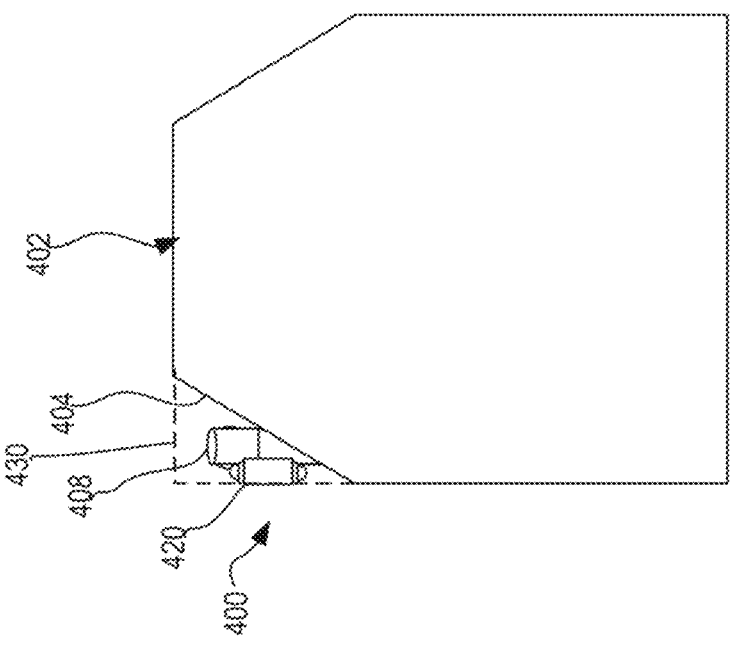
FIG. 4B is a diagrammatic representation of one embodiment of an end view of the robotic arm in a stowed configuration.
Figure 4A:
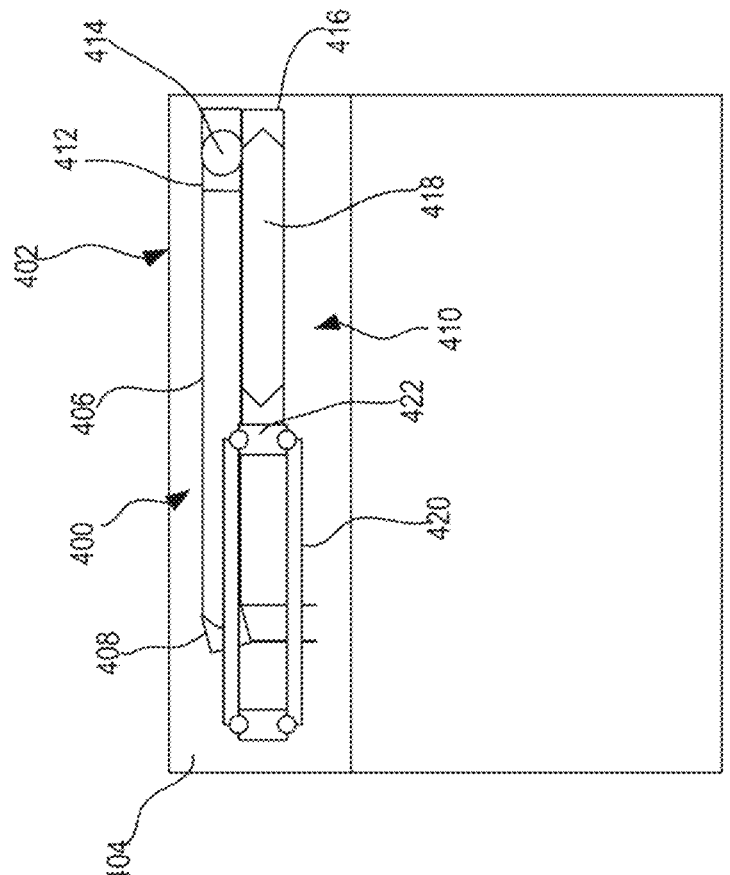
FIG. 4A is a diagrammatic representation of a side view of one embodiment of a robotic arm mounted to a base with the robotic arm in a stowed configuration.
Figure 4C:
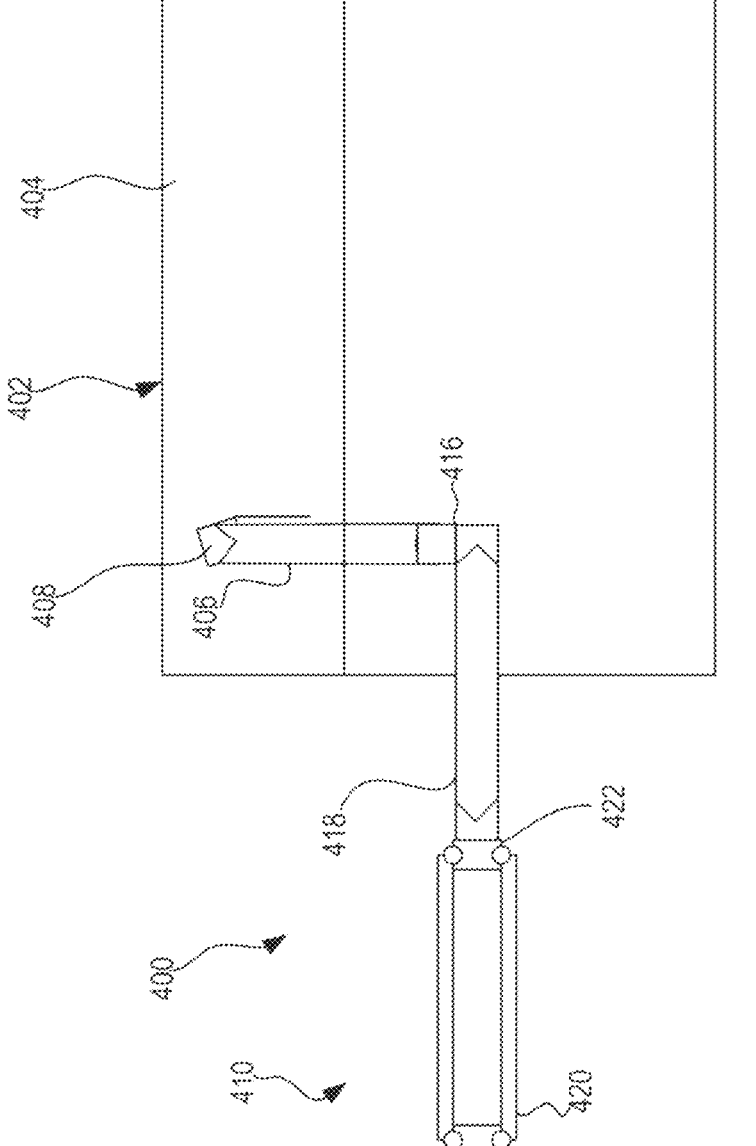
FIG. 4C is a diagrammatic representation of one embodiment of the robotic arm in a first deployed position.
Figure 4D:
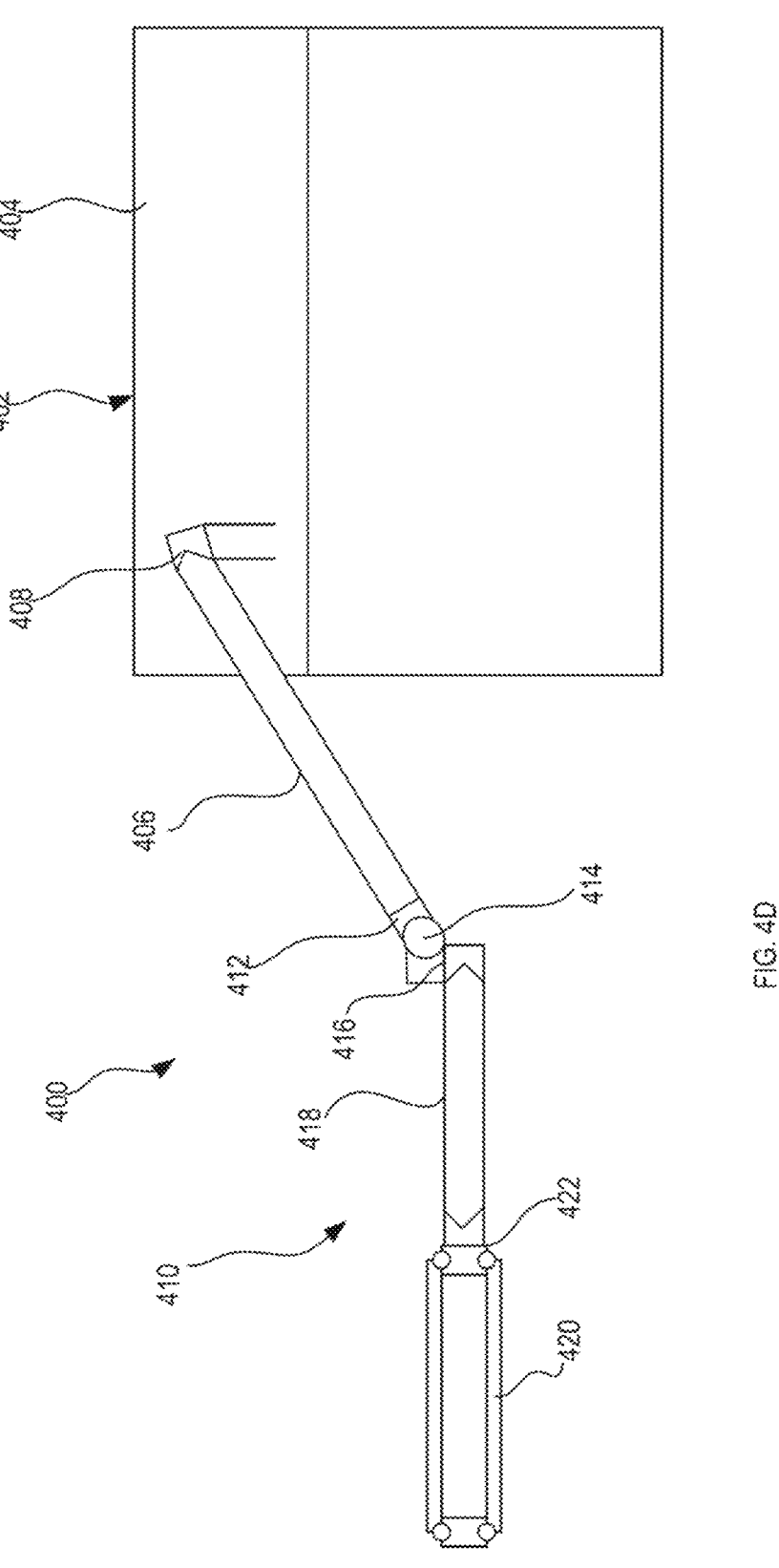
FIG. 4D is a diagrammatic representation of one embodiment of the robotic arm in a fully deployed position.

With reference to FIG. 4A, FIG. 4B, FIG. 4C and FIG. 4D, FIG. 4A is a diagrammatic representation of a side view of one embodiment of a robotic arm 400 mounted to a base 402 with robotic arm 400 in a stowed configuration, FIG. 4B is a diagrammatic representation of one embodiment of an end view of robotic arm 400 in a stowed configuration, FIG. 4C is a diagrammatic representation of a side view of one embodiment of a robotic arm 400 as it is being deployed, and FIG. 4D is a diagrammatic representation of a side view of one embodiment of robotic arm 400 in a deployed configuration. In the illustrated embodiment, base 402 includes a sloped side portion 404 against which robotic arm 400 can be stowed.

Robotic arm 400 includes a deployment link 406 that is mounted to base 402 at a revolute joint 408. In the illustrated embodiment, joint 408 is a 1-DoF deployment yaw joint that provides for angular motion of deployment link 406 relative to base 402. In other embodiments, joint 408 is a multiple-DoF joint. In any case, joint 408 provides a skewed yaw axis that is angularly displaced from the vertical axis in the world coordinate system. The link axis or long axis of deployment link 406, however, is angled relative to the skewed yaw axis such that when deployment link 406 is rotated to its stowed position, the long axis of deployment link is horizontal or parallel to the longitudinal axis of base 402 or at another desired angle. For example, in FIG. 4A the link axis of deployment link 406 is both horizontal and parallel to the longitudinal axis of base 402.

Deployment link 406 rotates about the skewed yaw axis to swing a manipulator 410 from a stowed configuration to a deployed configuration in which manipulator 410 is at a desired work area. Deployment link is connected to manipulator 410 by a series of joints including a manipulator roll joint 412, a manipulator pitch joint 414, and a manipulator yaw joint 416.

Roll joint 412 and pitch joint 414 are used to level manipulator 410 and align manipulator 410 in a desired orientation. In particular, roll joint 412 and pitch joint 414 may be used to level manipulator 410 and align manipulator 410 with the gravity vector (e.g., align yaw joint 416 and yaw joint 422 such that the axes of rotation of yaw joint 416 and yaw joint 422 are vertical or so that a gravity compensating spring of an elevation linkage is aligned with gravity (i.e., to maximize the proportion of the force asserted by the gravity compensating spring that acts to oppose the gravitational load force). In some embodiments, roll joint 412 and pitch joint 414 are used during deployment of manipulator 410 but are not actuated or are rarely actuated during manipulation of the payload and can thus be considered deployment joints. In other embodiments, roll joint 412 or pitch joint 414 is regularly used as part of payload manipulation and can be considered part of the manipulator.

Manipulator 410 is designed to manipulate the position and orientation of the payload in a 3-D workspace and may be one embodiment of manipulator 110. Manipulator 410 comprises a first segment 418 and a second segment 420 connected to the first segment 418 by a joint 422. Although not illustrated in FIG. 4A, FIG. 4B, and FIG. 4C, manipulator 410 further comprises a wrist and an end effector (not shown).

In the illustrated embodiment, joint 416 is a 1-DoF manipulator yaw joint that provides for relative angular motion of first segment 418 with respect to deployment link 406 and joint 422 is a 1-DoF elevation link yaw joint that provides for relative angular motion of second segment 420 with respect to first segment 418. In other embodiments, one or more of joint 416 or joint 422 are a multiple-DoF joint. The wrist (not shown) provides one or more degrees of freedom to allow the end effector to move relative to second segment 420. In one embodiment, one or more of joint 416, joint 422, or the wrist yaw joint are joints that allow 360 degrees of rotation, such as slip ring joints. In an even more particular embodiment, each of joint 416, joint 422, and the wrist yaw joint is a joint that allows 360 degrees of rotation. Other joints may also allow 360 degrees of rotation or other desired ranges of rotation.

According to one embodiment, deployment link 406 and first segment 418 are links, such as metal tubes, though deployment link 406 and first segment 418 may have different form factors or be formed of different materials in other embodiments, whereas second segment 420 is an elevation linkage. First segment 418 and second segment 420 are adapted for positioning the end effector in the 3-D workspace. Although only two positioning segments are shown for robotic arm 400, it is expressly noted that the manipulator 410 may include one or more additional segments, joints and actuators. For example, manipulator 410 may include one or more intermediate segments, joints and actuators between first segment 418 and second segment 420. Moreover, while second segment 420 is illustrated as an elevation linkage, it is noted that first segment 418 (or other segment in the chain) can be an elevation linkage in addition to (or instead of) second segment 420. In some embodiments, each positioning link is an elevation linkage. In other embodiments, manipulator 410 comprises a combination of rigid links and elevation linkages.

Robotic arm 400 includes actuators to drive motion of arm 400 or adjust manipulator 410. For example, with further reference to FIG. 1, joint 408 includes an actuator 140, joint 412 includes an actuator 130, joint 414 and joint 416 include actuators 142, joint 422 includes an actuator 132, the wrist includes wrist yaw actuator 134, wrist roll actuator 136, and wrist pitch actuator 138. Additionally, each elevation linkage includes a spring adjustment actuator (e.g., spring adjustment actuator 146) to adjust a gravity compensating spring and the end effector includes an end effector actuator (e.g., end effector actuator 148) to open and close a gripper or otherwise actuate a tool. The various actuators may include, for example, hydraulic or electromagnetic actuators. In a more particular embodiment, each of the actuators is an electromagnetic actuator. Further, user interfaces (e.g., a user interface 150 and user interface 160) are provided for deploying/stowing robotic arm 400 and controlling robotic arm 400 during operation.

Robotic arm 400 has a kinematic chain of Yaw (skewed), Roll, Pitch, Yaw, Elevation prior to the wrist. This kinematic chain allows robotic arm 400 to be fully stowed in a relatively compact space and then be deployed to place the manipulator 410 in a workspace. The roll and pitch DoFs prior to the manipulator allow the manipulator to be leveled and aligned with the gravity vector. Moreover, manipulator 410, and other manipulators described herein, can cover a large work area for its weight and size.

In operation, deployment link 406 is rotated from its stowed position of FIG. 4A and FIG. 4B to the deployed position of FIG. 4D. As deployment link 406 rotates about the skewed yaw axis, the actuators of joint 412 and joint 414 are driven to level manipulator 410 and align the elevation linkage with the gravity vector. In some embodiments then, manipulator 410 can be self-leveling and self-aligning. Joint 416 is driven to rotate manipulator 410 to its starting position in the workspace. In the embodiment illustrated, deployment link 406 deploys manipulator 410 to the center of the 3D workspace.

To stow arm 400, the actuators of joint 408, joint 412, joint 414, and joint 416 are driven to fold arm 400 as illustrated. In one embodiment of a stowed configuration, the long axes of deployment link 406, first segment 418 and second segment 420 lie in parallel planes as illustrated in FIG. 4A. Moreover, as illustrated in FIG. 4B, arm 400 can be fully stowed in a compact space 430 on the side of a vehicle, building or other structure. In some embodiments, storage covers may be used to cover arm 400 while stowed. Further, while FIG. 4A, FIG. 4B, FIG. 4C and FIG. 4D illustrate only one arm 400, other embodiments may include multiple arms 400.

Robotic arm 400 can include a user interface (e.g., user interface 150) to allow a user to control manipulator 410. The user interface comprises or is connected to an electronic control system (e.g., electronic control system 152) that incorporates sensors and processing to facilitate control of manipulator 410. The electronic control system delivers control signals to control the actuators of actuator driven joints, elevation linkages and the end effector based on inputs received via the user interface, feedback from sensors, or other inputs.

As discussed below, an elevation linkage, such as second segment 420 may include a gravity compensating spring that provides a lifting force opposed to a gravitational load force. According to one embodiment, a force/torque sensor (e.g., force/torque sensor 154 of FIG. 1) may be located within the wrist portion to directly measure the force/torque of a payload. The output of the force/torque sensor is supplied to the electronic control system, which is coupled to the spring adjustment actuator. When the force/torque sensor senses a change in payload, the electronic control system supplies a signal to the spring adjustment actuator to alter the position of the gravity compensating spring and adjust the lifting force needed to compensate for the change in payload.

In one embodiment, the portion of the user interface for deploying a manipulator 410 may be separate from the user interface for controlling a manipulator 410. For example, a user interface 160 (FIG. 1) may be provided to control deployment of manipulator 410. In some embodiments, the controls for controlling manipulator 410 once deployed may be similar to those discussed in conjunction with FIG. 2.

In some embodiments, an electronic control system (e.g., electronic control system 152) provides for autonomous control of manipulator 410. Further, in some embodiments, robotic arm 400 can operate in multiple modes of operation such as a mode of operation in which a human operator controls manipulator 410 during an operation to pick up, move, and deposit a payload and a second mode of operation in which a control system autonomously controls manipulator 410 without recourse to human control.

Furthermore, in some embodiments, one or more of the joint 408, joint 412, joint 414, joint 416, joint 422, the wrist yaw joint, the wrist roll joint, or the wrist pitch joint are not driven by an actuator, but are instead, driven by a human operator moving the links using human muscle power.

Figure 5A:
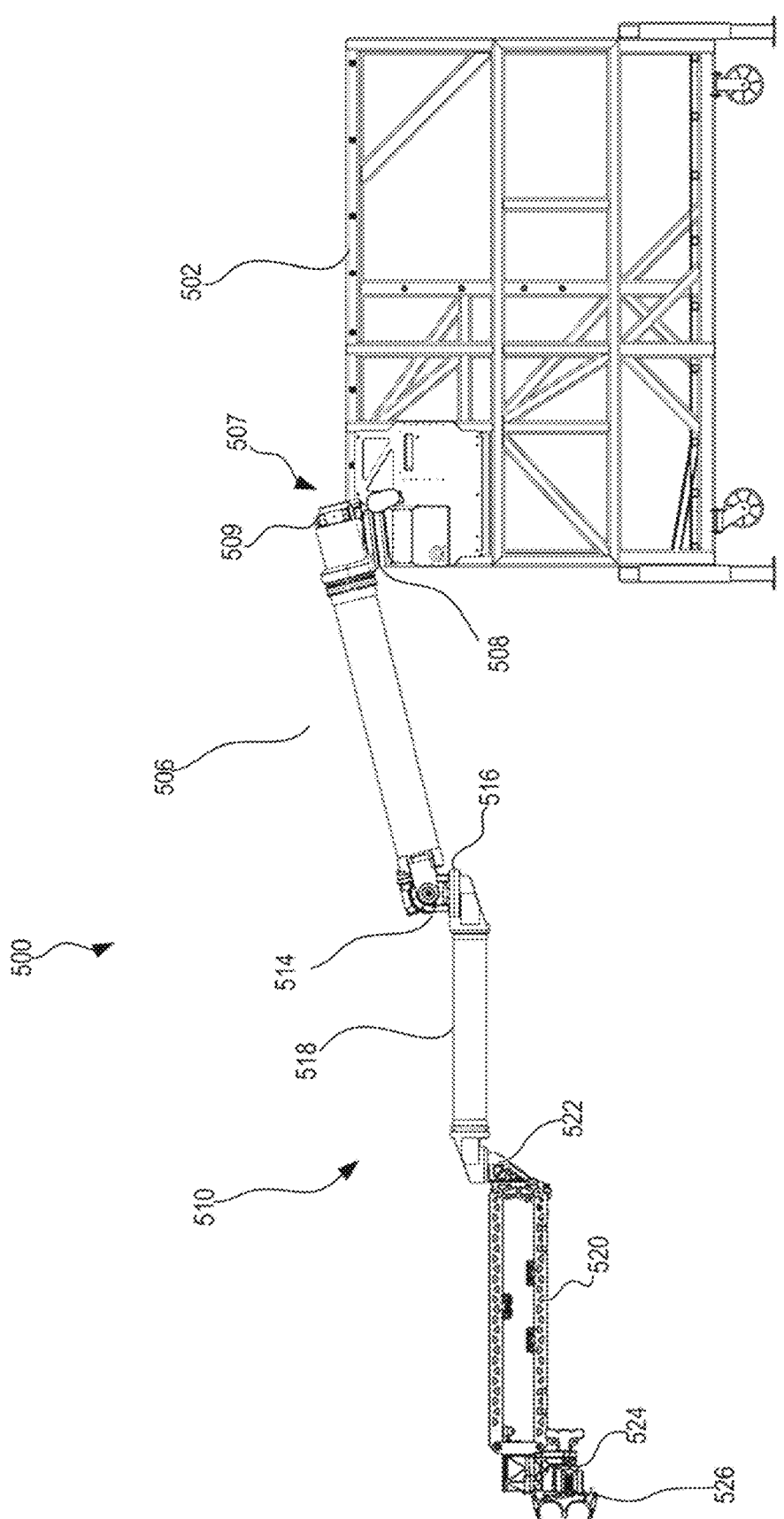
FIG. 5A is a diagrammatic representation of a side view of one embodiment of a robotic arm mounted to a base 502 with the robotic arm in a deployed configuration.
Figure 5B:
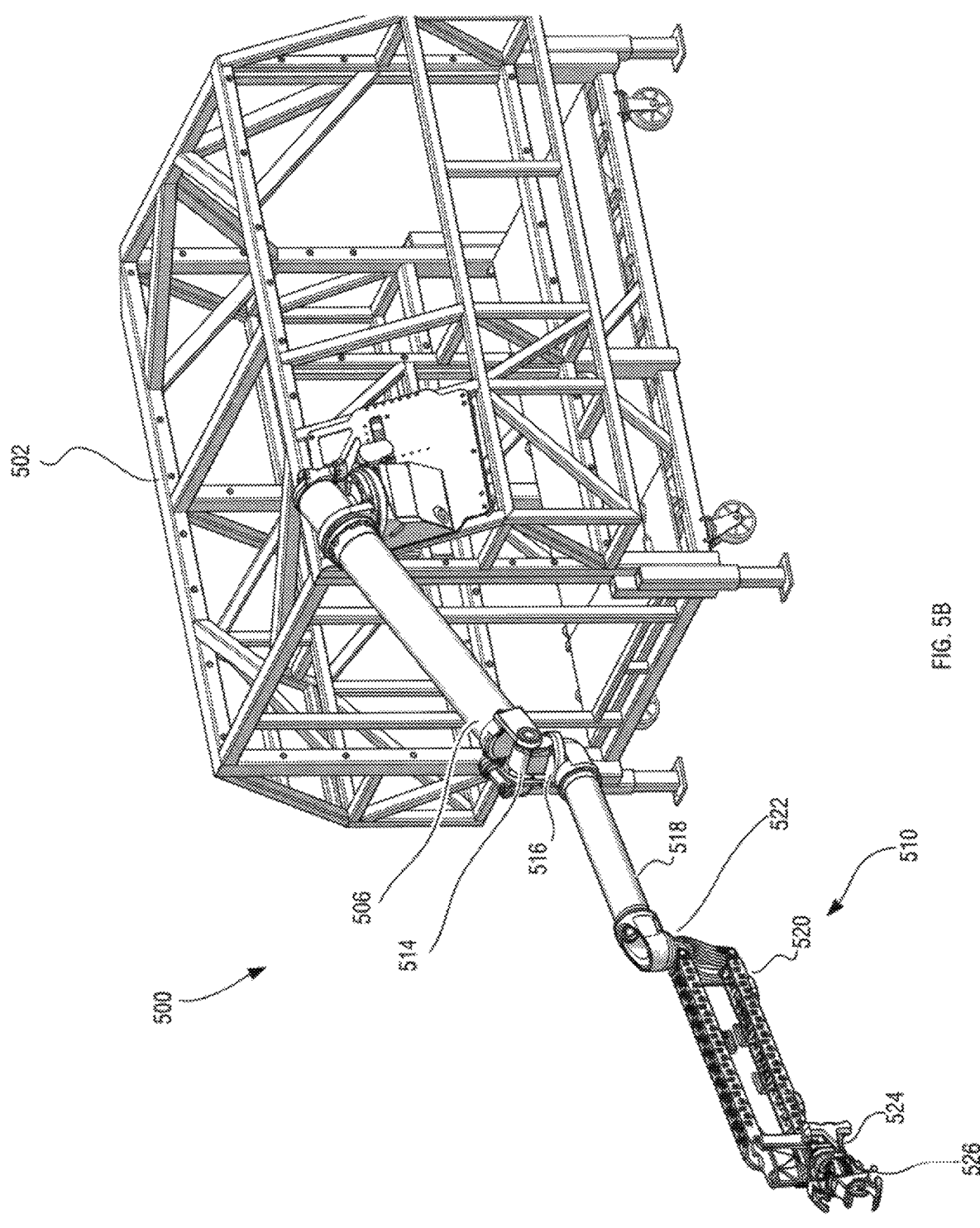
FIG. 5B is a diagrammatic representation of a second view of one embodiment of a robotic arm in the deployed configuration.
Figure 5C:
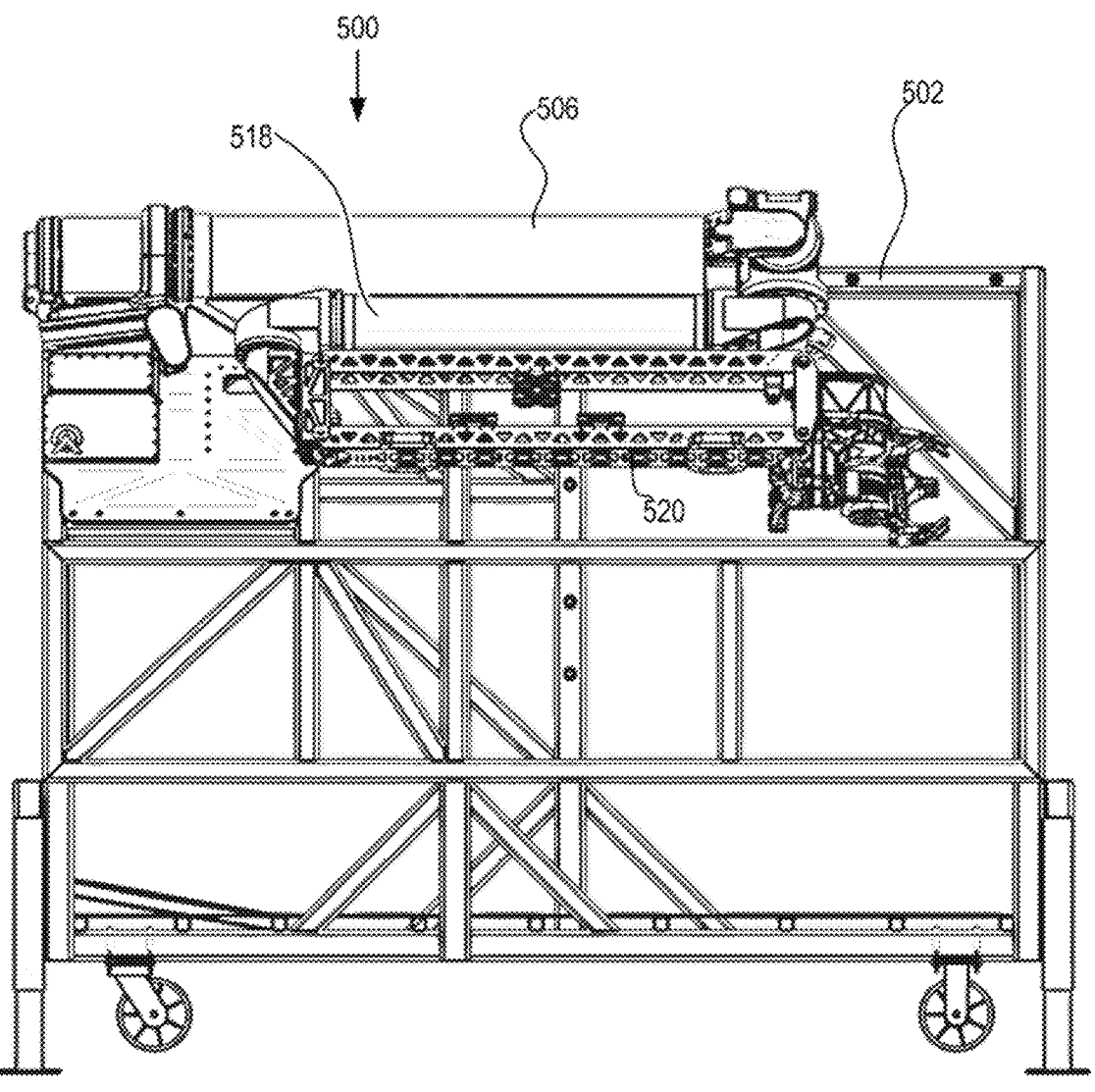
FIG. 5C is a diagrammatic representation of a first view of one embodiment of a robotic arm in a stowed configuration.
Figure 5D:
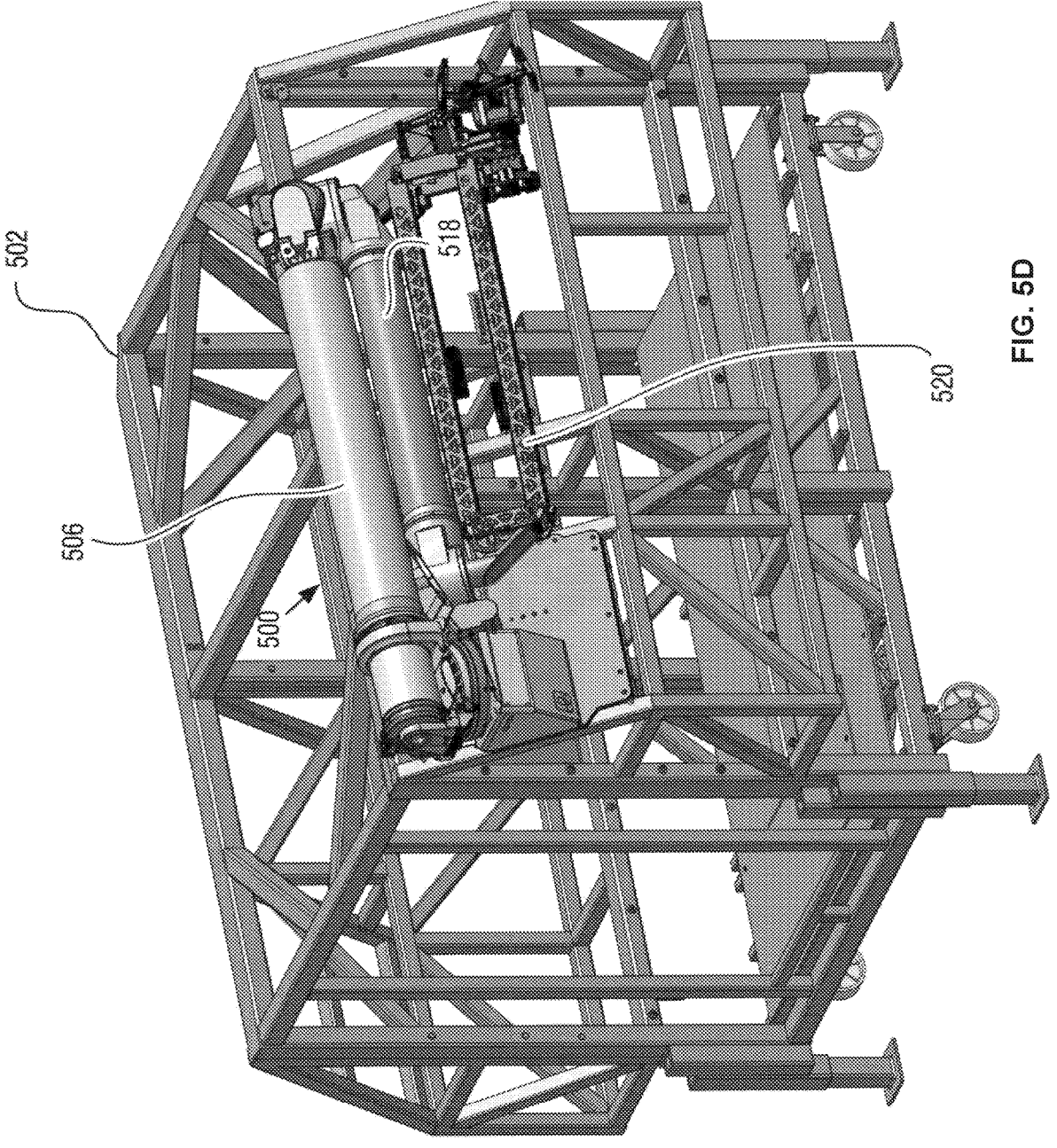
FIG. 5D is a diagrammatic representation of a side view of one embodiment of a robotic arm in a stowed configuration.
Figure 5E:
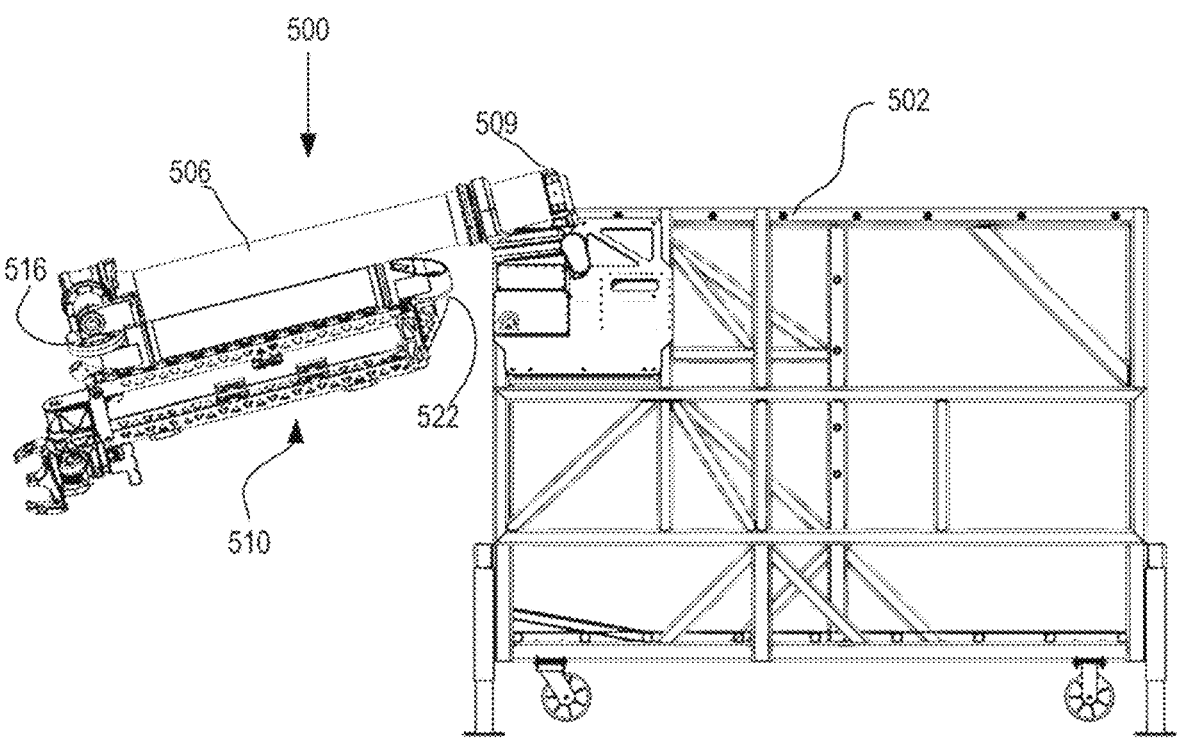
FIG. 5E is a diagrammatic representation of a side view of one embodiment of a robotic arm in a first partially deployed configuration.
Figure 5F:
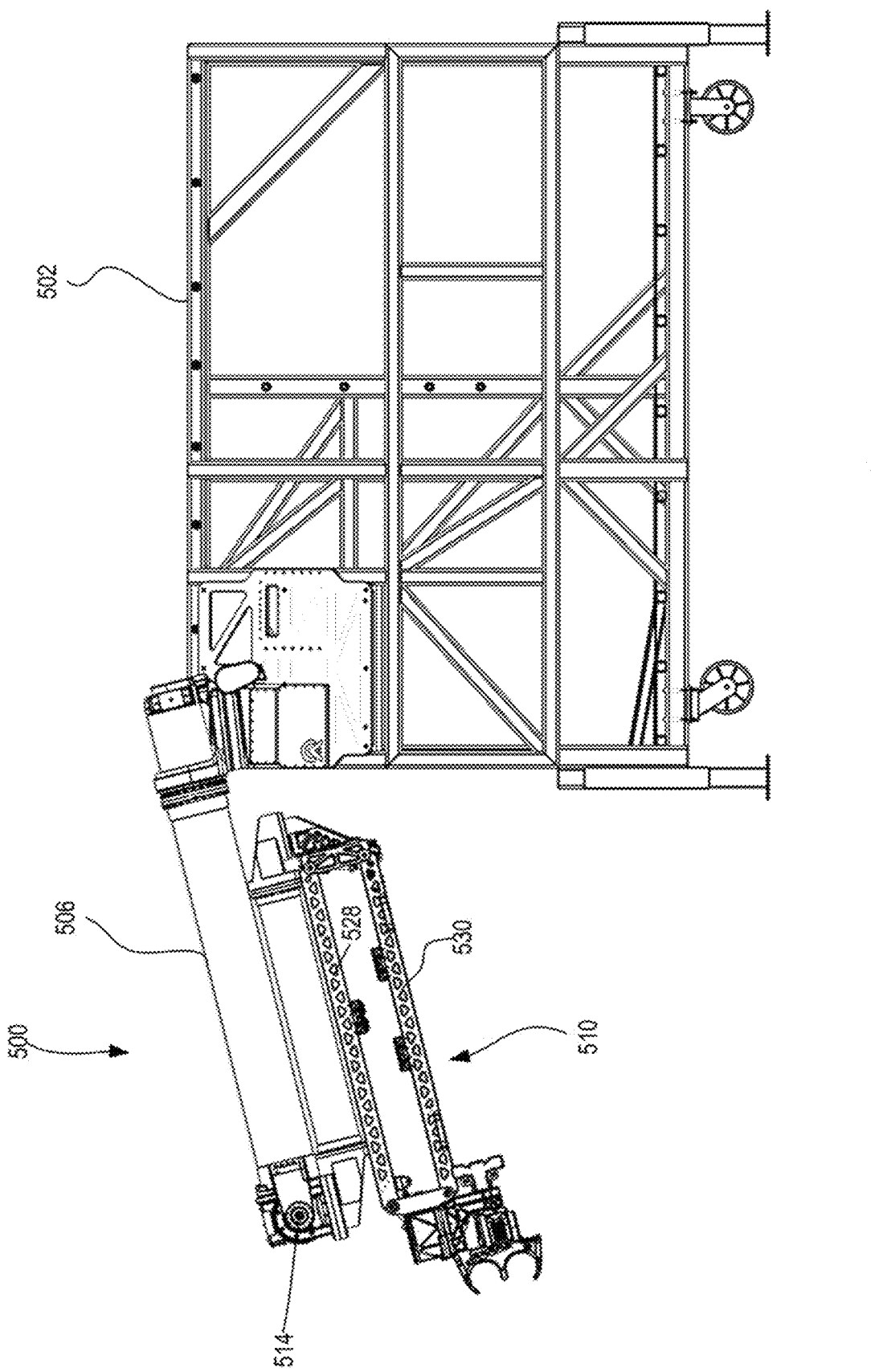
FIG. 5F is a diagrammatic representation of a side view of one embodiment of a robotic arm in a second partially deployed configuration.
Figure 5G:
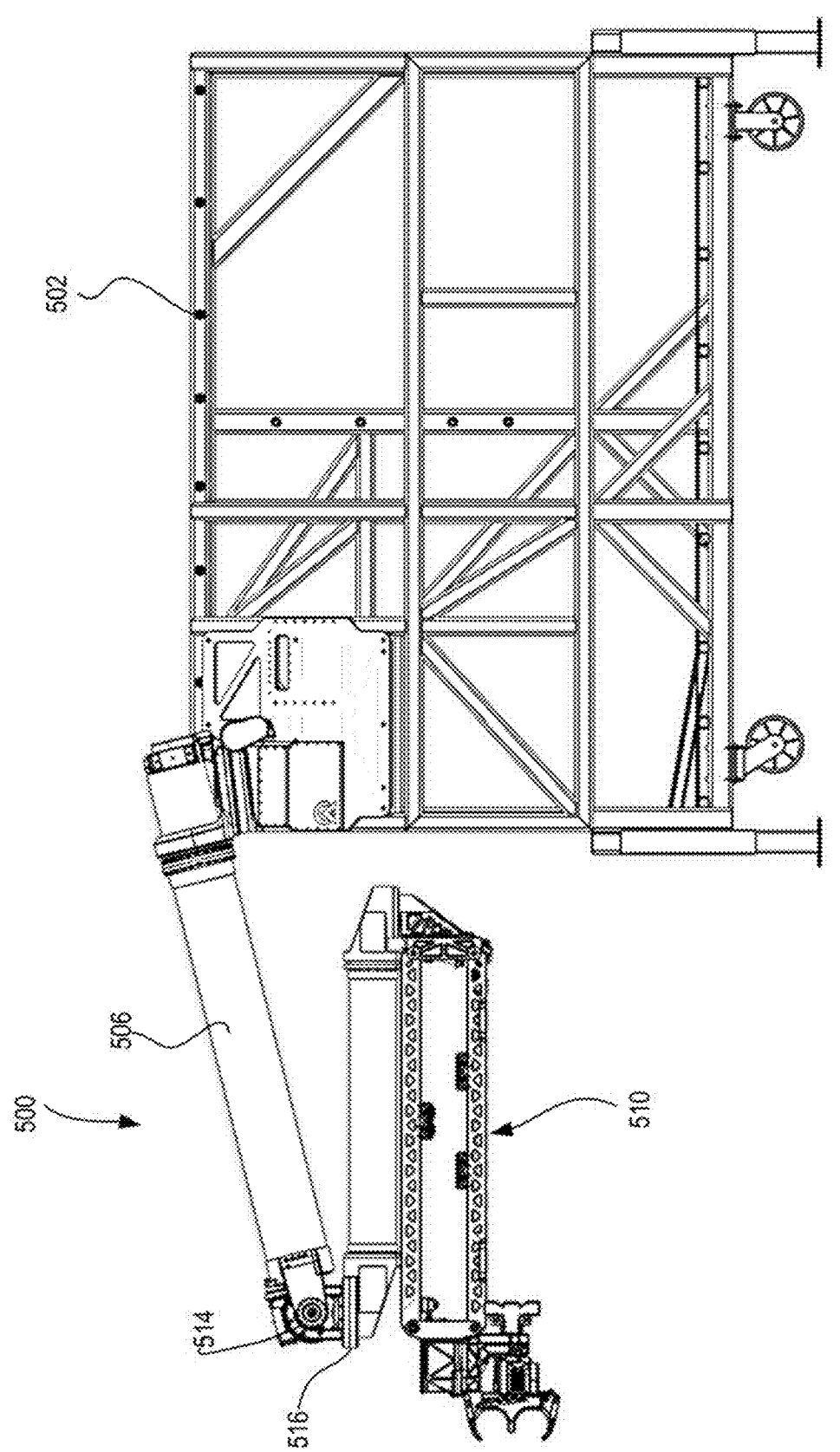
FIG. 5G is a diagrammatic representation of a side view of one embodiment of a robotic arm in a third partially deployed configuration.

With reference to FIG. 5A, FIG. 5B, FIG. 5C and FIG. 5D, FIG. 5A is a diagrammatic representation of a side view of one embodiment of a robotic arm 500 mounted to a base 502 with robotic arm 500 in a deployed configuration, FIG. 5B is a diagrammatic representation of a second view of one embodiment of robotic arm 500 in the deployed configuration, FIG. 5C is a diagrammatic representation of a first view of one embodiment of robotic arm 500 in a stowed configuration, FIG. 5D is a diagrammatic representation of a side view of one embodiment of robotic arm 500 in a stowed configuration, FIG. 5E is a diagrammatic representation of a side view of one embodiment of robotic arm 500 in a first partially deployed configuration, FIG. 5F is a diagrammatic representation of a side view of one embodiment of robotic arm 500 in a second partially deployed configuration, and FIG. 5G is a diagrammatic representation of a side view of one embodiment of robotic arm 500 in a third partially deployed configuration. While only one robotic arm is illustrated in FIG. 5A-FIG. 5G, other embodiments may deploy and use multiple robotic arms 500.

Robotic arm 500 includes a deployment link 506 that is mounted to base 502 at a base joint structure 507 that includes a joint 508 and a second joint 509. In the illustrated embodiment, joint 508 is a 1-DoF deployment yaw joint that provides for angular motion of deployment link 506 relative to base 502 and joint 509 is a 1-DoF deployment roll joint that allows deployment link 506, and hence manipulator 510, to roll about the link axis of deployment link 506. In any case, joint 508 provides a skewed yaw axis that is angularly displaced from the vertical axis in the world coordinate system. The link axis or long axis of deployment link 506, however, is angled relative to the skewed yaw axis such that when deployment link 506 is rotated to its stowed position, the long axis of deployment link is horizontal or parallel to the longitudinal axis of base 502 or at another desired angle. For example, in FIG. 5C and FIG. 5D the link axis of deployment link 506 is both horizontal and parallel to the longitudinal axis of base 502.

Deployment link 506 rotates about the skewed yaw axis to swing a manipulator 510 from a stowed configuration to a deployed configuration in which manipulator 510 is at a desired work area. Manipulator 510 is coupled to deployment link 506 by a joint structure that comprises a joint 514 and a joint 516. In the illustrated embodiment, joint 514 and joint 516 are revolute joints that allow for relative angular of first segment 518 relative to deployment link 506 about different axes of rotation. For example, joint 514 is a 1-DoF pitch joint and joint 516 is a 1-DoF yaw joint. In other embodiments, one or more of joint 514 or joint 516 is a multiple-DoF joint.

Manipulator 510 is designed to manipulate the position and orientation of the payload in a 3-D workspace and may be one embodiment of manipulator 110. Manipulator 510 includes a first segment 518 coupled to a second segment 520 at a joint 522, a wrist 524 coupled to second segment 520 and an end effector 526 coupled to the wrist 524. In the illustrated embodiment, joint 522 is a 1-DoF joint that provides for relative angular motion of second segment 520 with respect to first segment 518. More particularly, joint 522 is a yaw joint. In other embodiments, joint 522 is a multiple-DoF joint. The wrist 524 provides one or more degrees of freedom to allow the end effector 526 to move relative to second segment 520. One or more of joint 516, joint 522, or the wrist yaw joint are joints that allow 360 degrees of rotation, such as slip ring joints. In an even more particular embodiment, each of joint 516, joint 522, and the wrist yaw joint is a joint that allows 360 degrees of rotation. Other joints may also allow 360 degrees of rotation or other desired ranges of rotation.

According to one embodiment, deployment link 506 and first segment 518 are links, such as metal tubes, though deployment link 506 and first segment 518 may have different form factors or be formed of different materials in other embodiments, whereas second segment 520 is an elevation linkage. First segment 518 and second segment 520 are adapted for positioning the end effector in the 3-D workspace. Although only two positioning segments are shown for robotic arm 500, it is expressly noted that the manipulator 510 may include one or more additional segments, joints and actuators. For example, manipulator 510 may include one or more intermediate segments, joints and actuators between first segment 518 and second segment 520. Moreover, while second segment 520 is illustrated as an elevation linkage, it is noted that first segment 518 (or other segment in the chain) can be an elevation linkage in addition to (or instead of) second segment 520. In some embodiments, each positioning link is an elevation linkage. In other embodiments, manipulator 510 comprises a combination of rigid links and elevation linkages.

Robotic arm 500 includes actuators to drive motion of robotic arm 500 or adjust manipulator 510. For example, with further reference to FIG. 1, joint 508 and joint 509 include an actuator 140, joint 514 includes an actuator 142, joint 516 includes an actuator 130, joint 522 includes an actuator 132, the wrist 524 includes wrist yaw actuator 134, wrist roll actuator 136, and wrist pitch actuator 138. Additionally, each elevation linkage includes a spring adjustment actuator (e.g., spring adjustment actuator 146) to adjust a gravity compensating spring and the end effector includes an end effector actuator (e.g., end effector actuator 148) to open and close a gripper or otherwise actuate a tool. The various actuators may include, for example, hydraulic or electromagnetic actuators. In a more particular embodiment, each of the actuators is an electromagnetic actuator. Further, user interfaces (e.g., a user interface 150 and user interface 160) are provided for deploying/stowing the robotic arm 500 and controlling the robotic arm 500 during operation.

Robotic arm 500 has a kinematic chain of Yaw (skewed), Roll, Pitch, Yaw, Elevation prior to the wrist. This kinematic chain allows robotic arm 500 to be fully stowed in a relatively compact space and then be deployed to place the manipulator 510 in a workspace. The roll and pitch DoFs prior to the manipulator allow the manipulator to be leveled and aligned with the gravity vector. Moreover, manipulator 510, and other manipulators described herein, can cover a large work area for its weight and size.

Turning to FIG. 5C and FIG. 5D, robotic arm 500 can be stowed in a relatively compact space on the side of a vehicle, building or other structure. In the stowed configuration of FIG. 5C and FIG. 5D, deployment link 506, first segment 518 and second segment 520 are stacked on a sloped side of base 502 with their respective long axes in parallel planes (for example, parallel to the ground or the longitudinal axis of base 502). In some embodiments, storage covers may be used to cover robotic arm 500 while stowed.

In operation, deployment link 506 is rotated from its stowed position of FIG. 5C and FIG. 5D to the partially deployed configuration of FIG. 5E. In the partially deployed configuration of FIG. 5E, manipulator 510 is not aligned with the ground. The upper and lower links of second segment 520 are not vertically aligned. Thus, the gravity compensating spring (not shown) will not be aligned with the gravity vector. Moreover, in the configuration of FIG. 5E, the yaw axes of joints 516, 522 are not vertically aligned.

In some embodiments, manipulator 510 is self-aligning and self-leveling with respect to the gravity vector. More particularly, joint 509 and joint 514 may be used to level the manipulator 510 and align the manipulator 510 with the gravity vector (e.g., level and align manipulator 510 so that a gravity compensating spring (not illustrated in FIG. 5A-FIG. 5G) of an elevation linkage is aligned with gravity (i.e., to maximize the proportion of the force asserted by the gravity compensating spring that acts to oppose the gravitational load force) or to align joint 516 and joint 522 such that the axes of rotation of joint 522 and joint 522 are vertical). In some embodiments, joint 509 and joint 514 are used during deployment of manipulator 510 but are not actuated or are rarely actuated during manipulation of the payload and can thus be considered deployment joints. In other embodiments, joint 509 or joint 514 is regularly used as part of payload manipulation and can be considered part of the manipulator.

To vertically align manipulator 510, the actuator of joint 509 is driven to roll the deployment link 506 about its long axis such that the manipulator 510 is oriented with the upper link 528 of second segment 520 vertically aligned with the lower link 530 of second segment 520, as illustrated in the partially deployed configuration of FIG. 5F. With respect to leveling, joint 514 is actuated to level the manipulator 510 with the ground as illustrated in FIG. 5G.

In the embodiment illustrated, deployment link 506 deploys manipulator 510 to the center of the 3D workspace. Joint 516 and joint 522 can be actuated to position manipulator 510 as desired, such as in a fully deployed configuration as illustrated in FIG. 5A and FIG. 5B.

While the deployment of robotic arm 500 is described in discrete stages above, deployment may occur in other manners. For example, the actuators of joint 509 and joint 514 can be driven to align and level the manipulator 510 as deployment link 506 rotates about the skewed yaw axis. To stow robotic arm 500, the actuators of joint 508, joint 509, joint 514, joint 516, and joint 522 are driven to fold robotic arm 500 as illustrated.

Robotic arm 500 can include a user interface (e.g., user interface 150) to allow a user to control manipulator 510. The user interface comprises or is connected to an electronic control system (e.g., electronic control system 152) that incorporates sensors and processing to facilitate control of manipulator 510. The electronic control system delivers control signals to control the actuators of actuator driven joints, elevation linkages and the end effector based on inputs received via the user interface, feedback from sensors, or other inputs.

As discussed below, an elevation linkage, such as second segment 520, may include a gravity compensating spring that provides a lifting force opposed to a gravitational load force. According to one embodiment, a force/torque sensor (e.g., force/torque sensor 154 of FIG. 1) may be located within the wrist portion to directly measure the force/torque of a payload. The output of the force/torque sensor is supplied to the electronic control system, which is coupled to the spring adjustment actuator. When the force/torque sensor senses a change in payload, the electronic control system supplies a signal to the spring adjustment actuator to alter the position of the gravity compensating spring and adjust the lifting force needed to compensate for the change in payload.

In one embodiment, the portion of the user interface for deploying a manipulator 510 may be separate from the user interface for controlling a manipulator 510. For example, a user interface 160 (FIG. 1) may be provided to control deployment of manipulator 510. In some embodiments, the controls for controlling manipulator 510 once deployed may be similar to those discussed in conjunction with FIG. 2.

In some embodiments, an electronic control system (e.g., electronic control system 152) provides for autonomous control of manipulator 510. Further, in some embodiments, robotic arm 500 can operate in multiple modes of operation such as a mode of operation in which a human operator controls manipulator 510 during an operation to pick up, move, and deposit a payload and a second mode of operation in which a control system autonomously controls manipulator 510 without recourse to human control.

Furthermore, in some embodiments, one or more of the joint 508, joint 509, joint 514, joint 516, joint 522, the wrist yaw joint, the wrist roll joint, or the wrist pitch joint are not driven by an actuator, but are instead, driven by a human operator moving the links using human muscle power.

Figure 6:
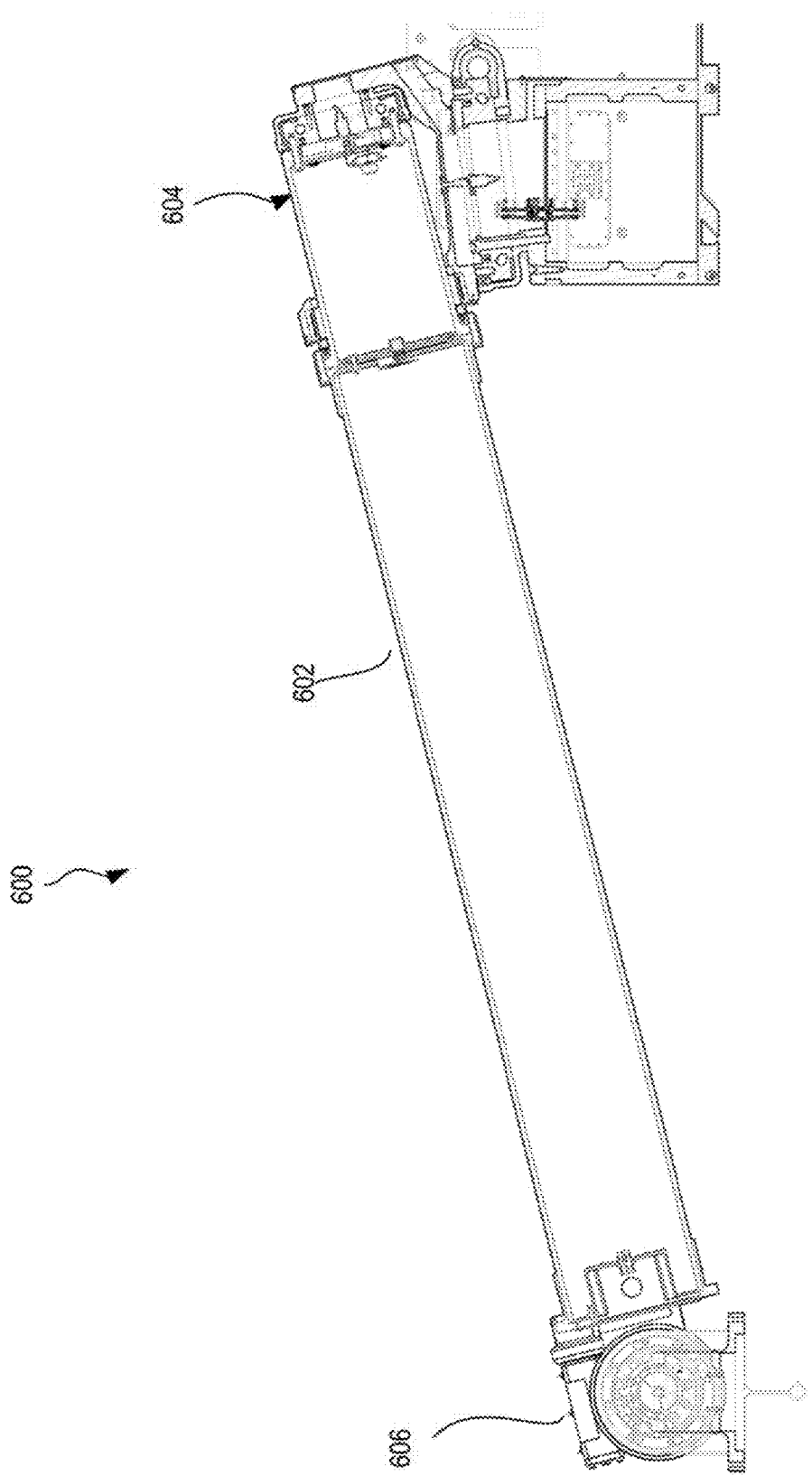
FIG. 6 is a diagrammatic representation of one embodiment of a deployment system that comprises a deployment link coupled to a base joint structure and a pitch joint.

FIG. 6 illustrates one embodiment of a deployment system 600 comprising a deployment link 602 coupled, at a first end, to a base joint structure 604 and, at a second end, to joint 606. Base joint structure 604 may be, for example, an embodiment of base joint structure 507, deployment link 602 may be an example of deployment link 506, and joint 606 may be an example of joint 514.

Figure 7:
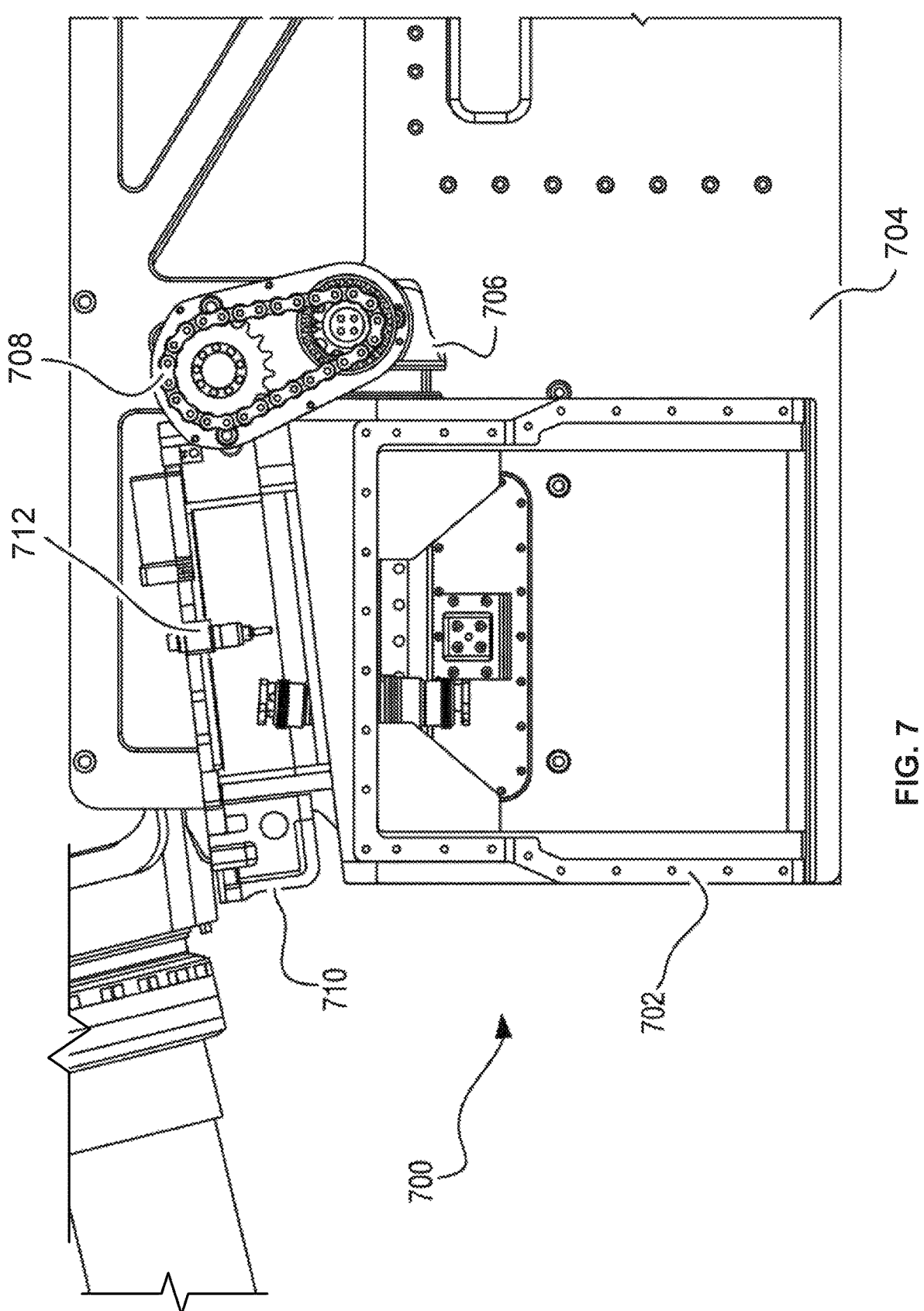
FIG. 7 is a diagrammatic representation of one embodiment of a skewed yaw joint.

FIG. 7 is a diagrammatic representation of one embodiment of a portion of base joint structure 604 that comprises a yaw joint 700, and more particularly a skewed yaw joint. For example, yaw joint 700 may be used for joint 408 or joint 508 in some embodiments.

In the embodiment of FIG. 7, the base joint structure 604 includes a base support structure 702 attached to a mounting plate 704 for mounting the joint to a support structure, such as the side of a building or a vehicle. Joint 700 comprises a slewing drive (or slew drive) that can transmit torque for rotating a deployment structure while holding radial and axial loads. More particularly, the base support structure 702 houses or supports a slew drive actuation module 706 that is connected via a slew drive actuation reduction set 708 or other transmission to a yaw slew drive 710. Yaw slew drive 710 is angled such that the yaw axis of joint 700 is skewed from the vertical. For example, the output of yaw slew drive 710 has a sloped mounting surface to which the structure to be rotated (e.g., additional deployment structure, such as additional deployment joints or a deployment link) is mounted. As slew drive actuation module 706 rotates, power is transmitted via actuation reduction set 708 to slew drive 710 causing the output of slew drive 710 to rotate relative to base support structure 702, thereby rotating a deployment link (e.g., deployment link 406, deployment link 506, deployment link 602) to deploy or stow the deployment link or otherwise rotate a deployment structure about a skewed yaw axis. An angular position sensor 712 is provided to measure the angular position of the output of slew drive 710 and, hence, the position of the deployment link.

Figure 8:
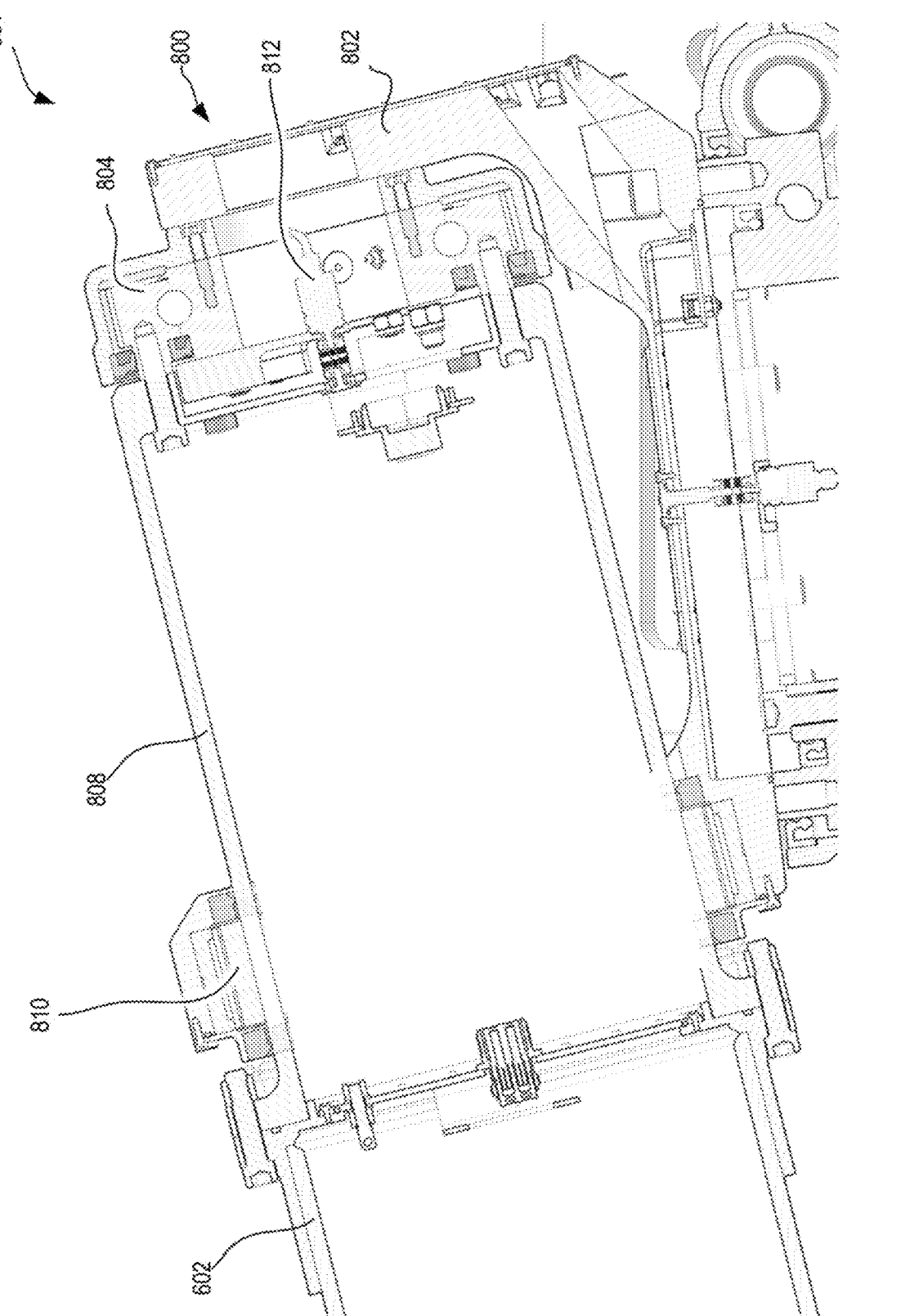
FIG. 8 is a diagrammatic representation of one embodiment of a roll joint.

FIG. 8 is a diagrammatic representation of one embodiment of a portion of base joint structure 604 that includes a roll joint 800 (e.g., roll joint 509). Roll joint 800 comprises a roll joint support structure 802 that, for example, may be coupled to the upper surface of slew drive 710. The joint support structure 802 houses a roll slew drive and actuation module 804. A deployment link 602 is coupled to the output of roll slew drive and actuation module. In the illustrated embodiment, deployment link 602 includes an end portion 808 that is connected to the output of the roll slew drive and actuation module 804. The end portion 808, extends through an opening in the support structure 802. A roll support bearing 810 is circumferentially disposed between the deployment link 602 and the support structure 802, and more particularly, between the end portion 808 and support structure 802. As the output of roll slew drive and actuation module 804 rotates, the deployment link 602 rotates about its long axis. An angular position sensor 812 is provided to measure the angular displacement of the deployment link about its link axis.

Figure 9A:
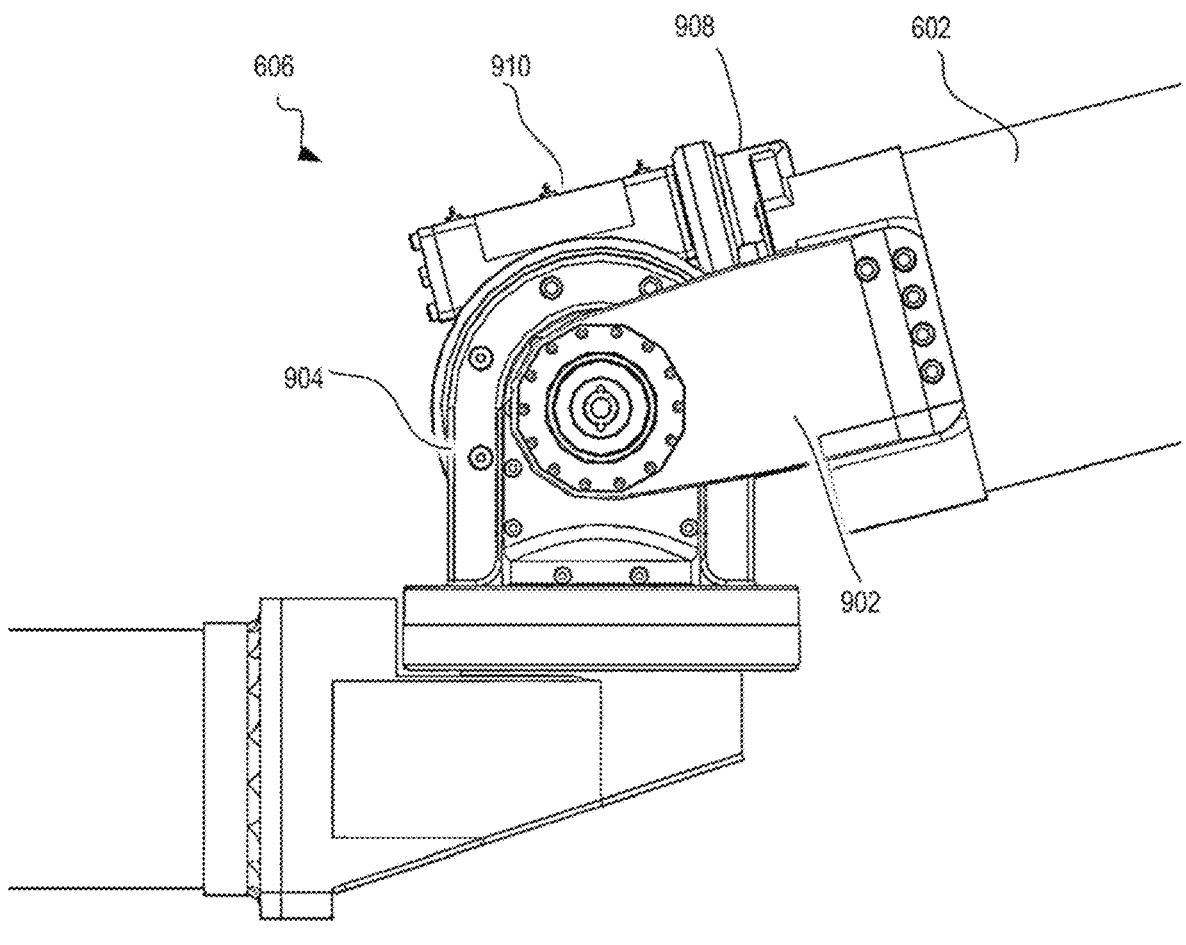
FIG. 9A is a diagrammatic representation of one embodiment of a pitch joint coupled to a deployment structure.
Figure 9B:
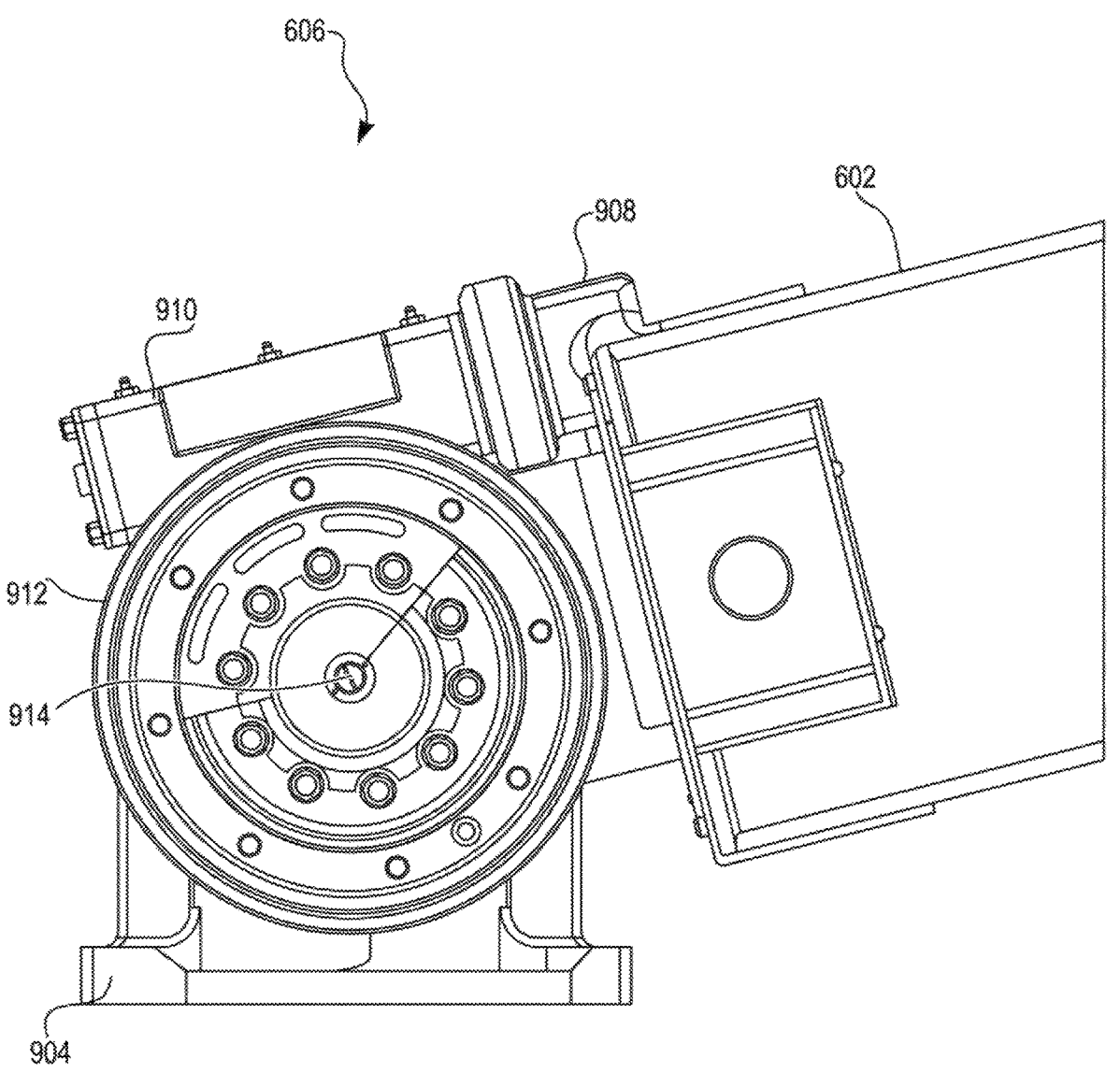
FIG. 9B is a diagrammatic representation of another view of one embodiment of a pitch joint.
Figure 9C:
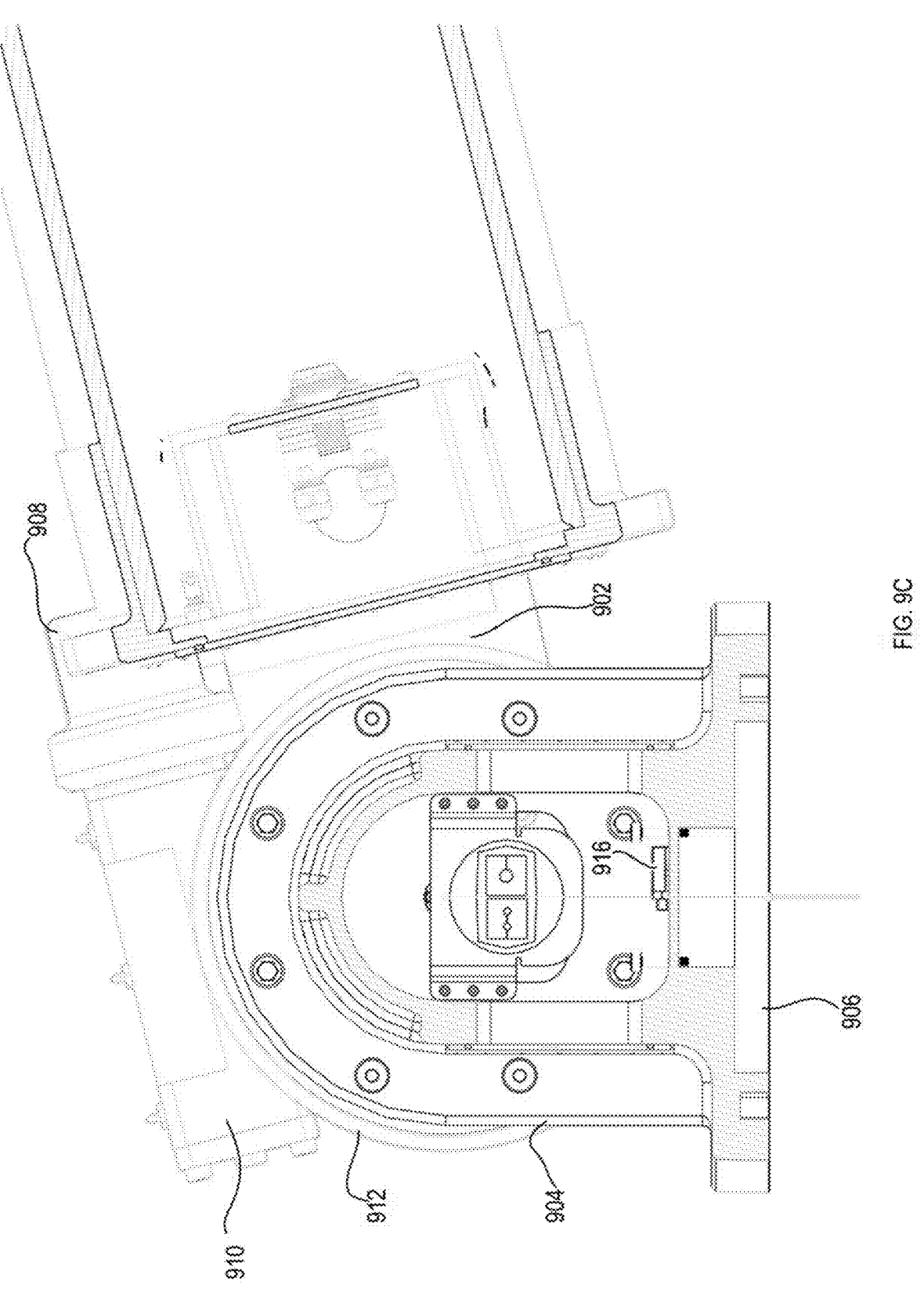
FIG. 9C is a diagrammatic representation of yet another view of one embodiment of a pitch joint.

FIG. 9A illustrates one embodiment of a manipulator pitch joint 606, which may be one embodiment of joint 414 or joint 514. FIG. 9B further illustrates one embodiment of an actuation mechanism of joint 606. FIG. 9C illustrates one embodiment of a support structure of joint 606.

Joint 606, according to one embodiment, is coupled to the distal end of a deployment system from the base joint. For example, joint 606, in the illustrated embodiment, is coupled to the end of deployment link 602 distal from base joint structure 604 (see, FIG. 6). In another embodiment, such as illustrated in FIG. 4A, pitch joint 606 may be connected to a roll joint (e.g., roll joint 412).

Joint 606 is coupled to the deployment system at a first support structure 902 that defines a pitch axis of rotation (into and out of the page in FIG. 9A). A second support structure 904, which is movable relative to the first support structure 902 about the pitch axis, provides a mounting point 906 (FIG. 9B) to which other components may be coupled. For example, a manipulator (e.g., manipulator 510, manipulator 410) may be coupled to mounting point 906. Even more particularly, a manipulator yaw joint (e.g., joint 416, joint 516) may be mounted to mounting point 906.

Joint 606 further includes a slew drive actuation module 908 that drives a pitch slew drive 910. The output 912 (FIG. 9B) of pitch slew drive 910 is connected to second support structure 904 and rotates second support structure 904 about the pitch axis of joint 606. An angular position sensor 914 can be used to detect the angular position of second support structure 904 relative to the deployment system (e.g., relative to deployment link 602). An inertial measurement unit (IMU) 916 or other type of sensor (FIG. 9C) is attached to support structure 904 and is used for determining when the support structure 904 is aligned such that an attached manipulator or other component is level.

As discussed above, various embodiments of a robotic arm may comprise an elevation linkage. According to one embodiment, an elevation linkage has a parallelogram structure and uses an iso-elastic mechanism to provide "weightless" behavior. In other words, the elevation linkage may be configured as a gravity-balancing mechanism in which a gravity compensating spring is attached diagonally between two links of a parallelogram four-bar linkage mechanism at two different spring attachment points to provide a lifting force in a direction opposing the gravitational force on the payload. A spring adjustment mechanism may be coupled to the gravity compensating spring and may be configured to alter a position of at least one of the spring attachment points. The spring adjustment actuator may be coupled to move the spring adjustment mechanism, so as to alter the position of the at least one spring attachment point and dynamically adjust the amount of lifting force provided by the gravity compensating spring.

Figure 10A:
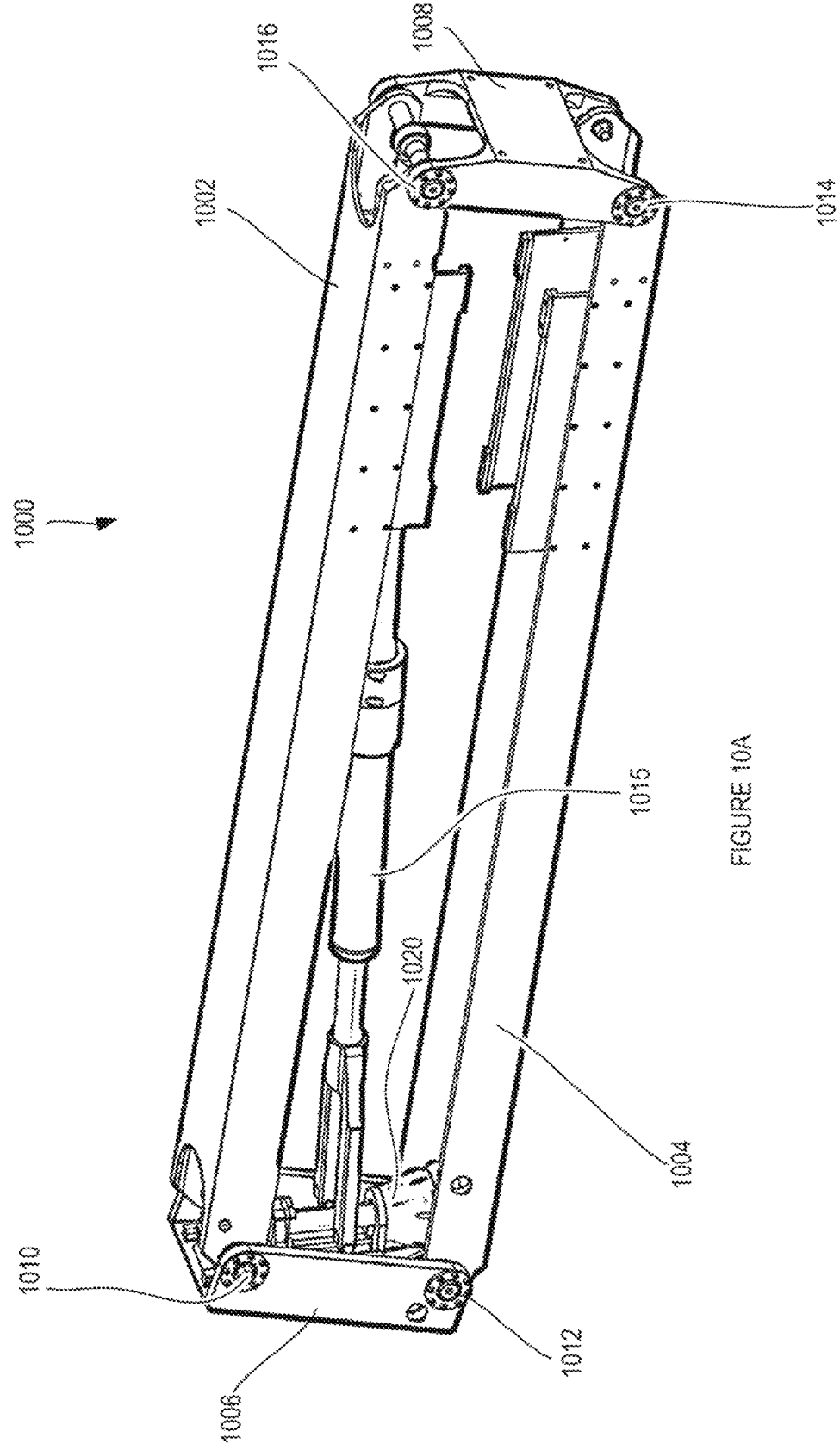
FIG. 10A is a diagrammatic representation of one embodiment of an elevation linkage.
Figure 10B:
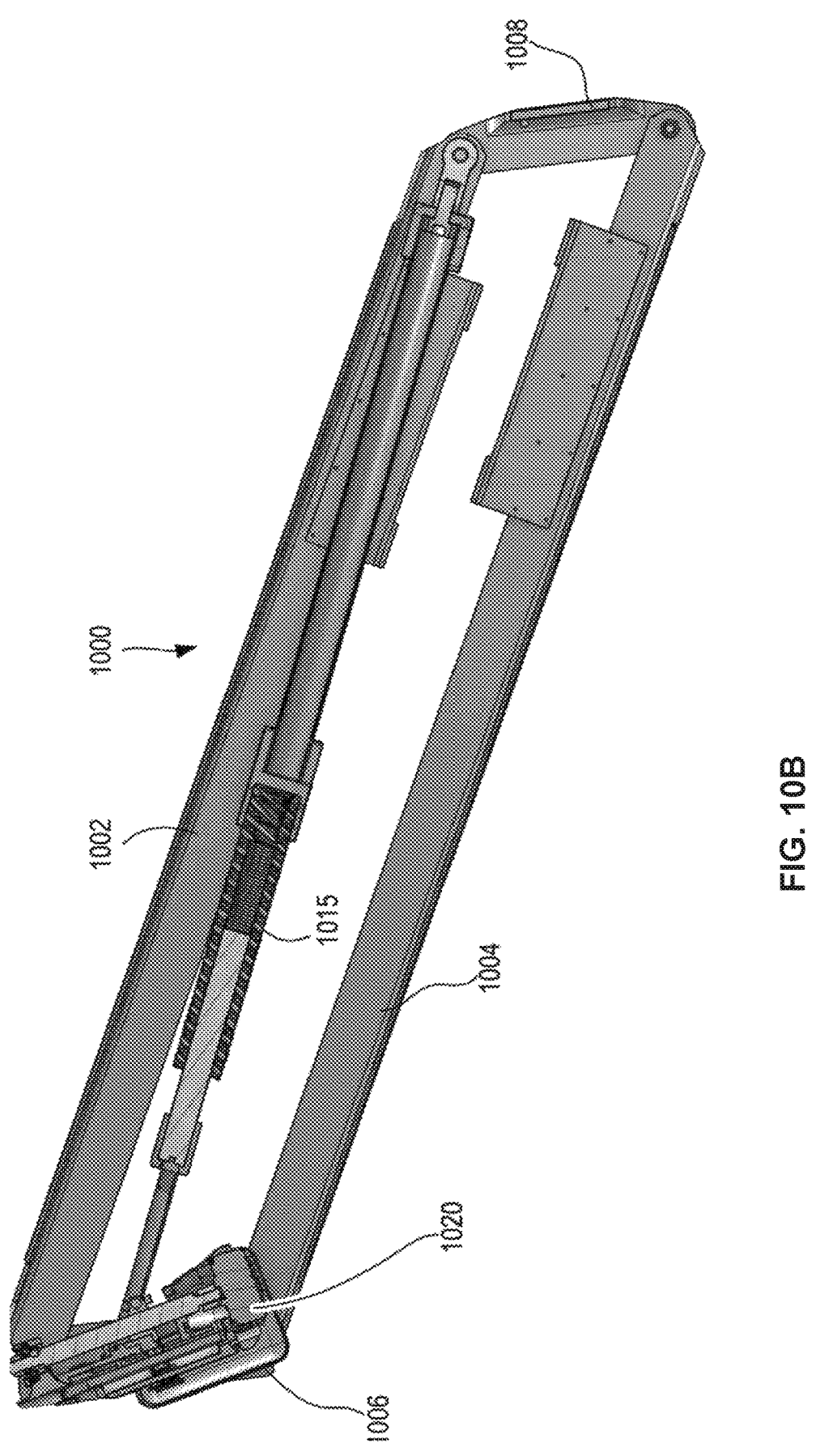
FIG. 10B is a diagrammatic representation of a cross-section of one embodiment of an elevation linkage.
Figure 10C:
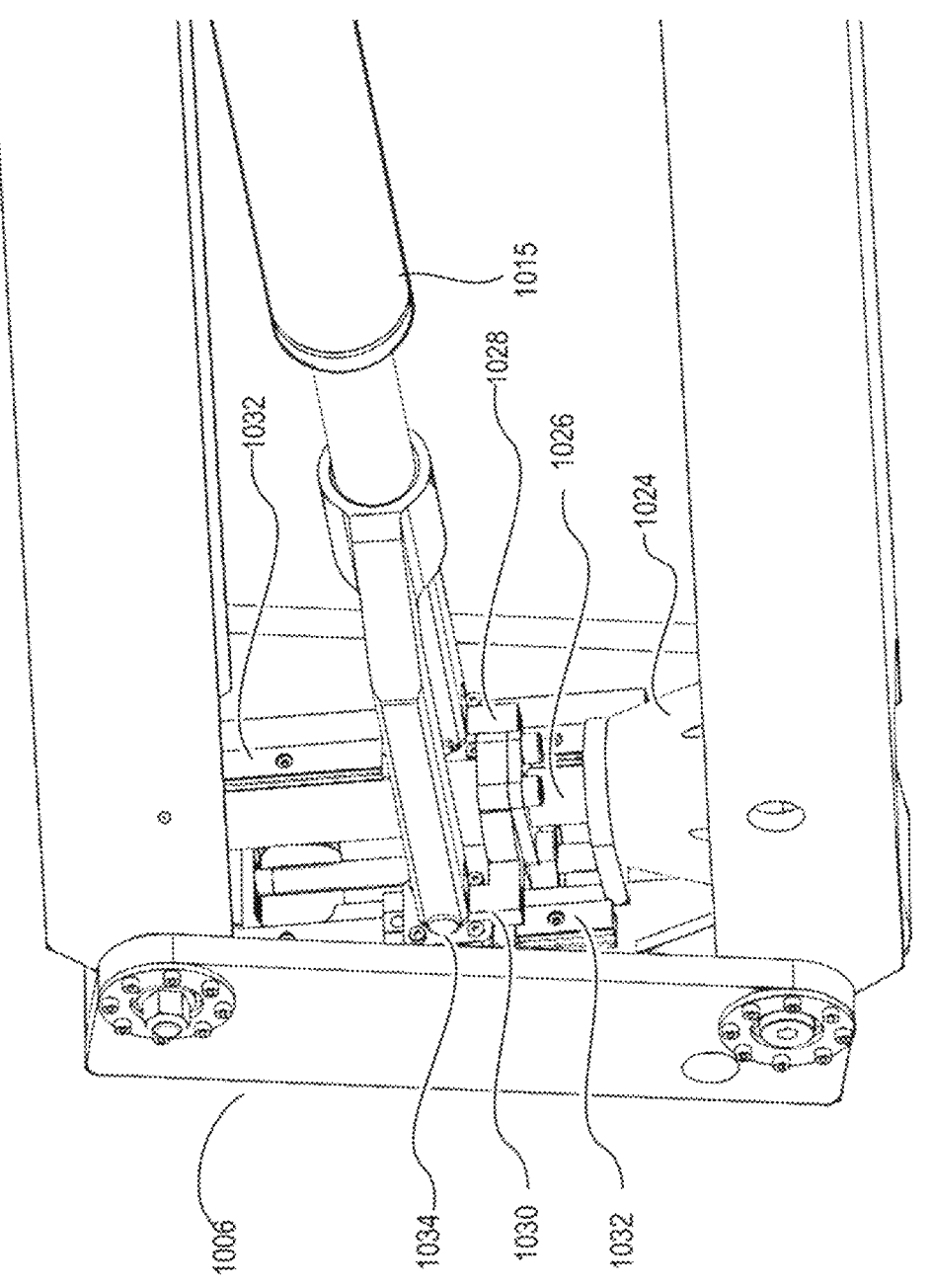
FIG. 10C is a diagrammatic representation of a detailed view of one embodiment of a spring adjustment mechanism.
Figure 10D:
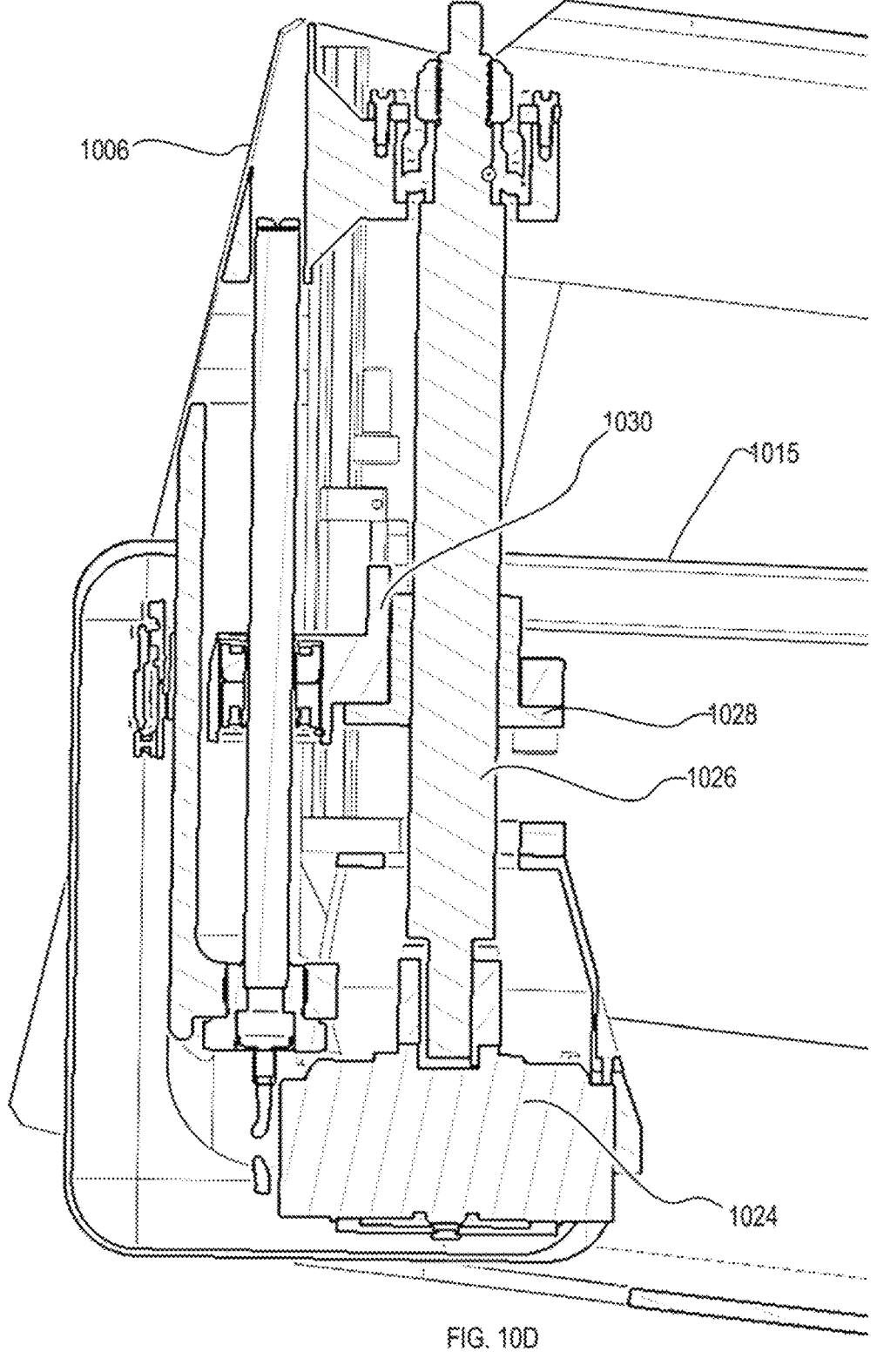
FIG. 10D is a diagrammatic representation of a cross-section of one embodiment of a spring adjustment mechanism.

FIG. 10A, for example, illustrates one embodiment of an elevation linkage 1000 which may be one embodiment of segment 120, 214, 320, 420, 520 or other elevation linkage, FIG. 10B illustrates a cross-section of elevation linkage 1000 and FIG. 10B illustrates a cross-section of embodiment of elevation linkage 1000 in which the end links have translated relative to each other, FIG. 10C is a detailed view of one embodiment of one embodiment of a system for adjusting a gravity compensating spring and FIG. 10D is a cross-section of one embodiment of a system for adjusting a gravity compensating spring.

Elevation linkage 1000 comprises a four-bar linkage formed by (link 1002, link 1004, link 1006, link 1008) connected at four 1-DoF joints (joint 1010, joint 1012, joint 1014, joint 1016) as a parallelogram. More particularly, link 1006 and link 1008 are coupled between links 1002 and 1004 distal ends thereof to form a parallelogram structure, which constrains motion between the links of the four-bar linkage mechanism in a way that allows translation, but not rotation, of opposite links. Because of this property, any torque applied to an end effector (e.g., coupled to link 1008 by a wrist) is transmitted directly through the serially coupled actuators and joints of the robotic arm to mechanical ground.

Elevation linkage 1000 may be relatively light for its weight capacity. For example, links 1002, 1004, 1006, and 1008 may be formed of stiff aluminum c-channel structures. It will be appreciated though that the links may have other shapes or be formed of different materials in other embodiments.

A gravity compensating spring 1015 is coupled to the parallelogram structure between two links of the four-bar linkage mechanism. In the example embodiment of elevation link 1000, spring 1015 is coupled diagonally between an attachment point on end link 1006 and attachment point at the joint of link 1002 and end link 1008. When coupled in such a manner, spring 1015 provides a lifting force in a direction opposing the gravitational load force. It is recognized, however, that the gravity compensating spring 1015 may provide a lifting force without being attached diagonally between links of the four-bar linkage mechanism. In some embodiments, the gravity compensating spring 1015 may be alternatively oriented and attached. In some embodiments, one or more characteristics (e.g., length, stiffness, etc.) of the gravity compensating spring 1015 may be selected to counterbalance the weight of a robotic manipulator (or portion thereof) and its payload, so that it ideally behaves as if its motion is in a gravity-less environment when carrying a payload.

Gravity compensating spring 1015 may be any suitable tension or compression spring selected for the expected payloads. By way of example, gravity compensating spring 1015 may be gas compression spring as illustrated, or an extension spring (such as a titanium extension spring or other type of extension spring) or another type of spring. Using a spring that has a relatively high preload and low stiffness, such that the change in force over the range of motion is smaller, can reduce or eliminate the need for additional mechanisms to help with iso-elasticity. Other embodiments may include additional mechanisms to help with iso-elasticity. Additional mechanisms could include an extra four-bar linkage between the spring set point and ground or a cable and pulley mechanism to reroute spring forces to increase iso-elasticity.

Elevation linkage 1000 includes a spring adjustment system 1020 to alter a position of one or more attachment points of gravity compensating spring 1015, so as to adjust the amount of lifting force provided thereby. In the example embodiment shown in FIG. 10C and FIG. 10D, spring adjustment system 1020 comprises a linear actuator to adjust gravity compensating spring 1015. More particularly, one embodiment of the linear actuator comprises an electromagnetic motor 1024 coupled to a screw 1026 to drive screw 1026. Screw 1026 may be, for example, a lead screw or a ball screw A screw nut 1028 moves along screw 1026 as screw 1026 rotates. A slider 1030 is coupled to screw nut 1028 and moves with screw nut 1028. Slider 1030 slides along guide rails 1032 on the inner side of link 1006. The end of gravity compensating spring 1015 proximate to link 1006 is coupled to slider 1030 by a rotational joint 1034 having an axis of rotation perpendicular to the direction of movement of slider 1030 along the guide rails 1032. By driving screw 1026 (and thus, the slider 1030 coupled thereto to a desired position) the spring adjustment actuator provides active actuation to alter the position of the spring attachment point and adjust the lifting force provided by the gravity compensating spring 1015.

According to one embodiment, the position of the spring attachment point relative to link 1006 can be maintained, even when the elevation linkage is under load, with little or no electrical power. Screw 1026 may be a self-locking screw, such as a self-locking lead screw, to allow for zero power usage to hold a payload. In addition, or in the alternative, motor 1024 may include a brake that can be set to prevent rotation of screw 1026. The brake may be, for example, a zero-power brake that prevents rotation in the absence of electrical power being provided to the brake. The use of a zero-power brake allows the use of a more efficient transmission, such as a ball screw, reducing the overall power required to adjust the manipulator for a payload.

Figure 10E:
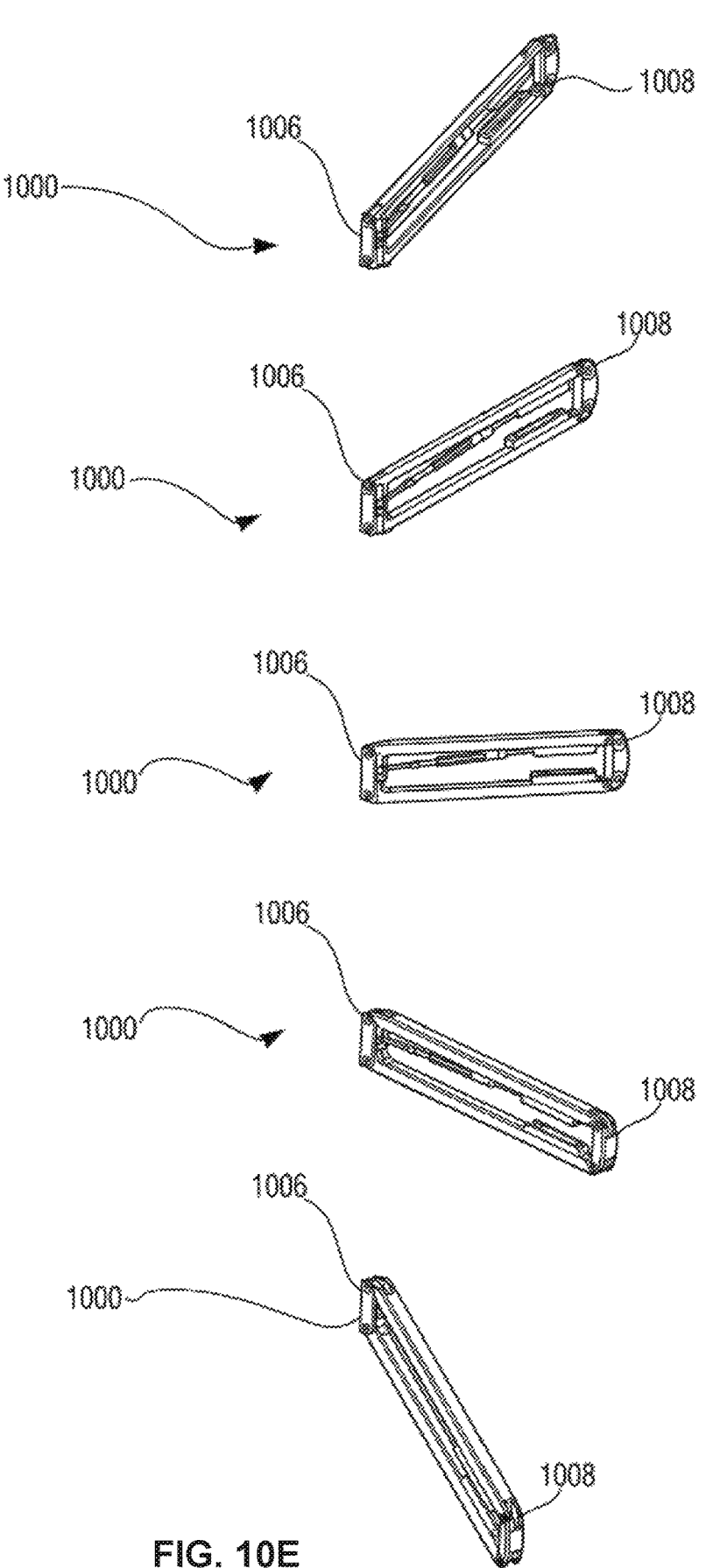
FIG. 10E is a diagrammatic representation of one embodiment of an elevation linkage in various states of elevation.
Figure 10F:
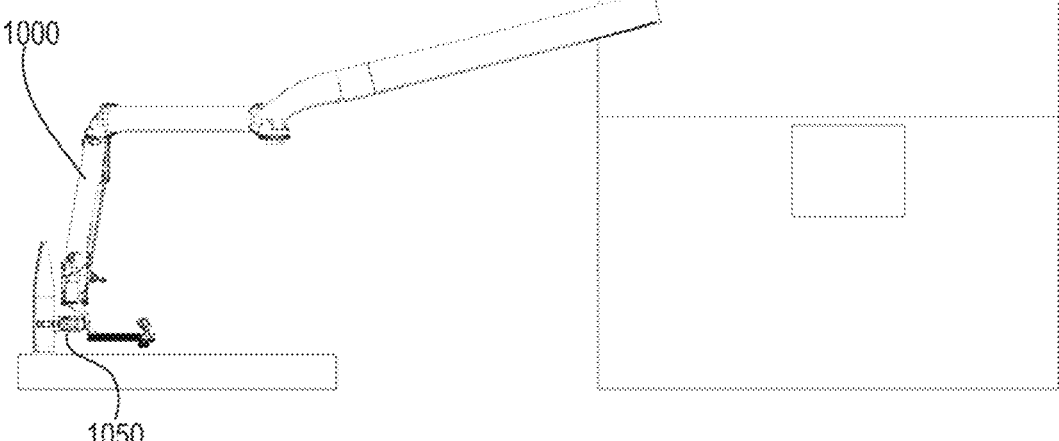
FIG. 10F is a diagrammatic representation of one embodiment of a robotic arm illustrating an elevation linkage.

FIG. 10E illustrates elevation linkage 1000 in various stages of elevation. It can be noted that the orientation of end link 1008 relative to end link 1006 does not change as end link 1008 is raised and lowered. Thus, as illustrated in FIG. 10F, changing the elevation of the end link of elevation linkage 1000 does not change the orientation of end effector 1050.

Figure 11A:
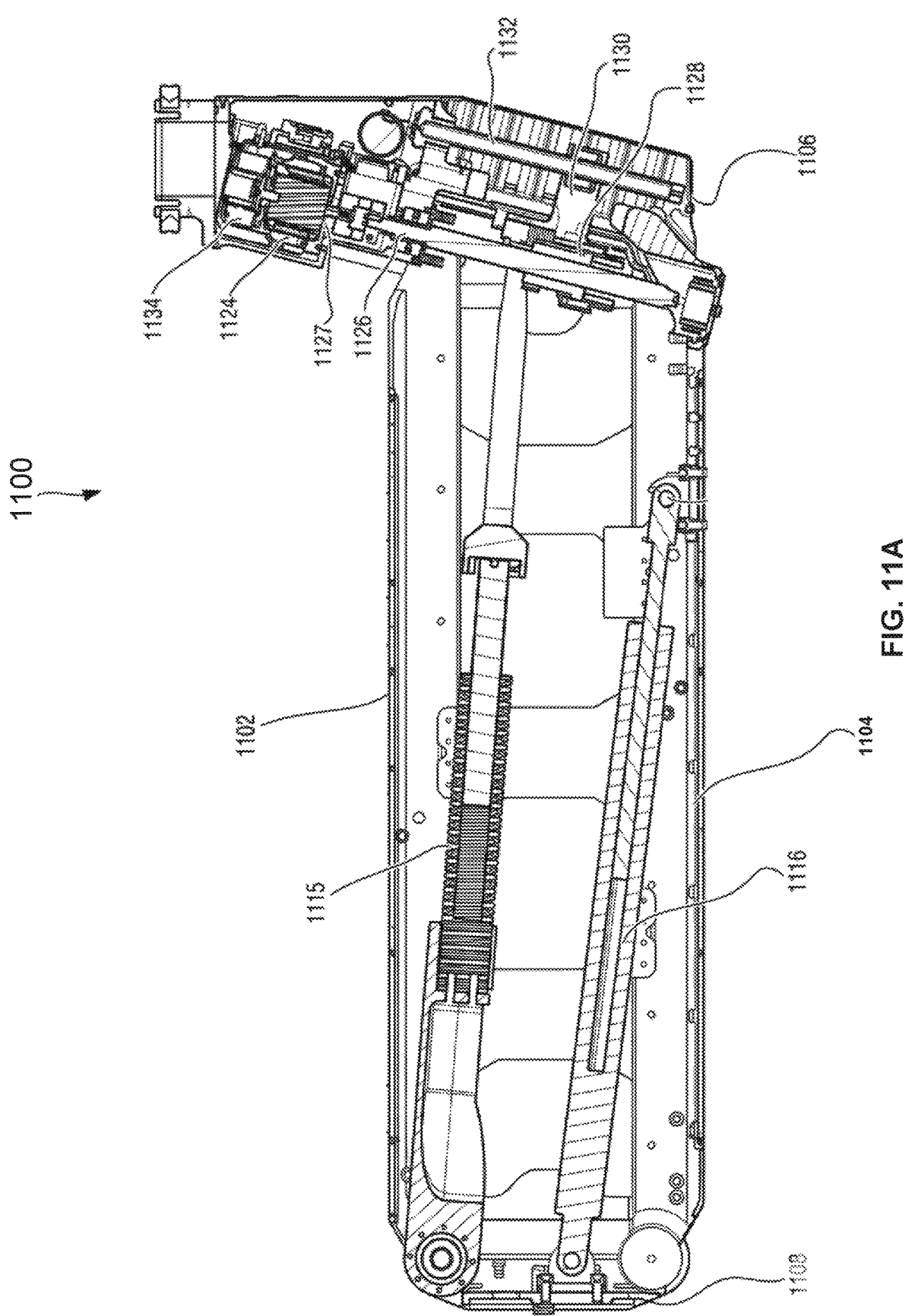
FIG. 11A is a diagrammatic representation of another embodiment of an elevation link and FIG. 11B is a diagrammatic representation of one embodiment of a drive system for a spring adjustment system.
Figure 11B:
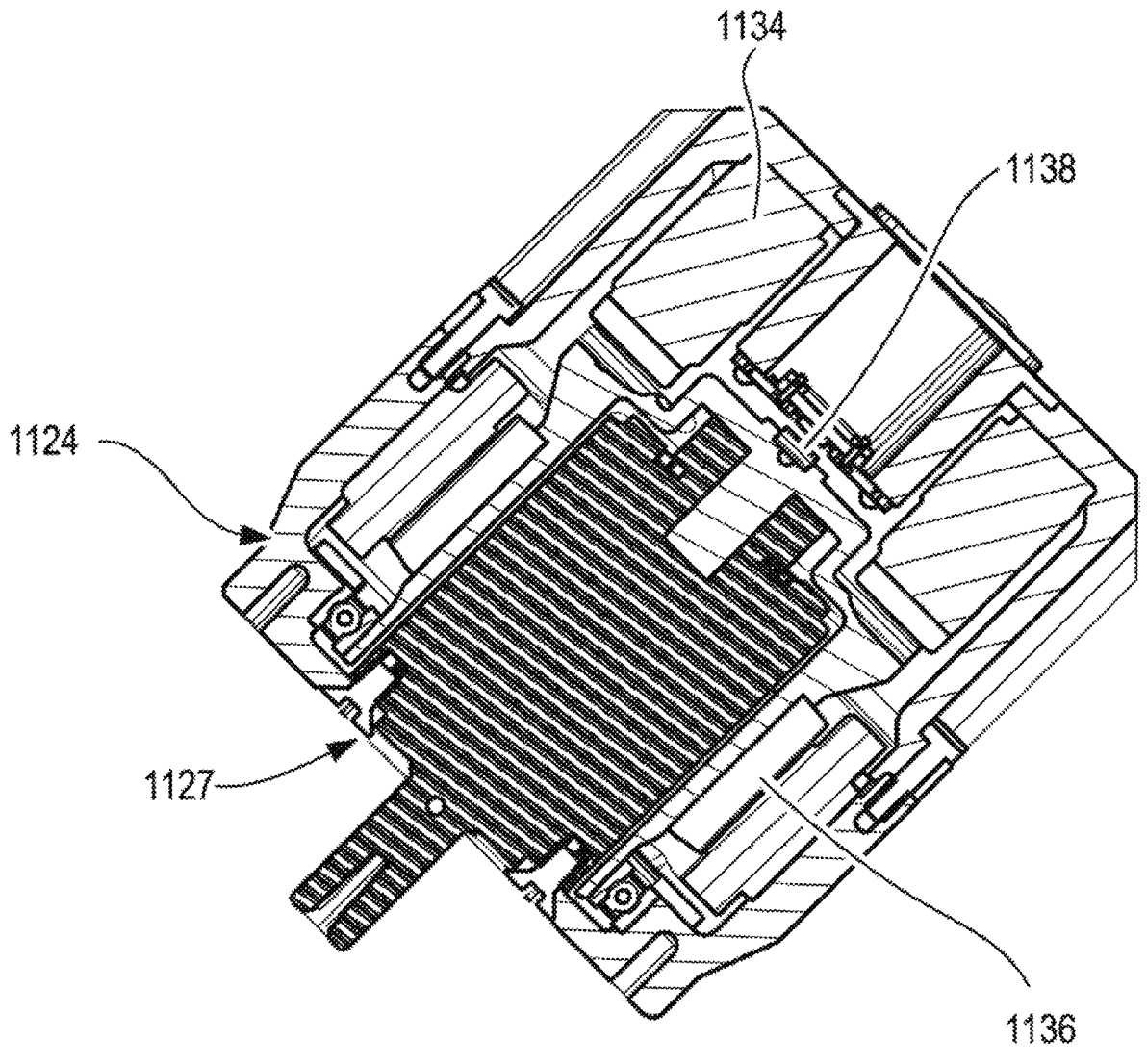

FIG. 11A, for example, illustrates one embodiment of an elevation linkage 1100, which may be one embodiment of segment 120, 214, 320, 420, 520 or other elevation linkage. FIG. 11B illustrates a detailed view of the spring adjustment actuator.

Elevation linkage 1100 comprises a four-bar linkage formed by (link 1102, link 1104, link 1106, link 1108) connected at four 1-DoF joints as a parallelogram. More particularly, link 1106 and link 1108 are coupled between links 1102 and 1104 distal ends thereof to form a parallelogram structure, which constrains motion between the links of the four-bar linkage mechanism in a way that allows translation, but not rotation, of opposite links. Because of this property, any torque applied to an end effector (e.g., coupled to link 1108 by a wrist) is transmitted directly through the serially coupled actuators and joints of the robotic arm to mechanical ground.

Elevation linkage 1100 may be relatively light for its weight capacity. For example, links 1102, 1104, 1106, and 1108 may be formed of stiff aluminum c-channel structures. It will be appreciated though that the links may have other shapes or be formed of different materials in other embodiments.

A gravity compensating spring 1115 is coupled to the parallelogram structure between two links of the four-bar linkage mechanism. In the example embodiment illustrated, spring 1115 is coupled diagonally between an attachment point on end link 1106 and attachment point at the joint of link 1102 and end link 1108. When coupled in such a manner, spring 1115 provides a lifting force in a direction opposing the gravitational load force. It is recognized, however, that the gravity compensating spring 1115 may provide a lifting force without being attached diagonally between links of the four-bar linkage mechanism. In some embodiments, the gravity compensating spring 1115 may be alternatively oriented and attached. In some embodiments, one or more characteristics (e.g., length, stiffness, etc.) of the gravity compensating spring 1115 may be selected to counterbalance the weight of a robotic manipulator (or portion thereof) and its payload, so that it ideally behaves as if its motion is in a gravity-less environment when carrying a payload.

Gravity compensating spring 1115 may be any suitable tension or compression spring selected for the expected payloads. By way of example, gravity compensating spring 1015 may be gas compression spring as illustrated, or an extension spring (such as a titanium extension spring or other type of extension spring) or another type of spring. Using a spring that has a relatively high preload and low stiffness, such that the change in force over the range of motion is smaller, can reduce or eliminate the need for additional mechanisms to help with iso-elasticity. Other embodiments may include additional mechanisms to help with iso-elasticity. Additional mechanisms could include an extra four-bar linkage between the spring set point and ground or a cable and pulley mechanism to reroute spring forces to increase iso-elasticity. Elevation linkage further includes a damper 1116 coupled between lower link 1104 and end link 1108. Damper 1116 can act to dampen vibration.

Elevation linkage 1100 includes a spring adjustment system to alter a position of one or more attachment points of gravity compensating spring 1115, so as to adjust the amount of lifting force provided thereby. In the example embodiment shown in FIG. 11A, the spring adjustment system comprises a linear actuator to adjust gravity compensating spring 1115. More particularly, one embodiment of the linear actuator comprises an electromagnetic motor 1124 coupled to a screw 1126 via a gearbox 1127 and is operable to drive screw 1126 to move the spring attachment point of gravity compensating spring 1115. Screw 1126 may be, for example, a lead screw or, as illustrated, a ball screw. A screw nut 1128 moves along screw 1126 as screw 1126 rotates. A slider 1130 is coupled to screw nut 1128 and moves with screw nut 1128. Slider 1130 slides along guide rails 1132 on the inner side of link 1106. The end of gravity compensating spring 1115 proximate to link 1106 is coupled to slider 1130 by a rotational joint having an axis of rotation perpendicular to the direction of movement of slider 1130 along the guide rails 1132. By driving screw 1126 (and thus, the slider 1130 coupled thereto to a desired position) the spring adjustment actuator provides active actuation to alter the position of the spring attachment point and adjust the lifting force provided by the gravity compensating spring 1115.

According to one embodiment, the position of the spring attachment point relative to link 1106 can be maintained, even when the elevation linkage is under load, with little or no electrical power. For example, motor 1124 may include a brake 1134 that can be set to prevent rotation of screw 1126. The brake may be, for example, a zero-power brake that prevents rotation in the absence of electrical power being provided to the brake. The use of a zero-power brake allows the use of a more efficient transmission, such as a ball screw, reducing the overall power required to adjust the manipulator for a payload.

As discussed previously with respect to elevation link 1000, changing the elevation of the end link 1108 relative to end link 1106 does not change the orientation of end link 1108 relative to end link 1106 and therefore does not change the relative orientation of an end effector coupled to link 1108.

With brief reference to FIG. 11B, the spring adjustment system of an elevation link can be driven by a motor 1124. In the embodiment illustrated, the rotor 1136 of the motor 1124 is coupled to the drive screw (e.g., drive screw 1126) by a gearbox 1127. A rotary encoder 1138 provides an output that can be used to determine the rotation of the drive screw and, hence, the position of the drive nut and the spring attachment point. A zero-power brake 1134 prevents rotation of the drive screw in the absence of power to disengage brake 1134.

It can be noted that, while some embodiments may use multiple elevation linkages, the kinematics of having only a single elevation DoF (single elevation linkage) reduces the torsional twisting loads (torsional loads about the long axis of the elevation linkage) that might occur if the elevation linkages are not aligned (e.g., if one elevation linkage is perpendicular to the other). Further, having the elevation linkage be the last positioning link before the wrist minimizes the torsional twisting loads on the elevation linkage because the distance of the payload from the vertical plane in which the long axis of the elevation lies is minimized.

Figure 12:
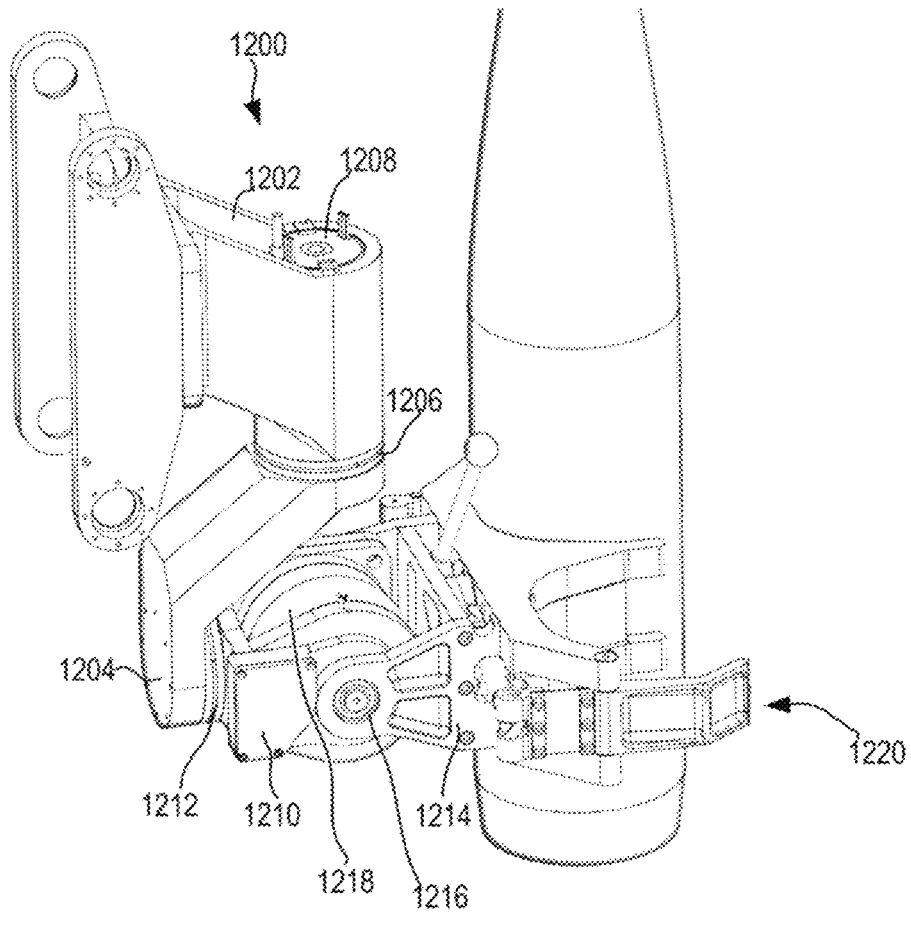
FIG. 12 is a diagrammatic representation of one embodiment of a wrist and an end effector.

FIG. 12 illustrates one embodiment of a wrist 1200 coupled to an end effector 1220. Wrist 1200 comprises a first link 1202 that couples to the end of a segment (e.g., segment 120, 214, 320, 420, or another segment). First link 1202 is coupled to a second link 1204 by a yaw joint 1206 that is driven by a yaw actuator 1208. Second link 1204 is connected to third link 1210 by roll joint 1212 which is driven by an internal roll actuator (e.g., wrist roll actuator 136). Third link 1210 is connected to a fourth link 1214 by a pitch joint 1216 that is driven by a pitch actuator 1218. Thus, wrist 1200 is a 3-DoF wrist. It will be appreciated that yaw, roll, and pitch provided by wrist 1200 may be in reference to a wrist orientation.

Figure 13:
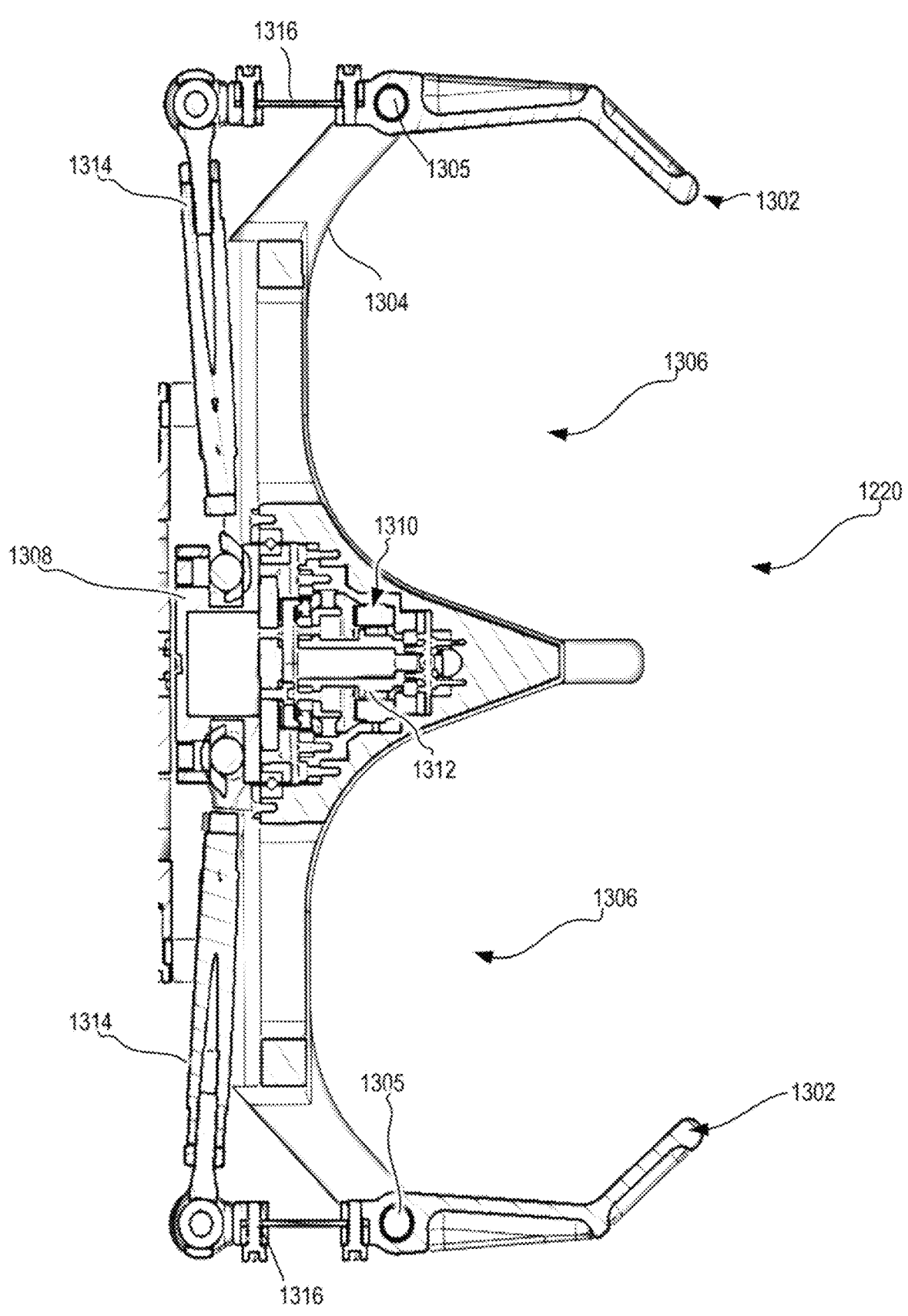
FIG. 13 is a diagrammatic representation of a cross-section of one embodiment of an end effector.

End effector 1220 is coupled to fourth link 1214. In the embodiment illustrated, end effector 1220, which provides one non-limiting example of end effector 126, 220, 326, 526 is adapted to grip a payload having a generally cylindrical profile at least at the portion of the payload gripped by end effector 1220. With further reference to FIG. 13, end effector 1220 comprises a pair of moveable grippers 1302 (e.g., fingers) connected to a body 1304 at revolute joints 1305 (e.g., rotational joints). The body 1304 and grippers 1302 form walls that define a pair of generally concave payload receiving areas 1306, each payload receiving area 1306 partially surrounded by body 1304 and a respective gripper 1302 and having an opening between the tip of the respective gripper 1302 and body 1304 such that end effector 1220 can be moved into a position in which a payload is received in the payload receiving area 1306.

End effector 1220 comprises a cam mechanism, which comprises a cam 1308 that rotates to open and close grippers 1302. End effector 1220 further includes an end effector actuator 1310 to drive cam 1308. End effector actuator 1310 is disposed in a portion of the body 1304 that projects to a form a portion of the walls of the payload receiving areas such that actuator 1310 is disposed in body 1304 between the payload receiving areas 1306 and grippers 1302. Actuator 1310 comprises an electric motor 1312 coupled to cam 1308 by, for example, a low mass, low speed, high torque harmonic drive gearbox. In some embodiments, the actuation time is less than one second. In addition to (or instead of) driving cam 1308 using an actuator, a manual control, such as a handle, may be used to rotate cam 1308.

Force is transmitted from cam 1308 to the grippers 1302 by gripper linkages 1314 and springs 1316. A first end of each gripper linkage 1314 is coupled to cam 1308. As cam 1308 rotates to push/pull gripper linkages 1314, the second end of each linkage 1314 applies a force that is transmitted to the respective gripper 1302, causing the gripper to rotate at joint 1305 to open or close.

Typically, when a robot gripper contacts an object before being fully closed and force is continued to be applied to close the gripper, the gripper will continue to close, potentially crushing the object (or damaging the gripper). In the embodiment illustrated in FIG. 13 however, the ends of the gripper linkages 1314 distal from cam 1308 are coupled to the movable grippers 1302 via inline springs 1316 (e.g., inline leaf springs). Once a gripper 1302 closes on an object, the respective spring 1316 will begin to deflect out of the way so that only a desired amount of force is imparted to the object. Thus, if the cam 1308 is still being driven once the gripper 1302 closes on an object with sufficient force, excess force will go to deflecting the spring 1316, preventing the gripper 1302 from crushing or marring the object. The springs 1316 can provide a constant force of application across different size objects (e.g., different size payloads). The gripper linkages 1314 may be adjustable such that, for example, the lengths of gripper linkages 1314 can be adjusted to set the preload in springs 1316, thereby adjusting the maximum gripping force that can be applied to an object by the gripper 1302.

In the embodiment of FIG. 13, each gripper 1302 is driven by the same actuator 1310. In other embodiments, however, each gripper may have its own actuator. Moreover, other embodiments of end effectors can have fewer payload receiving areas (e.g., a single payload receiving area) or more payload receiving areas (e.g., to pick up three or more cylinders or other objects at a time).

In the embodiment of FIG. 13, springs 1316 are in line with gripper linkages 1314 and are used to limit the force on the payload. In addition, or in the alternative, parallel springs are used to hold the grippers closed. For example, a tension or compression spring may be disposed between each gripper 1302 and body 1304 to apply a force to the gripper that is perpendicular to the rotational axis of joint 1305 in a direction that biases the gripper closed. The parallel springs reduce the power required to close the grippers and can be selected such that no power is required to hold the grippers closed. Further, the cam mechanism may lock in both a zero-power fully open position with the grippers open and a zero-power fully closed position with no power.

Figures 14A, 14B, 14C, 14D:
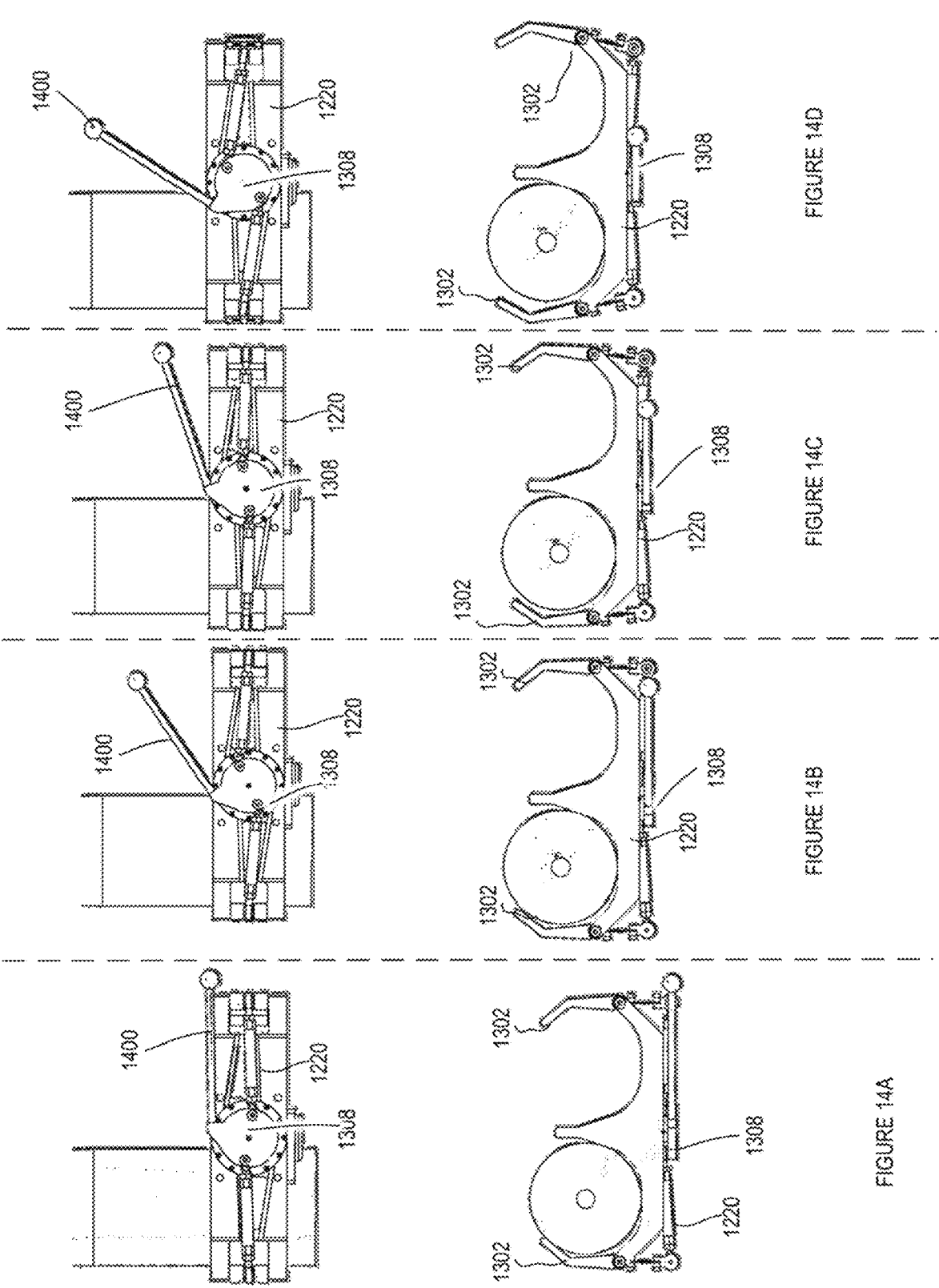
FIG. 14A illustrates one embodiment of an end effector in a fully closed position holding a projectile.
FIG. 14B illustrates one embodiment of the end effector with the cam slightly rotated to partially open the grippers.
FIG. 14C illustrates one embodiment of the end effector with the cam rotated to further open the grippers and FIG. 14D illustrates one embodiment of the end effector in a fully open position.

FIG. 14A illustrates one embodiment of end effector 1220 in a fully closed position holding a projectile, FIG. 14B illustrates one embodiment of end effector 1220 with cam 1308 slightly rotated to partially open the grippers 1302, FIG. 14C illustrates one embodiment of end effector 1220 with cam 1308 further rotated to further open the grippers 1302, and FIG. 14D illustrates one embodiment of end effector 1220 in a fully open configuration. FIG. 14A, FIG. 14B, FIG. 14C, FIG. 14D further illustrate one embodiment of a handle 1400 attached to cam 1308 for manually rotating cam 1308 to open and close the grippers 1302.

Many robotic grippers require the application of power to maintain their grip on a payload being manipulated. Thus, if they lose power, they will drop the payload. According to one aspect of the present disclosure, the cam mechanism can lock the grippers in place so that no energy is required to hold the projectiles (or other payload) (a zero-power fully closed position). In the arrangement of FIG. 14A, for example, cam 1308 has rotated sufficiently that, if grippers

1302 try to open, they will cause linkages 1314 to push cam 1308 clockwise. However, a mechanical stop or other mechanism can be used to prevent cam 1308 from rotating further clockwise, thus preventing grippers 1302 from opening.

Figure 15:
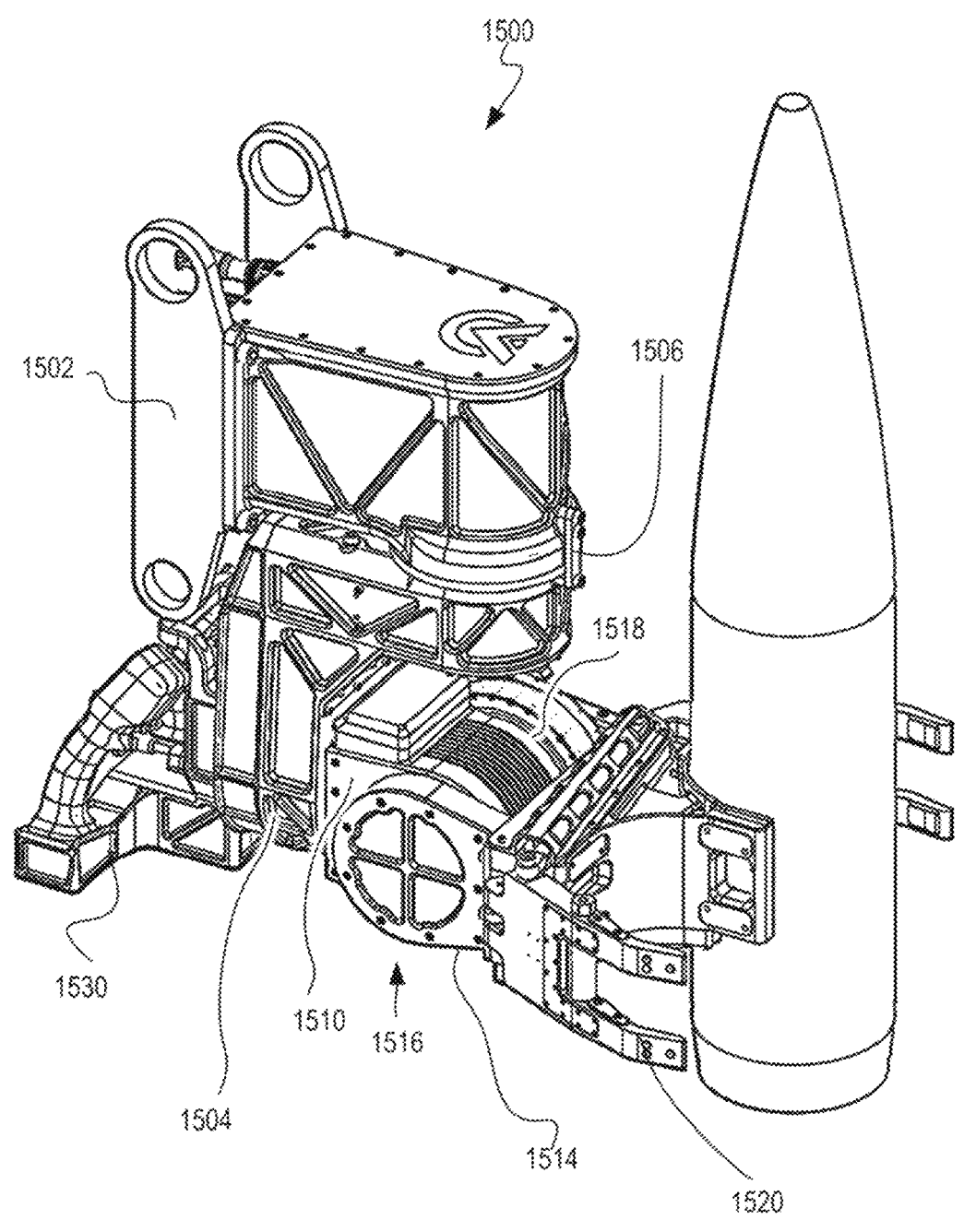
FIG. 15 is a diagrammatic representation of another embodiment of a wrist and end effector.

FIG. 15 illustrates one embodiment of a wrist 1500 coupled to an end effector 1520. Wrist 1500 comprises a first link 1502 that couples to the end of a segment (e.g., segment 120, 214, 320, 420, 520 or another segment). First link 1502 is coupled to a second link 1504 by a wrist yaw joint 1506 that is driven by an internal yaw actuator. Second link 1504 is connected to third link 1510 by a roll joint which is driven by an internal roll actuator (e.g., wrist roll actuator 136). Third link 1510 is connected to a fourth link 1514 by a wrist pitch joint 1516 that is driven by a pitch actuator 1518. Thus, wrist 1500 is a 3-DoF wrist. It will be appreciated that yaw, roll, and pitch provided by wrist 1500 may be in reference to a wrist orientation. Further, as can be seen with wrist 1500 (and wrist 1200), some embodiments can be designed such that the wrist yaw axis passes through or close to the wrist roll axis and the wrist pitch axis.

End effector 1520 is coupled to fourth link 1514. In the embodiment illustrated, end effector 1520, which provides one non-limiting example of end effector 126, 220, 326, 526, is adapted to grip a payload having a generally cylindrical profile at least at the portion of the payload gripped by end effector 1520.

FIG. 15 further illustrates one embodiment of a control yoke 1530 coupled to wrist 1500. Pushing the yoke forward and pulling the yoke back induces yaw at the yaw joints of the robotic arm (e.g., joint 516, joint 522), moving the control yoke 1530 sideways in a plane to which the yaw axis of wrist yaw joint 1506 is orthogonal induces yaw about the wrist yaw access, rolling the yoke about the axis of the roll joint induces roll about the wrist roll axis and moving the yoke in a plane to which the pitch axis of wrist pitch joint 1516 is orthogonal induces pitch about the wrist pitch axis.

Control yoke 1530 includes or is coupled to an electronic control system (e.g., electronic control system 152) such that movement of control yoke 1530 controls actuators at various joints. In addition, or in the alternative, control yoke 1530 may include various buttons, triggers, or other inputs that generate signals to control various actuators. For example, triggers or other controls are used to control a spring adjustment actuator to increase or decrease the lifting force provided by a gravity compensating spring, to control the end effector actuator (e.g., end effector actuator 148) to open and close of end effector 1520, and to otherwise control the actuators of a robotic arm.

Figure 16A:
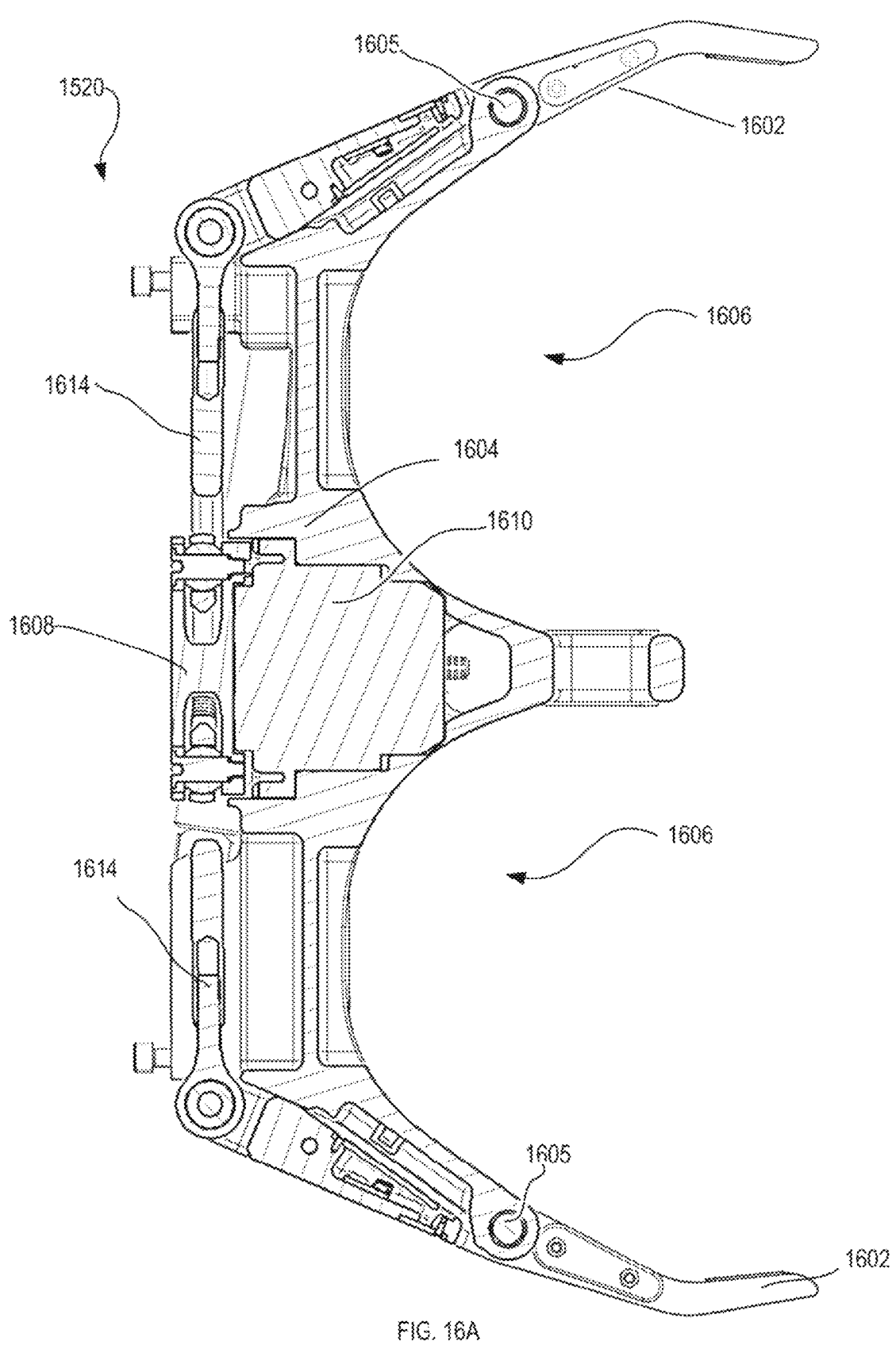
FIG. 16A is a diagrammatic representation of a cross sectional view of one embodiment of an end effector and FIG. 16B is a diagrammatic representation of an end view of one embodiment of an end effector.
Figure 16B:
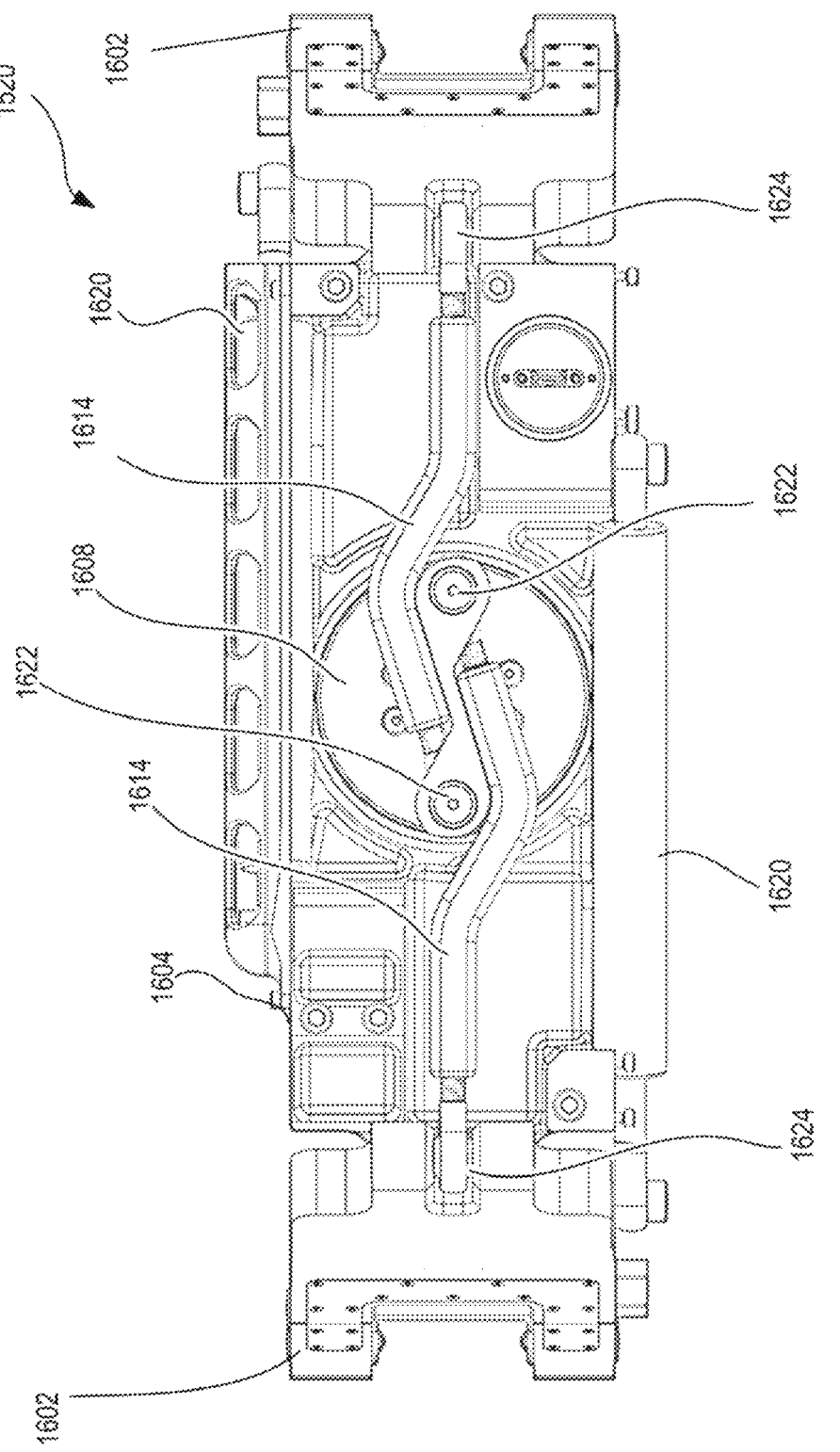

With further reference to FIG. 16A and FIG. 16B, end effector 1520 comprises a pair of moveable grippers 1602 (e.g., fingers) connected to a body 1604 at revolute joints 1605 (e.g., rotational joints). The body 1604 and grippers 1602 form walls that define a pair of generally concave payload receiving areas 1606, each payload receiving area 1606 partially surrounded by body 1604 and a respective gripper 1602 and having an opening between the tip of the respective gripper 1602 and body 1604 such that end effector 1520 can be moved into a position in which a payload is received in the payload receiving area 1606.

End effector 1520 comprises a cam mechanism comprising a cam 1608 that rotates to open and close grippers 1602. End effector 1520 further includes an end effector actuator 1610 to drive cam 1608. End effector actuator 1610 is disposed in a portion of the body 1604 that projects to a form a portion of the walls of the payload receiving areas such that actuator 1610 is disposed in body 1604 between the payload receiving areas 1606 and grippers 1602. Actuator 1610 comprises an electric motor coupled to cam 1608 by, for example, a low mass, low speed, high torque harmonic drive gearbox. In some embodiments, the actuation time is less than one second. In addition to (or instead of) driving cam 1608 using an actuator, a manual control, such as a handle, may be used to rotate cam 1608.

Force is transmitted from cam 1608 to the grippers 1602 by gripper linkages 1614. A first end of each gripper linkage 1614 is coupled to cam 1608. As cam 1608 rotates to push/pull gripper linkages 1614, the second end of each linkage 1614 applies a force that is transmitted to the respective gripper 1602, causing the gripper to rotate at the respective joint 1605 to open or close. The lengths of the gripper linkages 1614 are adjustable such that the sizes of the payload receiving areas is adjustable.

In the embodiment illustrated in FIG. 16A and FIG. 16B, a spring 1620 is coupled between body 1604 and each gripper 1602 in parallel with the linkages 1614 to bias the grippers 1602 closed. More particularly, each spring 1620 applies a force to the respective gripper 1602 that is perpendicular to the rotational axis of the respective joint 1605 in a direction that biases the gripper closed. The parallel springs reduce the power required to close the grippers and can be selected such that no power is required to hold the grippers closed.

Further, the cam mechanism may lock in both a zero-power fully open position with the grippers open and a zero-power fully closed position with no power. For example, in the embodiment of FIG. 16B, the bent-shape of linkages 1614 and the positions of the linkage connection points 1622 on cam 1608 and the linkage connection points 1624 to grippers 1602 create a natural locking point that locks grippers 1602 in an open position unless cam 1608 is actuated. Further, when grippers 1602 are in a fully closed position, cam 1608 is rotated sufficiently with the linkage connection points 1622 positioned so that, if grippers 1602 try to open, they will cause linkages 1614 to push cam 1608 clockwise. However, a mechanical stop or other mechanism can be used to prevent cam 1608 from rotating further clockwise, thus preventing grippers 1602 from opening.

In the illustrated embodiment, each gripper 1602 is driven by the same actuator 1610. In other embodiments, however, each gripper may have its own actuator. Moreover, other embodiments of end effectors can have fewer payload receiving areas (e.g., a single payload receiving area) or more payload receiving areas (e.g., to pick up three or more cylinders or other objects at a time).

Figure 17:
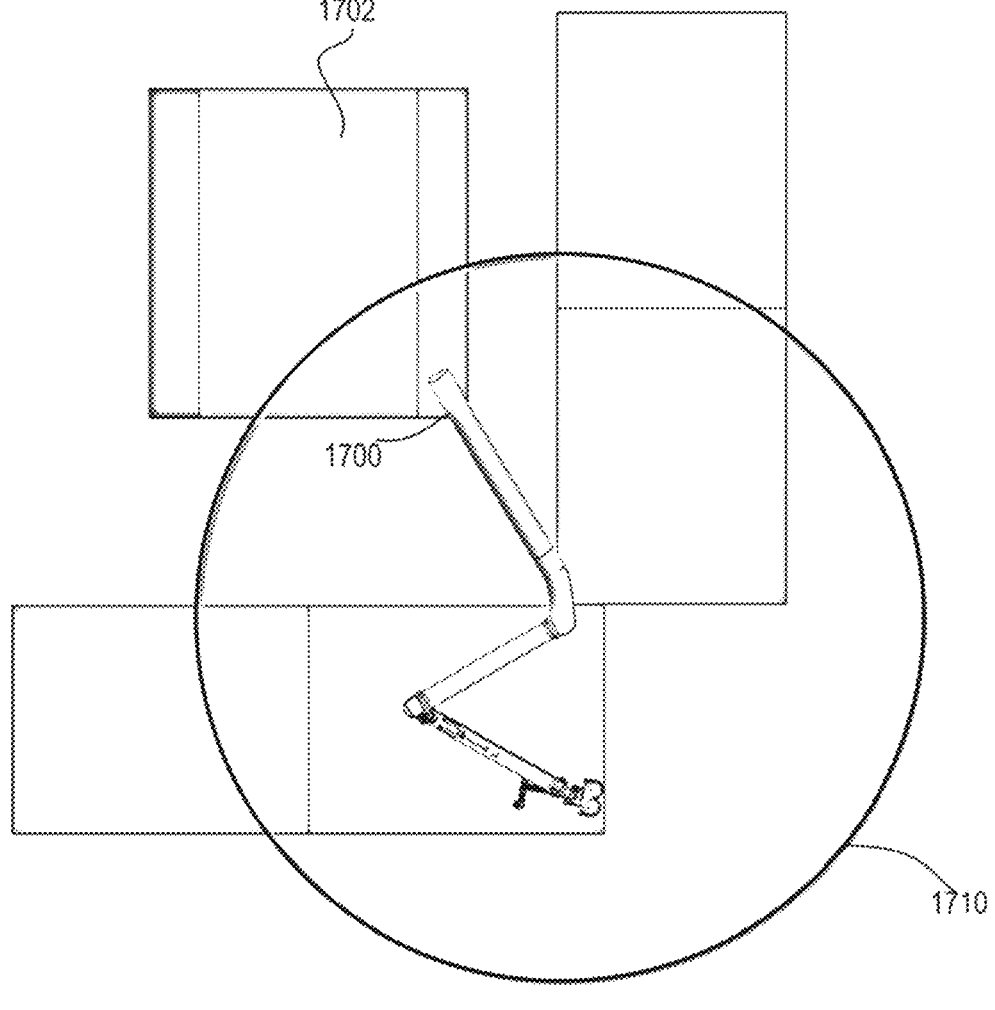
FIG. 17 is a diagrammatic representation illustrating an overhead view of one embodiment of a robotic arm, illustrating an example range of motion (denoted by a circle) of a robotic arm relative to a vehicle being resupplied.

There are many circumstances in which the use of a robotic arm may be useful for lifting and moving materials. For example, a robotic arm according to the teachings herein may be used in robotic autonomous arm resupply (RAAR) to resupply a vehicle with projectiles as illustrated, for example, in FIG. 3. FIG. 17 illustrates an overhead view of one embodiment, illustrating an example range of motion (denoted by a circle 1710) of a robotic arm 1700 relative to the vehicle 1702 being resupplied. While FIG. 17 illustrates an example using a single robotic arm, other embodiments may include multiple robotic arms. For example, two robotic arms may be deployed with each covering 50% of a workspace. Deploying two robotic arms can allow the moving links to be shorter and lighter weight, with a faster picking up time.

Robotic arms according to the teachings herein may be used for a variety of other purposes, such as handling pipes or other cylinders, grabbing and moving pallets, or otherwise lifting and moving materials.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and throughout the meaning of "in" includes "in" and "on" unless the context clearly dictates otherwise.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Thus, while the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A robotic arm system, comprising:
   a mechanical ground;
   a first joint;
   a manipulator coupled to the first joint, the manipulator rotatable relative to the mechanical ground at the first joint, the manipulator further comprising:
   a manipulator link coupled to the first joint;
   a second joint coupled to the manipulator link distal from the first joint;
   an elevation linkage coupled to the manipulator link at the second joint;
   a wrist coupled to the elevation linkage distal from the second joint, the wrist translatable via the elevation linkage without changing orientation relative to the elevation linkage, the wrist having multiple degrees of freedom; and
   an end effector coupled to the wrist;
   a deployment system connecting the manipulator to the mechanical ground, the deployment system comprising a deployment link, wherein the manipulator is rotatable relative to the deployment link at the first joint; and a base joint, wherein the deployment link is coupled to the mechanical ground at the base joint and is rotatable relative to the mechanical ground about the base joint, wherein the first joint comprises a manipulator yaw joint, the second joint comprises an elevation linkage yaw joint, and the base joint comprises an arm yaw joint.

2. The robotic arm system of claim 1, wherein the arm yaw joint is a skewed yaw joint having a skewed yaw axis of rotation.

3. The robotic arm system of claim 2, wherein the deployment link is an angled link having a link axis, and wherein the deployment link is rotatable about the skewed yaw axis from a first position at which the link axis is horizontal to a deployment position at which the link axis is not horizontal.

4. The robotic arm system of claim 2, further comprising a pitch joint to level the manipulator and a roll joint to orient the elevation linkage with respect to a gravity vector.

5. The robotic arm system of claim 2, wherein the wrist comprises a wrist yaw joint, a wrist roll joint, and a wrist pitch joint.

6. The robotic arm system of claim 1, wherein the robotic arm system comprises a yaw, roll, pitch, yaw, yaw, elevation kinematic chain.

7. The robotic arm system of claim 1, wherein the manipulator is self-leveling.

8. The robotic arm system of claim 1, wherein the elevation linkage comprises:

a four-bar linkage including an upper link arranged parallel to a lower link and a first end link arranged parallel to a second end link, wherein the first end link and the second end link are coupled between the upper link and the lower link to form a parallelogram structure;

a gravity compensating spring coupled to the parallelogram structure at a first spring attachment point and a second spring attachment point; and a spring adjustment actuator coupled to the first spring attachment point, a position of the first spring attachment point adjustable by the spring adjustment actuator.

9. The robotic arm system of claim 1, wherein the end effector is adapted to radially grasp a payload.

10. A robotic arm system, comprising:

a mechanical ground;

a first joint;

a manipulator coupled to the first joint, the manipulator rotatable relative to the mechanical ground at the first joint, the manipulator further comprising:

a manipulator link coupled to the first joint;

a second joint coupled to the manipulator link distal from the first joint;

an elevation linkage coupled to the manipulator link at the second joint;

a wrist coupled to the elevation linkage distal from the second joint, the wrist translatable via the elevation linkage without changing orientation relative to the elevation linkage, the wrist having multiple degrees of freedom; and an end effector coupled to the wrist; and a deployment system connecting the manipulator to the mechanical ground, the deployment system comprising a deployment link, wherein the manipulator is rotatable relative to the deployment link at the first joint, wherein the deployment link and the manipulator are movable between a stowed configuration and a deployed configuration.

11. The robotic arm system of claim 10, wherein in the deployment link has a deployment link axis, wherein the manipulator link has a manipulator link axis, wherein in the stowed configuration the deployment link axis and the manipulator link axis lie in parallel planes.

12. The robotic arm system of claim 11, wherein in the deployed configuration the deployment link axis and the manipulator link axis do not lie in parallel planes.

13. The robotic arm system of claim 10, wherein when in the stowed configuration, the manipulator link and the deployment link are vertically stacked.

14. A robotic arm system, comprising:

a mechanical ground;

a first joint; and a manipulator coupled to the first joint, the manipulator rotatable relative to the mechanical ground at the first joint, the manipulator further comprising:

a manipulator link coupled to the first joint;

a second joint coupled to the manipulator link distal from the first joint;

an elevation linkage coupled to the manipulator link at the second joint;

a wrist coupled to the elevation linkage distal from the second joint, the wrist translatable via the elevation linkage without changing orientation relative to the elevation linkage, the wrist having multiple degrees of freedom; and an end effector coupled to the wrist, wherein the end effector comprises:

a body;

first gripper rotatably coupled to the body, the body and the first gripper forming a first payload receiving area;

a rotary cam coupled to the first gripper; and an end effector actuator to drive the rotary cam, wherein the rotary cam is movable by the end effector actuator to open and close the first gripper.

15. The robotic arm system of claim 14, wherein the rotary cam is lockable in a zero-power fully open position.

16. The robotic arm system of claim 14, wherein the rotary cam is lockable in a zero-power fully closed position.

17. The robotic arm system of claim 14, wherein the end effector further comprises:

a gripper linkage coupled between the rotary cam and the first gripper; and an inline leaf spring coupled between the gripper linkage and the first gripper, wherein the rotary cam drives the gripper linkage to open and close the first gripper and wherein the inline leaf spring deflects to limit a gripping force applied by the first gripper to a payload in the first payload receiving area.

18. The robotic arm system of claim 14, wherein the end effector further comprises:

a gripper linkage coupled between the rotary cam and the first gripper; and a parallel spring to bias the first gripper closed, wherein the rotary cam drives the gripper linkage to open and close the first gripper.

19. The robotic arm system of claim 14, wherein the end effector further comprises a second gripper rotatably coupled to the body to form a second payload receiving area, wherein the rotary cam is coupled to the second gripper and movable to open and close the second gripper, and wherein the first gripper and second gripper are actuated by the same end effector actuator.

20. The robotic arm system of claim 19, wherein the end effector actuator is disposed between the first payload receiving area and the second payload receiving area.

21. A robotic arm system, comprising:
a mechanical ground;
a first joint; and
a manipulator coupled to the first joint, the manipulator rotatable relative to the mechanical ground at the first joint, the manipulator further comprising:
   a manipulator link coupled to the first joint;
   a second joint coupled to the manipulator link distal from the first joint;
   an elevation linkage coupled to the manipulator link at the second joint;
   a wrist coupled to the elevation linkage distal from the second joint, the wrist translatable via the elevation linkage without changing orientation relative to the elevation linkage, the wrist having multiple degrees of freedom; and
   an end effector coupled to the wrist,
wherein the robotic arm system comprises a yaw, roll, pitch, yaw, yaw, elevation kinematic chain.

22. The robotic arm system of claim 21, further comprising a deployment system connecting the manipulator to the mechanical ground, the deployment system comprising a deployment link, wherein the manipulator is rotatable relative to the deployment link at the first joint.

23. The robotic arm system of claim 21, wherein the end effector comprises:
a body;
first gripper rotatably coupled to the body, the body and the first gripper forming a first payload receiving area;
a rotary cam coupled to the first gripper; and
an end effector actuator to drive the rotary cam, wherein the rotary cam is movable by the end effector actuator to open and close the first gripper.

24. A robotic arm system, comprising:
a mechanical ground;
a first joint; and
a manipulator coupled to the first joint, the manipulator rotatable relative to the mechanical ground at the first joint, the manipulator further comprising:
   a manipulator link coupled to the first joint;
   a second joint coupled to the manipulator link distal from the first joint;
   an elevation linkage coupled to the manipulator link at the second joint;
   a wrist coupled to the elevation linkage distal from the second joint, the wrist translatable via the elevation linkage without changing orientation relative to the elevation linkage, the wrist having multiple degrees of freedom; and
   an end effector coupled to the wrist,
wherein the manipulator is self-leveling.

25. The robotic arm system of claim 24, wherein the elevation linkage comprises:
a four-bar linkage including an upper link arranged parallel to a lower link and a first end link arranged parallel to a second end link, wherein the first end link and the second end link are coupled between the upper link and the lower link to form a parallelogram structure;
a gravity compensating spring coupled to the parallelogram structure at a first spring attachment point and a second spring attachment point; and a spring adjustment actuator coupled to the first spring attachment point, a position of the first spring attachment point adjustable by the spring adjustment actuator.

26. The robotic arm system of claim 24, further comprising a deployment system connecting the manipulator to the mechanical ground, the deployment system comprising a deployment link, wherein the manipulator is rotatable relative to the deployment link at the first joint.

27. A robotic arm system, comprising:
a mechanical ground;
a first joint; and
a manipulator coupled to the first joint, the manipulator rotatable relative to the mechanical ground at the first joint, the manipulator further comprising:
   a manipulator link coupled to the first joint;
   a second joint coupled to the manipulator link distal from the first joint;
   an elevation linkage coupled to the manipulator link at the second joint, the elevation linkage comprising:
      a four-bar linkage including an upper link arranged parallel to a lower link and a first end link arranged parallel to a second end link, wherein the first end link and the second end link are coupled between the upper link and the lower link to form a parallelogram structure;
      a gravity compensating spring coupled to the parallelogram structure at a first spring attachment point and a second spring attachment point; and
      a spring adjustment actuator coupled to the first spring attachment point, a position of the first spring attachment point adjustable by the spring adjustment actuator;
   a wrist coupled to the elevation linkage distal from the second joint, the wrist translatable via the elevation linkage without changing orientation relative to the elevation linkage, the wrist having multiple degrees of freedom; and
   an end effector coupled to the wrist.

28. The robotic arm system of claim 27, further comprising:
a deployment system connecting the manipulator to the mechanical ground, the deployment system comprising a deployment link, wherein the manipulator is rotatable relative to the deployment link at the first joint; and
a base joint.

29. The robotic arm system of claim 28, wherein the deployment link and the manipulator are movable between a stowed configuration and a deployed configuration.

30. A robotic arm system, comprising:
a mechanical ground;
a first joint; and
a manipulator coupled to the first joint, the manipulator rotatable relative to the mechanical ground at the first joint, the manipulator further comprising:
   a manipulator link coupled to the first joint;
   a second joint coupled to the manipulator link distal from the first joint;
   an elevation linkage coupled to the manipulator link at the second joint;
   a wrist coupled to the elevation linkage distal from the second joint, the wrist translatable via the elevation linkage without changing orientation relative to the elevation linkage, the wrist having multiple degrees of freedom; and
   an end effector coupled to the wrist, wherein the end effector is adapted to radially grasp a payload.

31. The robotic arm system of claim 30, wherein the end effector comprises:

a body;

first gripper rotatably coupled to the body, the body and the first gripper forming a first payload receiving area;

a rotary cam coupled to the first gripper; and an end effector actuator to drive the rotary cam, wherein the rotary cam is movable by the end effector actuator to open and close the first gripper.

32. The robotic arm system of claim 31, wherein the rotary cam is lockable in a zero-power fully open position or in a zero-power fully closed position.

* * * * *